US010635049B2

(12) United States Patent
Sato

(10) Patent No.: US 10,635,049 B2
(45) Date of Patent: Apr. 28, 2020

(54) ELLIPSOMETRY DEVICE AND ELLIPSOMETRY METHOD

(71) Applicant: University of Hyogo, Kobe-shi, Hyogo (JP)

(72) Inventor: Kunihiro Sato, Himeji (JP)

(73) Assignee: University of Hyogo, Kobe-shi (JP)

( * ) Notice: Subject to any disclaimer, the term of this patent is extended or adjusted under 35 U.S.C. 154(b) by 0 days.

(21) Appl. No.: 16/282,519

(22) Filed: Feb. 22, 2019

(65) Prior Publication Data

US 2019/0187612 A1  Jun. 20, 2019

Related U.S. Application Data

(63) Continuation of application No. PCT/JP2017/029829, filed on Aug. 21, 2017.

(30) Foreign Application Priority Data

Aug. 24, 2016 (JP) .................. 2016-163989

(51) Int. Cl.
*G03H 1/00* (2006.01)
*G01J 4/04* (2006.01)
(Continued)

(52) U.S. Cl.
CPC .............. *G03H 1/0005* (2013.01); *G01J 4/00* (2013.01); *G01J 4/04* (2013.01); *G01M 11/0228* (2013.01);
(Continued)

(58) Field of Classification Search
CPC ...... G03H 1/0005; G03H 1/04; G03H 1/0866; G03H 1/0443; G03H 1/0402;
(Continued)

(56) References Cited

U.S. PATENT DOCUMENTS 6,134,011 A * 10/2000 Klein .................. G01J 4/04
250/225
7,411,677 B2  8/2008 Kawakami et al.
(Continued)

FOREIGN PATENT DOCUMENTS

JP 62-192604 A 8/1987
JP 2009-535609 A 10/2009
(Continued)

OTHER PUBLICATIONS

International Search Report (PCT/ISA/210) issued in PCT Application No. PCT/JP2017/029829 dated Oct. 31, 2017 with English translation (four (4) pages).
(Continued)

*Primary Examiner* — Dominic J Bologna
(74) *Attorney, Agent, or Firm* — Crowell & Moring LLP

(57) ABSTRACT

The present invention provides an ellipsometry device and an ellipsometry method whereby measurement efficiency can be enhanced. In this method, an object is illuminated by spherical-wave-like illumination light Q linearly polarized at 45° (S1), and an object light O, being a reflected light, is acquired in a hologram $I_{OR}$ using a spherical-wave-like reference light R having a condensing point near the condensing point of the illumination light Q, and a hologram $I_{LR}$ of the reference light R is furthermore acquired using a spherical-wave reference light L having the same condensing point as that of the illumination light Q (S2). The holograms are separated into p- and s-polarized light holograms $I^K_{OR}$, $I^K_{LR}$, κ=p, s and processed to extract object light waves, and object light spatial frequency spectra $G^K(u, v)$, κ=p, s are generated (S3) (S4). Ellipsometric angles $\psi(\theta)$, $\Delta(\theta)$ are obtained for each incident angle θ from the amplitude reflection coefficient ratio $\rho = G^p/G^s = \tan\psi \cdot \exp(i\Delta)$. Through use of numerous lights having different incident angles θ included in the illumination light Q, data of
(Continued)

numerous reflection lights can be acquired collectively in a hologram and can be processed.

20 Claims, 21 Drawing Sheets

(51) Int. Cl.
    *G03H 1/04*     (2006.01)
    *G03H 1/08*     (2006.01)
    *G01M 11/00*     (2006.01)
    *G01J 4/00*     (2006.01)
    *G01M 11/02*     (2006.01)

(52) U.S. Cl.
    CPC .......... *G01M 11/3181* (2013.01); *G03H 1/04* (2013.01); *G03H 1/0402* (2013.01); *G03H 1/0443* (2013.01); *G03H 1/0465* (2013.01); *G03H 1/0866* (2013.01); *G03H 2001/0033* (2013.01); *G03H 2001/0445* (2013.01); *G03H 2001/0447* (2013.01); *G03H 2001/0456* (2013.01); *G03H 2222/31* (2013.01)

(58) Field of Classification Search
    CPC ......... G03H 1/0465; G03H 2001/0456; G03H 2001/0447; G03H 2001/0445; G03H 2001/0033; G03H 2222/31; G01J 4/04; G01J 4/00; G01M 11/3181; G01M 11/0228

See application file for complete search history.

(56) References Cited

U.S. PATENT DOCUMENTS

| | | | |
|---|---|---|---|
| 2001/0052979 | A1 | 12/2001 | Treado et al. |
| 2007/0252986 | A1* | 11/2007 | Sandstrom ................ G01J 4/04 356/319 |
| 2007/0268490 | A1* | 11/2007 | Kawakami ................ G01J 4/04 356/365 |
| 2012/0294136 | A1* | 11/2012 | Sato ..................... G03H 1/0443 369/112.15 |
| 2013/0100241 | A1* | 4/2013 | Sato ........................ G02B 21/06 348/40 |
| 2013/0100333 | A1* | 4/2013 | Awatsuji .............. G03H 1/0443 348/335 |
| 2015/0268628 | A1* | 9/2015 | Sato ..................... G02B 21/365 356/457 |
| 2016/0259297 | A1* | 9/2016 | Sato ..................... G03H 1/0443 |

FOREIGN PATENT DOCUMENTS

| | | |
|---|---|---|
| JP | 2012-154847 A | 8/2012 |
| WO | WO 2005/029050 A1 | 3/2005 |
| WO | WO 2011/089820 A1 | 7/2011 |
| WO | WO 2012/002207 A1 | 1/2012 |
| WO | WO 2012/005315 A1 | 1/2012 |
| WO | WO 2014/054776 A1 | 4/2014 |
| WO | WO 2015/064088 A1 | 5/2015 |

OTHER PUBLICATIONS

Japanese-language Written Opinion (PCT/ISA/237) issued in PCT Application No. PCT/JP2017/029829 dated Oct. 31, 2017 (three (3) pages).

Abstract of Zhu et al., "A New Method for Acquiring the Complex Hologram in Optical Scanning Holography", Proc. of SPIE, 2011, vol. 8134, (one (1) page).

Harvey A.R., "Determination of the Optical Constants of Thin Films in the Visible by Static Dispersive Fourier Transform Spectroscopy", American Institute of Physics, Review of Scientific Instruments, Oct. 1998, pp. 3649-3658, vol. 69, No. 10, (10 pages).

Xiao Q. et al., "A Spectral Interferometric Method to Measure Thickness with Large Range", Optics Communications, 2009, pp. 3076-3080, 282, (five (5)pages).

* cited by examiner

ELLIPSOMETRY DEVICE AND ELLIPSOMETRY METHOD

TECHNICAL FIELD

The present invention relates to an ellipsometry device and an ellipsometry method.

BACKGROUND ART

Conventionally, ellipsometry (polarization analysis technology) is known as technology for investigating the optical characteristic, more generally, the dielectric characteristic of a substance. In ellipsometry, change of a polarization state is measured in case incident light reflects from a substance. The dielectric characteristic of a substance can be known from the change of the polarization state. The change of the polarization state is measured as a ratio of amplitude reflection coefficients $r_p$ and $r_s$ for p- and s-polarization, respectively. The amplitude reflection coefficients $r_p$ and $r_s$ are complex numbers, and the ratio, namely, the amplitude reflection coefficient ratio $\rho=r_p/r_s$, is also a complex number and expressed using two ellipsometric angles $\psi$ and $\Delta$ as $\rho=\tan(\psi) \exp(i\Delta)$. The ellipsometric angles $\psi$ and $\Delta$, acquired as a measurement result, are dependent on the optical characteristic of each substance and the thickness of reflective film, etc. The ellipsometry device and the ellipsometry method by the ellipsometry are used in order to measure film characteristic and thickness of a thin film in the semiconductor field processing a thin film of thickness below the light wavelength, etc.

The ellipsometry device for thin film measurement is called an ellipsometer. An ellipsometer is used in order to obtain the optical constants, film thickness, layer structure, etc. of a thin film by measuring change of the polarization state in the light reflected from the thin film. The conventional ellipsometer is classified roughly into a type of device which rotates a polarizer mechanically, and a type of device which modulates light polarization using photoelasticity. There are two for the polarizer rotation: one rotates analyzer (polarizer); and the other rotates a compensator. The change of the polarization state, generated when an incident light changes into a reflected light, is measured by a setup of the polarization state of the incident light and a detection of the polarization state of the reflected light.

Measurement is done by measuring the light intensity of the reflected light, during rotating the polarizer mechanically or modulating the light by transmitting the light through a photoelastic modulator, in order to measure under different conditions or an optimal condition. Operation of the mechanical rotation of the polarizer or the light phase modulation, for the setup of the polarization state or for the detection, lengthens the measuring time. Then, an ellipsometer, which improves measurement speed by removing the actuator rotating the polarizer, has been proposed (for example, refer to patent document 1).

The accuracy of thin film measurement can be improved by using the information on a wavelength other than the amplitude reflection coefficient ratio $\rho$. In this case, not only the measurement of film thickness or optical constants of a single layer film, structural analysis of a multilayer film can be made. A spectroscopic ellipsometer is one of the ellipsometers which use wavelength information. The spectroscopic ellipsometer uses combination of the polarization analysis technology (ellipsometry) and the spectrum analysis technology (spectroscopy). For the measurement, a high-performance spectroscope is necessary in addition to the polarization devices such as a rotary polarizer, a rotary compensator or a photoelastic modulator, and thus the ellipsometer becomes expensive.

Also, as one of the technologies for analyzing light waves such as reflected light, there is a holography, which analyzes the light by recording the light intensity data and light wave phase data together on a medium such as a photographic plate called a hologram. Recent holography analyzes the hologram by recording the light intensity and phase of the light wave as digital data using an image sensor and a semiconductor memory, or by generating the hologram on a computer. Such holography is called digital holography.

In the digital holography, various technology have been proposed to achieve high-speed recording and high precision processing of holograms. For example, in order to record and analyze a complex amplitude in-line hologram at a high speed and accurately, a one-shot digital holography, in which spatial frequency filtering and spatial heterodyne modulation are applied to a recorded hologram, has been proposed (for example, refer to patent document 2). In order to solve the problem of the conventional optical microscope, a method for precisely recording one-shot object light of large numerical aperture without using an imaging lens, a method for precisely reconstructing a high resolution three-dimensional image with a computer reconstruction by performing plane wave expansion of the recorded object light, and, a lensless three-dimensional microscope capable of recording and reconstructing a distortionless high-resolution three-dimensional moving image have been proposed (for example, refer to patent document 3).

Moreover, in order to measure internal structures of cells in a culture solution and/or biological tissues with high resolution, a high resolution tomographic imaging method using a reflection type lensless holographic microscope and wavelength swept laser lights has been proposed (for example, refer to patent document 4). Furthermore, a method for synthesizing an object light of a numerical aperture exceeding 1 by combining a plurality of large numerical aperture object lights recorded with illumination lights of different incident angles, and an ultrahigh resolution three-dimensional microscope of resolution exceeding the diffraction limit (for example, refer to patent document 5).

Also, in relation to the digital holography, a dispersive Fourier transform spectroscopy (DFTS) is known, which obtains optical constants of a measurement sample, by making a beam transmitted through a measurement sample interfere with a beam not transmitted, receiving the beams by a CCD, and Fourier-transforming the interference image (for example, refer to non-patent document 1). Similarly, a method for measuring the thickness of a thin film sample using interference spectroscopy is known, which derives the thickness by Fourier-transforming an interference image of a beam transmitted through the measurement sample and a beam not transmitted and calculating an light path length (for example, refer to non-patent document 2). Further, an interference contrast film-thickness-measurement method is known, which derives the thickness of a thin film sample by illuminating the measurement sample with a parallel light generated using a hologram, dividing the light transmitted through the measurement sample, making them interfere mutually after generating phase change, and measuring the intensity change of the interference fringe (for example, refer to patent document 6).

PRIOR ART DOCUMENTS

Patent Documents

Patent document 1: U.S. Pat. No. 7,411,677
Patent document 2: WO2011/089820
Patent document 3: WO2012/005315
Patent document 4: WO2014/054776
Patent document 5: WO2015/064088
Patent document 6: Japanese Laid-Open Patent Publication S62-192604

Non Patent Documents

Non-patent document 1: A Earl Harvey, Determination of the optical constants of thin films in the visible by static dispersive Fourier transform spectroscopy, REVIEW OF SCIENTIFIC INSTRUMENTS, Vol. 69, No. 10, pp. 3649-3658 (1998)

Non-patent document 2: Qing Xiao et al., A spectral interferometric method to measure thickness with large range, Optics Communications, 282, pp. 3076-3080 (2009)

DISCLOSURE OF THE INVENTION

However, in the ellipsometer disclosed in patent document 1 mentioned above, when this is used for measurement of a thin film, no improvement is made on improving measurement accuracy by using a plurality of measurement results obtained by changing measurement conditions, for example, conditions of incident angle of incident light. Patent documents 2 to 5 do not disclose ellipsometry. Further, the method disclosed in non-patent document 1 intends to measure the film thickness of about 1 mm at the maximum and the method described in non-patent document 2 intends to measure the film thickness from several µm to several mm, and those can not be applied to high-precision thin film measurement in a semiconductor field etc. The measurement method as disclosed in patent document 6 uses parallel light with high parallelism reconstructed by using a hologram, and can not be applied to ellipsometry.

In the conventional spectroscopic ellipsometer, when a thin film of large area is measured, it is necessary to measure by moving the measurement point on the thin film. For this reason, it takes a long time to measure the film thickness distribution and the film thickness nonuniformity for such a large area thin film. The spectroscopic ellipsometer employing wavelength information uses such a light of a wide wavelength spectrum width, as an illumination light source, and the spot size is generally several mm, and therefore the spatial resolution is low. The spectroscopic ellipsometer, in data analysis, needs a model of a dielectric function which describes the wavelength dependency of the dielectric constant, for example, a wavelength dependence $n=n(\lambda)$ for the refractive index n. The analysis tends to be complicated for that model generation, and the analyzed value may have model dependency in some cases.

An object of the present invention is to provide an ellipsometry device and an ellipsometry method which solves the problems mentioned above and can improve the measurement efficiency with a simple configuration.

In order to attain the above-mentioned subject, the ellipsometry device used for polarization analysis of a light emitted from an object comprises:

a data acquisition unit which acquires data of an object light (O) emitted from the object illuminated by a non-parallel illumination light (Q) of known polarization state containing p- and s-polarized lights as an object light hologram ($I_{OR}$) using an off-axis reference light (R) so that the object light hologram ($I_{OR}$) is separable into p- and s-polarization holograms, and acquires data of the off-axis reference light (R) as a reference light hologram ($I_{LR}$) using an in-line spherical-wave reference light (L) so that the reference light hologram ($I_{LR}$) is separable into p- and s-polarization holograms; and a data analysis unit which performs polarization analysis of the object light (O), wherein
the data analysis unit comprises:

a light wave reconstruction unit which generates light wave holograms ($g^K(x, y)$, $\kappa=p, s$) expressing each light wave of p- and s-polarized lights in the object light (O), respectively, on a hologram plane using the data of the object light hologram ($I_{OR}$) and the reference light hologram ($I_{LR}$) acquired by the data acquisition unit;

an object light plane wave expansion unit which generates object light spatial frequency spectra ($G^K(u, v)$, $\kappa=p, s$) of p- and s-polarization by performing plane wave expansion on each of the light wave holograms ($g^K(x, y)$, $\kappa=p, s$) of p- and s-polarization, respectively;

a polarization coefficient generation unit which generates an illumination light polarization coefficient ($\xi_Q=S^s(u, v)/S^p(u, v)$) being a ratio of an illumination light spatial frequency spectrum ($S^s(u, v)$) of an s-polarized light in the illumination light (Q) to an illumination light spatial frequency spectrum ($S^p(u, v)$) of a p-polarized light in the illumination light (Q) on the hologram plane using known information of the illumination light (Q); and an operation unit which derives, using the object light spatial frequency spectra ($G^K(u, v)$, $\kappa=p, s$) of p- and s-polarization and the illumination light polarization coefficient ($\xi_Q$), an amplitude reflection coefficient ratio ($\rho=r_p/r_s=\xi_Q G^p(u, v)/G^s(u, v)$) being a ratio of an amplitude reflection coefficient ($r_p=G^p(u, v)/S^p(u, v)$) of p-polarization to an amplitude reflection coefficient ($r_s=G^s(u, v)/S^s(u, v)$) of s-polarization, for each spatial frequency (u, v).

Moreover, the ellipsometry method used for polarization analysis of a light emitted from an object comprises the steps of:

acquiring data of an object light (O) emitted from the object illuminated by a non-parallel illumination light (Q) of known polarization state containing a p-polarized light and an s-polarized light as an object light hologram ($I_{OR}$) using an off-axis reference light (R) so that the object light hologram ($I_{OR}$) is separable into p- and s-polarization holograms, and acquiring data of the off-axis reference light (R) as a reference light hologram ($I_{LR}$) using an in-line spherical-wave reference light (L) so that the reference light hologram ($I_{LR}$) is separable into p- and s-polarization holograms;

generating light wave holograms ($g^K(x, y)$, $\kappa=p, s$) expressing each light wave of p- and s-polarized lights in the object light (O), respectively, on a hologram plane using the data of the object light hologram ($I_{OR}$) and the reference light hologram ($I_{LR}$);

generating object light spatial frequency spectra ($G^K(u, v)$, $\kappa=p, s$) of p- and s-polarization by performing plane wave expansion on each of the light wave holograms ($g^K(x, y)$, $\kappa=p, s$) of the p- and s-polarization lights, respectively;

generating an illumination light polarization coefficient ($\xi_Q=S^s(u, v)/S^p(u, v)$) being a ratio of an illumination light spatial frequency spectrum ($S^s(u, v)$) of an s-polarized light in the illumination light (Q) to an illumination light spatial frequency spectrum ($S^p(u, v)$) of a p-polarized light in the illumination light (Q) on the hologram plane using known information of the illumination light (Q); and deriving, using the object light spatial frequency spectra ($G^K(u, v)$, $\kappa=p, s$) of p- and s-polarization and the illumination light polarization coefficient ($\xi_Q$), an amplitude reflection coefficient ratio ($\rho=r_p/r_s=\xi_Q G^p(u, v)/G^s(u, v)$) being a ratio of an amplitude reflection coefficient ($r_p=G^p(u, v)/S^p(u, v)$) of p-polarized light to an amplitude reflection coefficient ($r_s=G^s(u, v)/S^s(u, v)$) of s-polarized light, for each spatial frequency (u, v).

According to the ellipsometry device and method of the present invention, because data of reflected lights of an incident light, which is composed of a large number of incident angle lights naturally included in a non-parallel illumination light, are collectively recorded as a hologram, and ellipsometric angles $\psi$, $\Delta$ are obtained for each of a large number of wave vectors corresponding to the incident angles by post-processing using such as plane wave expansion of light waves, the measurement efficiency can be improved.

MODE FOR CARRYING OUT THE INVENTION

Hereinafter, an ellipsometry device and an ellipsometry method using the digital holography according to embodiments of the present invention are described with reference to the drawings.

The 1st Embodiment: Ellipsometry Method

Figure 1:
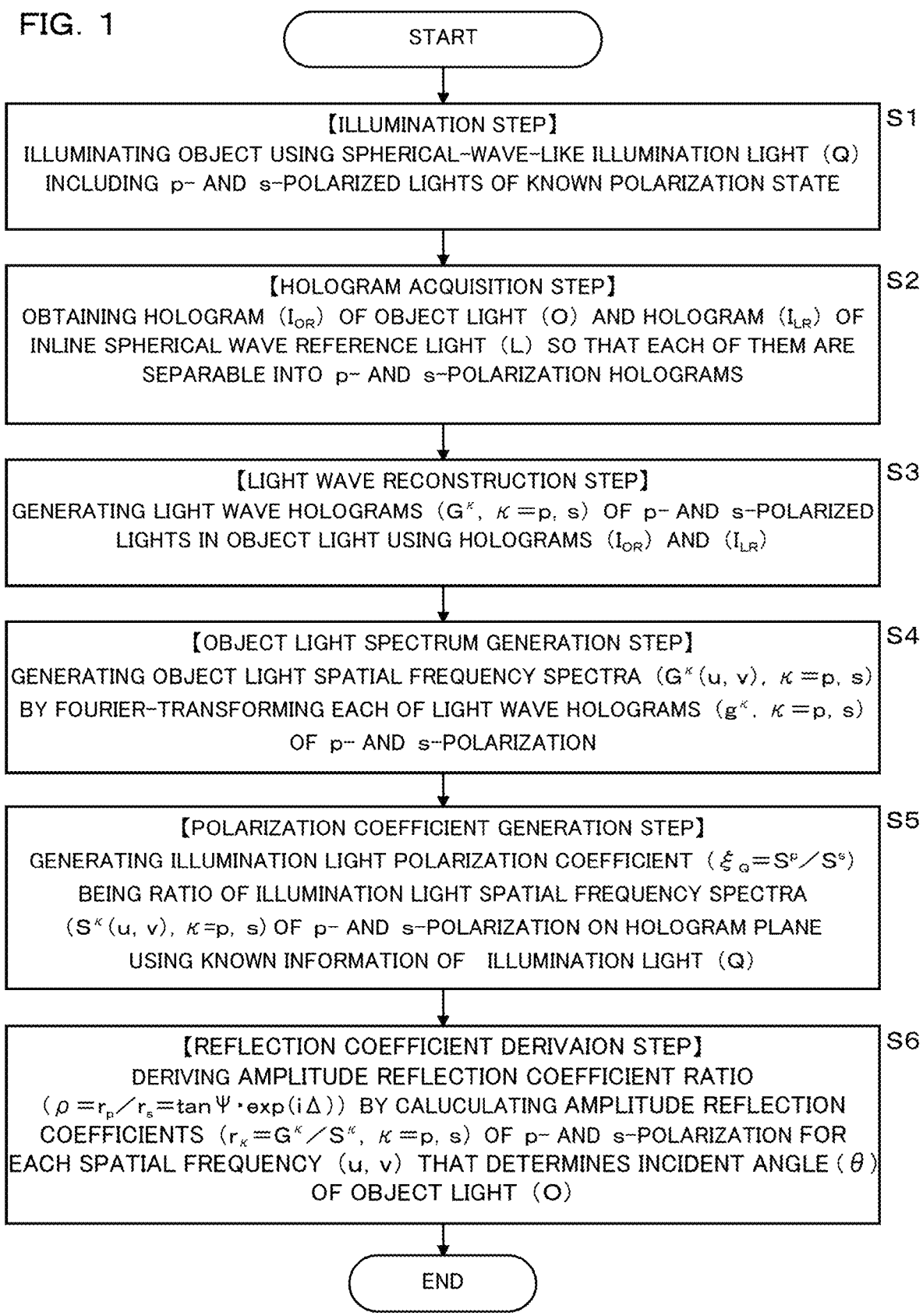
FIG. 1 is a flow chart of an ellipsometry method according to the 1st embodiment of the present invention.
Figure 2:
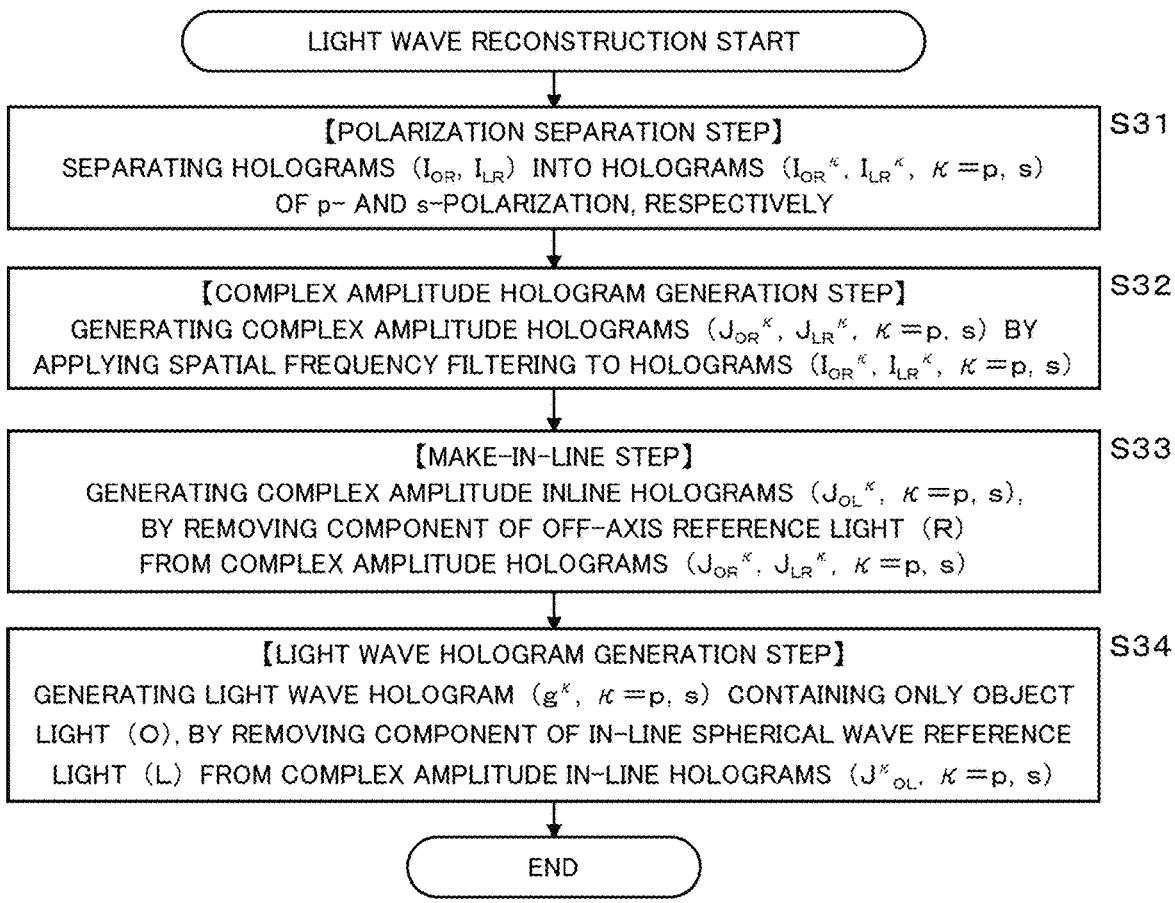
FIG. 2 is a flow chart which shows the details of the light wave reconstruction process of FIG. 1.

FIG. 1 and FIG. 2 show the ellipsometry method according to the 1st embodiment. As shown in FIG. 1, this ellipsometry method includes an illumination step (S1), a hologram acquisition step (S2), a light wave reconstruction step (S3), an object light spectrum generation step (S4), a polarization coefficient generation step (S5), and a reflection coefficient derivation step (S6).

In the illumination step (S1), an object is illuminated by an illumination light Q which is a non-parallel light including a p-polarized light and an s-polarized light wherein their polarization state is known. The non-parallel illumination light Q is, for example, a spherical-wave light, and is composed of a set of lights having different wave number vectors. In the hologram acquisition step (S2), an off-axis hologram $I_{OR}$ of an object light O being a reflection light of the illumination light Q and an off-axis hologram $I_{LR}$ of an in-line spherical-wave reference light L are obtained so that each of them are separable into p- and s-polarization holograms. The in-line spherical-wave reference light L is an in-line illumination light for recording the object light O virtually as an in-line hologram. The term "virtually" expresses that the in-line hologram can be obtained by post-processing. Further, the in-line spherical-wave reference light L is a light having a condensing point of spherical-wave light at the position of a condensing point of the object light O. The off-axis holograms $I_{OR}$ and $I_{LR}$ are recorded at different times, not simultaneously, and the in-line hologram is obtained by post-processing of these holograms.

In the light wave reconstruction step (S3), using the holograms $I_{OR}$ and $I_{LR}$, light wave holograms $g^K$, κ=p, s of p- and s-polarized lights in the object light are generated, respectively, on a hologram plane (a light receiving surface of a photo-detector). In the object light spectrum generation step (S4), object light spatial frequency spectra $G^K(u, v)$, κ=p, s are generated by Fourier-transforming each of the light wave holograms $g^K$, κ=p, s of p- and s-polarization.

The spatial frequency (u, v) represents the wave number vector of the object light O incident on the hologram plane, and the incident angle θ=θ(u, v) of the object light O with respect to the hologram plane is defined by a relation $\sin\theta = \lambda((u)^2+(v)^2)^{1/2}$. Since the object light O is a reflected light of the illumination light Q, the incident angle θ is an incident angle when the reflected light is incident on the light receiving surface. The incident angle θ' when the illumination light Q is incident on the surface of the object, that is, the reflective surface corresponds to the spatial frequency (u', v') representing the wave number vector of the illumination light Q incident on the surface of the object. The incident angle θ' is the same as the reflection angle of the reflected light of the illumination light Q (that is, the object light O).

Here, the plane of incidence in ellipsometry is defined. The plane of incidence in ellipsometry is defined as a plane containing both of the wavenumber vector of the incident light on the object surface and the wavenumber vector of its reflected light (note that the plane of incidence is not the reflective surface). The plane of incidence is perpendicular to the reflective surface, that is, the object surface. It is assumed that the hologram plane is perpendicular to the plane of incidence, but this is not essential.

In the polarization coefficient generation step (S5), an illumination light polarization coefficient $\xi_Q = S^s/S^p$, which is a ratio of illumination light spatial frequency spectra $S^K(u, v)$, κ=p, s of p- and s-polarization on the hologram plane, is generated using known information of the illumination light Q. The illumination light spatial frequency spectra $S^K(u, v)$, κ=p, s are spatial frequency spectra of the incident light of the illumination light Q on the hologram plane in case of assuming a situation in which the illumination light Q is reflected at the object surface position by an ideal reflective surface that does not affect the polarization state and is incident on the hologram plane.

The illumination light polarization coefficient $\xi_Q$ is a dimensionless quantity and is not affected by coordinate transform. The illumination light polarization coefficient $\xi_Q$ can be set to $\xi_Q=1$ by adjusting the polarization state of the illumination light Q. For example, a linearly polarized and spherical-wave light can be suitably used as the illumination light Q which is polarized at 45° to the plane of incidence defined relating to an optical axis light selected as an representative light in the illumination light Q and a known position of the condensing point to the hologram plane. In the case of such 45° linearly polarized light, $\xi_Q=1$ is obtained without calculating $S^K(u, v)$, κ=p, s. The illumination light Q is not limited to a spherical-wave light but may be any non-parallel light as long as the polarization state is known by measurement or calculation, etc. at the time of ellipsometric analysis, and it is only necessary that the illumination light polarization coefficient $\xi_Q$ can be obtained. If the illumination light spatial frequency spectrum $S^K(u, v)$, κ=p, s of the illumination light Q is obtained, the illumination light polarization coefficient $\xi_Q$ can be obtained.

In the reflection coefficient derivation step (S6), an amplitude reflection coefficient ratio $\rho = \xi_Q G^p/G^s$ is calculated for each spatial frequency (u, v) that determines the incident angle θ of the object light O with respect to the hologram plane (ρ is also called a complex reflectance ratio). The calculation process is performed on the hologram plane. The amplitude reflection coefficient ratio ρ is a ratio of an amplitude reflection coefficient $r_p = G^p(u, v)/S^p(u, v)$ of p-polarization to an amplitude reflection coefficient $r_s = G^s(u, v)/S^s(u, v)$ of s-polarization, that is, $\rho = r_p/r_s$, and becomes $\rho = \xi_Q G^p/G^s$ using the illumination light polarization coefficient $\xi_Q$. The amplitude reflection coefficient ratio ρ is expressed as $\rho = \tan\psi \cdot \exp(i\Delta)$ using an ellipsometric angle ψ(u, v) representing the amplitude in angle and an ellipsometric angle Δ(u, v) representing the phase. The measured value data of the ellipsometric angles ψ(u, v), Δ(u, v) defined for each spatial frequency (u, v) or the ellipsometric angles ψ(θ), Δ(θ) defined for each incident angle θ, on the hologram plane, can be obtained from the measured value of the amplitude reflection coefficient ratio ρ.

Since many (u', v') or θ' are included in the illumination light Q, the data of the measured values ψ, Δ are obtained, as a function of the incident angle θ, in a state that the measured values appear on a curve. When the illumination light Q has a condensing point and the surface of the object, namely, the reflective surface exists at the position of the condensing point, the reflected light is emitted as the object light O from a localized point-like region. In this case, one point (referred to as a reflection point) is irradiated by the illumination light Q having a large number of mutually different wave vectors (u', v') or incident angles θ' and data of a large number of measured values ψ, Δ of different incident angle θ' are obtained at the reflection point. According to the method of such one-point intensive measurement, it is possible to perform optical measurement of physical properties at one point of the object with high accuracy using the large number of data of measured values ψ, Δ (for example, refer to FIG. 3).

Further, when the illumination light Q including non-parallel lights illuminates a large area of the surface of the object as the reflective surface, each point in the reflective surface is irradiated by a light having one kind of wave vector (u', v') or incident angle θ'. In this case, every one measured value ψ, Δ is obtained for each point (x', y') of the entire large reflective surface. The incident angle θ' is distributed over the reflective surface, and obtained data of the measured values ψ, Δ are distributed over it according to the incident angle θ'. According to the method of such wide range distribution measurement, it is possible to rapidly measure distribution of the optical characteristics over the object surface, for example, distribution of film thickness or surface roughness, using the distribution of the data of the measured values ψ, Δ (For example, refer to FIG. 17).

Here, for example, using the measured value of the ellipsometric angles ψ(u, v), Δ(u, v) obtained by the method of above-mentioned one-point intensive measurement for a thin film, how to obtain the film thickness d and refractive index n is described. The ellipsometric angles ψ, Δ are obtained in a frequency space (u, v) on the hologram plane. Calculated values $\psi_{CAL}$, $\Delta_{CAL}$ of the ellipsometric angles ψ, Δ are derived by computing, respectively, using the film thickness d and the refractive index n of the thin film as parameters, wherein the calculated values $\psi_{CAL}$, $\Delta_{CAL}$ are defined in a frequency space (u', v') on a object surface as ellipsometric angles $\psi_{CAL}$ (u', v'), $\Delta_{CAL}$ (u', v'), or $\psi_{CAL}$ (θ'), $\Delta_{CAL}$ (θ'). The ellipsometric angles $\psi_{CAL}$ (u', v'), $\Delta_{CAL}$ (u', v') derived on the object surface are transformed by coordinate transform into ellipsometric angles $\psi_{CAL}$(u, v), $\Delta_{CAL}$(u, v), or $\psi_{CAL}$(θ), $\Delta_{CAL}$ (θ) on the hologram plane.

As measured values of the film thickness d and refractive index n of the thin film, parameters d and n are obtained, which can optimally fit the calculated values $\psi_{CAL}$, $\Delta_{CAL}$ on the hologram plane to the data of the measured values ψ, Δ on the hologram plane. In addition, the ellipsometric angles ψ (u', v'), Δ(u', v') on the actual reflective surface of the object surface can be obtained by the transform process of coordinate rotation which makes the hologram plane parallel with the object surface. Therefore, the film thickness d and refractive index n can also be obtained as measured values by carrying out the processing for optimally fitting the calculated values $\psi_{CAL}$, $\Delta_{CAL}$ to the data of the measured values ψ, Δ in the frequency space (u', v') on the object surface (refer to FIG. 7 and FIG. 8).

Next, with reference to FIG. 2, the light wave reconstruction step (S3) is explained. The light wave reconstruction step (S3) includes a polarization separation step (S31), a complex amplitude hologram generation step (S32), a make-in-line step (S33), and a light wave hologram generation step (S34).

In the polarization separating step (S31), the holograms $I_{OR}$, $I_{LR}$ are separated into holograms ($I^K_{OR}$, $I^K_{LR}$, κ=p, s) of p- and s-polarization, respectively. In the complex amplitude hologram generation step (S32), spatial frequency filtering is applied to the holograms $I^K_{OR}$, $I^K_{LR}$, κ=p, s, and complex amplitude hologram $J^K_{OR}$, $J^K_{LR}$, κ=p, s, which consists of direct image components, are generated.

In the make-in-line step (S33), complex amplitude in-line holograms $J^K_{OL}$, κ=p, s are generated by removing the component of the off-axis reference light R from the complex amplitude holograms $J^K_{OR}$, $J^K_{LR}$, κ=p, s. The complex amplitude in-line holograms $J^K_{OL}$, κ=p, s are substantially equivalent to the holograms obtained by recording the data of the interference fringes between the object light O and an in-line reference light, namely, the in-line spherical-wave reference light L for each polarization state, respectively. In the light wave hologram generating step (S34), light wave holograms $g^K$, κ=p, s, which contain only the object light O, are generated by removing the component of the in-line spherical-wave reference light L from the complex amplitude in-line holograms $J^K_{OL}$, κ=p, s. Details of the ellipsometry method is described with a mathematical expression after explanation of the ellipsometry device.

The 2nd Embodiment: Ellipsometry Device

Figure 3:
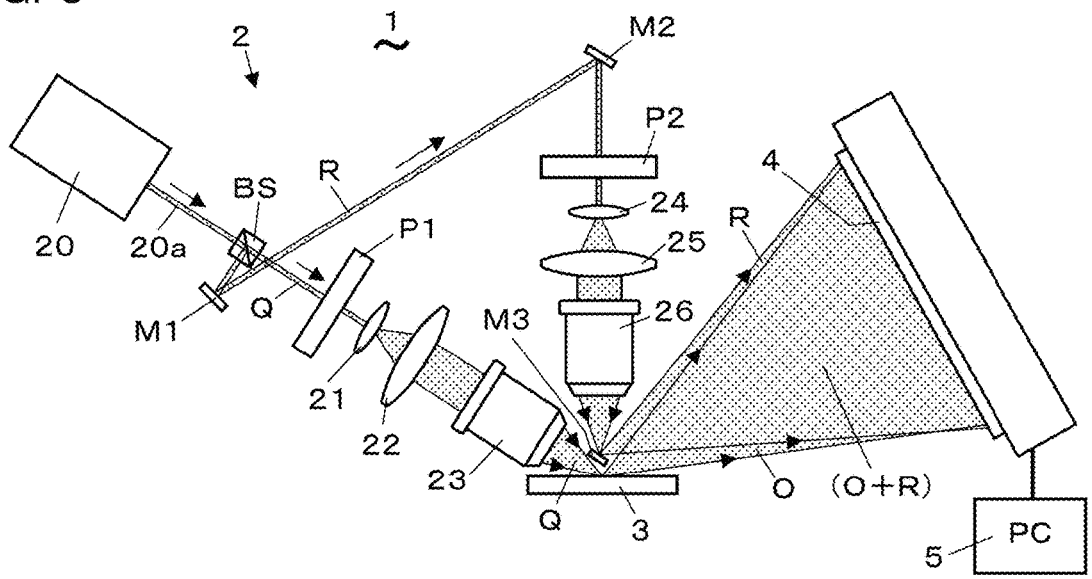
FIG. 3 is a side view showing a schematic construction of an ellipsometry device according to the 2nd embodiment.
Figure 4:
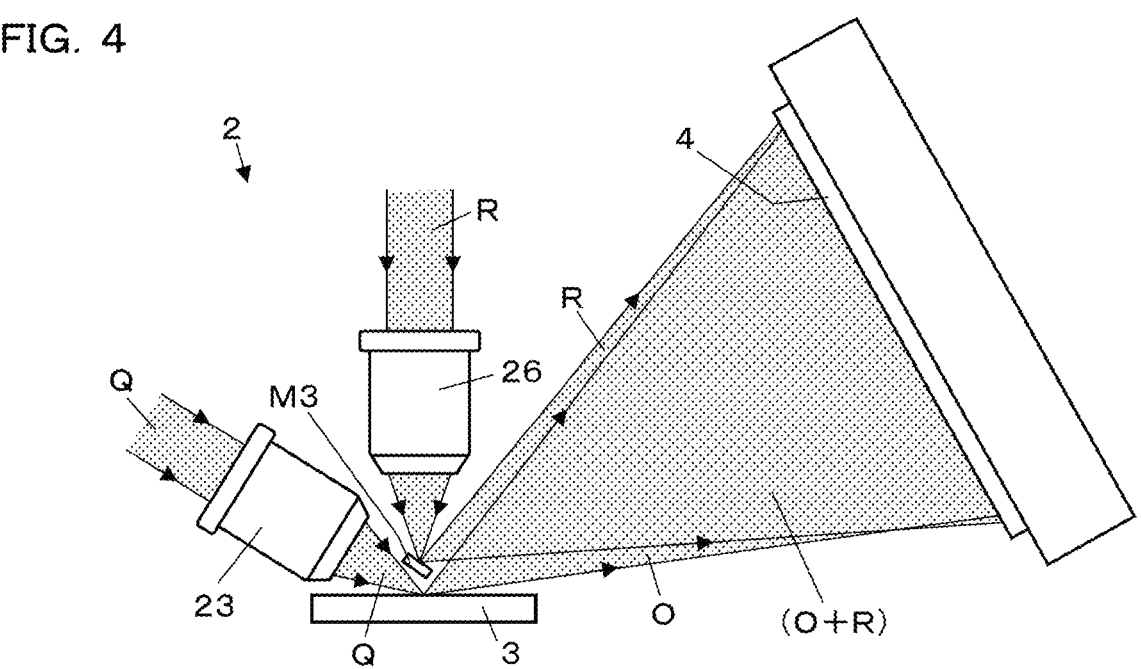
FIG. 4 is a principal part detail view of FIG. 3.

FIG. 3 to FIG. 8 show the ellipsometry device 1 according to the 2nd embodiment used for carrying out the above ellipsometry method. This embodiment corresponds to the device configuration for implementing the method of one-point intensive measurement. As shown in FIG. 3 and FIG. 4, the ellipsometry device 1 comprises a laser 20, an optical system 2 for propagating lights, a photo-detector 4 which receives the reflected light from an object 3, namely, a sample to be measured, together with reference light, changes light intensity into an electric signal to be recorded, and a computer 5 which processes and memorizes the signals of light intensity. The object 3 is, for example, a thin film of a silicon oxide formed on a silicon wafer. The laser 20 is a single wavelength light source that emits a coherent light 20a. The photo-detector 4 is CCD, for example.

The optical system 2 is equipped with a beam splitter BS which splits the coherent light 20a from the laser 20 into the illumination light Q and the reference light R. The illumination light Q is a light going straight through the beam splitter BS, and the reference light R is a light branched 90° by the beam splitter BS. On the light path of the illumination light Q, a polarizer P1, lenses 21, 22 for enlarging the light beam diameter, and a condenser lens 23 for condensing the light from the lens 22 are provided in this order. On the light path of the reference light R, mirrors M1, M2 for changing the light direction, a polarizer P2, lenses 24, 25 for expanding the light beam diameter, a condenser lens 26 for condensing the light from the lens 25, and a micro mirror M3 for changing the direction of the condensed light are provided in this order.

The illumination light Q that has passed through the condenser lens 23 is made to be a spherical-wave by the condenser lens 23. The illumination light Q is condensed so that the condensing point (the virtual point light source, the center point of the spherical-wave) is substantially located on the surface of the object 3. The illumination light Q is reflected on the surface of or inside the object 3, and the reflected light thereof becomes the object light O spreading like a spherical-wave. The object light O is incident on the photo-detector 4 while spreading. Each of the finally emitted illumination light Q and reference light R needs only to be a light having a condensing point, and therefore a spherical-wave-like light is usable for such a light and may be generated using the lenses 22, 25 without using highly precise condenser lenses 23, 26. The spherical-wave-like light has a condensing point.

The reference light R that has passed through the condenser lens 26 becomes an off-axis spherical-wave by the condenser lens 26. The condensing point (virtual point light source) of the reference light R is set in the vicinity of the condensing point of the illumination light Q. The fact that "the reference light R is off-axis" means, for example, that the condensing point of the reference light R and the condensing point of the object light O or the condensing point of the illumination light Q corresponding to the condensing point of the object light O do not overlap, upon being seen from anywhere on the light receiving surface of the photo-detector 4. The micro mirror M3 formed small is arranged at the position of the condensing point of the reference light R. The reference light R is reflected by the micro mirror M3, becomes a spherical-wave, and then enters into the photo-detector 4. The object light O and the reference light R mutually form interference fringes on the light receiving surface of the photo-detector 4. The data of the object light O and the data of the reference light R are acquired with the photo-detector 4 as an object light hologram $I_{OR}$, which is an off-axis hologram of interference fringes, and are stored by the computer 5.

Figure 5:
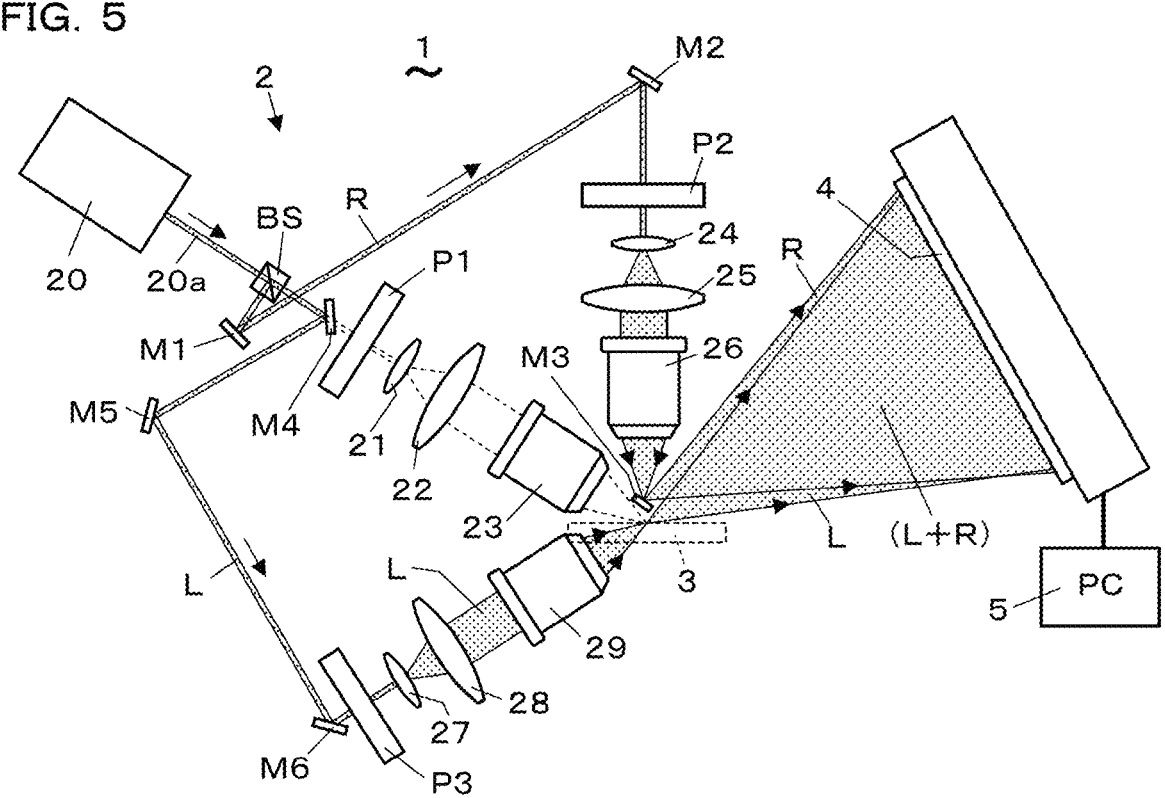
FIG. 5 is a side view explaining acquisition of an hologram of an in-line spherical-wave reference light by the device.

In addition, as shown in FIG. 5, the ellipsometry device 1 can be equipped with a configuration for generating and propagating the in-line spherical-wave reference light L. The optical system for the reference light L comprises a mirror M4 inserted between the beam splitter BS and the polarizer P1, mirrors M5, M6 for reflecting the light from the mirror M4, a polarizer P3, lenses 27, 28 for enlarging the light beam diameter, and a condenser lens 29 for condensing the light from the lens 28 in this order. When the optical system for the reference light L is set, the object 3 is removed.

The optical system for the reference light L has a configuration as if the optical system for the illumination light Q is arranged at the mirror image position with respect to the surface (reflective surface) of the object 3. The in-line spherical-wave reference light L has a condensing point at the position of the condensing point of the illumination light Q (or the mirror image point of the condensing point of the illumination light Q with respect to the surface of the object 3). The fact that "the in-line spherical-wave reference light L is in-line" means, for example, that the condensing point of the spherical-wave reference light L and the condensing point of the object light O or the condensing point of the illumination light Q corresponding to the condensing point of the object light O are in a geometrical arrangement that they appear in a line on the normal line of the light receiving surface of the photo-detector 4 in an optical sense.

The in-line spherical-wave reference light L is a reference light for acquiring and storing the data of the reference light R as a reference light hologram ($I_{LR}$) which is an off-axis hologram. The in-line spherical-wave reference light L has a role of a standard light in digital processing of hologram data. The in-line spherical-wave reference light L is used to generate the complex amplitude in-line hologram $J_{OL}$ which is a hologram not containing the data of the reference light R. The in-line spherical-wave reference light L can be written by a mathematical expression and used for digital processing by determining the position of the condensing point and the wavelength or the frequency according to its characteristic as a spherical-wave.

Information on the position of the condensing point of the in-line spherical-wave reference light L (the distance from the hologram plane) is obtained by illuminating an object such as a scale board having a known dimension pattern using the in-line spherical-wave reference light L as an illumination light and acquiring an image of the scale as a scale hologram $I_{SR}$. When reconstructing an image of the scale board from the scale hologram $I_{SR}$, the distance from the hologram plane to the condensing point of the reference light L is used as a parameter. A value of the parameter, which can reproduce the reconstructed image in a full-scale size, is the distance to the condensing point of the reference light L. The size of the reconstructed image on an image reconstructing plane can be measured by the known pixel pitch of the photo-detector (for example, CCD).

The ellipsometry device 1 is provided with a polarization setting unit for setting the polarization state of the light propagating on the light path from the laser 20 to the photo-detector 4. The polarization setting unit sets the polarization state of light so that each of the object light hologram $I_{OR}$ and the reference light hologram $I_{LR}$ is acquired and stored as a separable hologram into a p-polarized light hologram and an s-polarized light hologram. The polarization setting unit includes polarizers P1, P2, P3. The polarizers P1, P2, P3 adjust and set the illumination light Q, the reference lights R, L, respectively, to the linearly polarized light inclined by 45° with respect to the plane of incidence, for example. The polarizers P1, P2, P3 set p- and s-polarization state with respect to the light in the parallel light state. When the parallel light, in which the p- and s-polarization state is set, is made into a non-parallel light, for example, a spherical-wave-like light or a spherical-wave light, a change occurs in the p- and s-polarization state, but the change is practically negligible or can be dealt with by correction processing or the like at the time of calculation processing.

Figure 6:
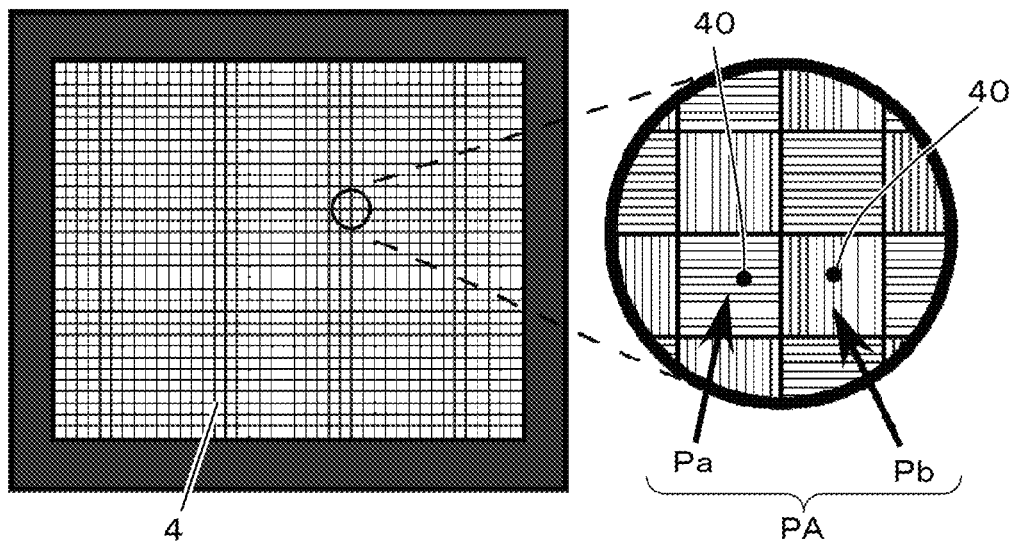
FIG. 6 is a plan view of a photo-detector used for the device.

As shown in FIG. 6, the photo-detector 4 is configured by arranging pixels 40 of CCD in a two-dimensional array. Each pixel is an optical sensor. The photo-detector 4 has polarizers Pa, Pb for setting the polarization state of light received by the photo-detector 4 on the front face of the optical sensor for each pixel 40 of the CCD. The multiple polarizers Pa, Pb are two-dimensionally arranged alternately to constitute a polarizer array PA. Polarizers Pa, Pb of adjacent pixels 40 have polarization axes orthogonal to each other so that adjacent pixels 40 receive differently polarized light. The polarizer Pa and the polarizer Pb are polarizers, respectively, transmitting p-polarized light (κ=p) and s-polarized light (κ=s), for example.

The polarizer array PA is the polarization setting unit arranged on the front face of the photo-detector 4. The polarizer array PA sets the polarization state of light received by the photo-detector 4 so that each of the object light hologram $I_{OR}$ and the reference light hologram $I_{LR}$ is acquired and stored as a separable hologram into a p-polarization hologram and an s-polarization hologram. Since the photo-detector 4 is equipped with the polarizer Pa for p-polarized light or the polarizer Pb for s-polarized light for each pixel, the light incident on the photo-detector 4 is separated into p-polarized light and s-polarized light, and a hologram, which is separable into each polarization state κ (κ=p, s), can be acquired by one-shot light receiving.

That is, according to the photo-detector 4 having the polarizer array PA on the front surface, digital data of a hologram can be acquired separably into a p-polarization hologram and an s-polarization hologram. For example, the data of the object light hologram $I_{OR}$ is acquired by the photo-detector 4, and the obtained data is separated in a post-processing into two groups, namely, data of pixels receiving p-polarized light and data of pixels receiving s-polarized light, and it is possible to generate an object light hologram $I^p_{OR}$ of p-polarization and an object light hologram $I^s_{OR}$ of s-polarization separately.

When a CCD having the polarizer array PA is used as the photo-detector 4, one-shot record of the data of the holograms formed by p-polarized light and s-polarized light can be carried out simultaneously. By simultaneously recording the holograms of p- and s-polarization, the data on the polarization state of light required can be instantaneously recorded without using a rotating polarizer or a photoelastic modulator in a conventional spectroscopic ellipsometer.

In the case of not using the photo-detector 4 such as a CCD with a polarizer attached to each pixel, the p-polarization hologram and the s-polarization hologram can be separately acquired by the photo-detector 4 having no polarizer for each pixel by switching the polarization of the laser light using the polarizers P1, P2 on the respective light paths of the illumination light Q and the reference light R. In this case, upon acquiring each hologram of p- and s-polarization sequentially, it is necessary to eliminate the factor for noise generation such as external vibration or the like exerted on the reference light R and the illumination light Q so that each of the reference light R and the illumination light Q propagate through the same path.

(Polarizer and Polarization)

When the illumination light Q (incident light) is reflected by the object 3 and then the object light O (reflected light) is generated, a change occurs between the polarization state of the incident light and the polarization state of the reflected light due to the influence of the object 3. Ellipsometry measures the change of the polarization state between the incident light and the reflected light, and uses it for polarization analysis. The dielectric characteristic of the reflective object can be known from the change in the polarization state before and after reflection. The change of the polarization state is obtained as a dimensionless quantity of the ratio of amplitude reflection coefficients $r_p$, $r_s$ for each of p- and s-polarization.

In order to obtain the amplitude reflection coefficients $r_p$, $r_s$ based on the hologram which records interference of light, the ellipsometry method and the ellipsometry device 1 use the illumination light Q and the reference lights R, L which are, for example, linearly polarized lights having no phase difference between the p- and s-polarized lights. The polarizers P1, P2, P3 on the light path are used to set these lights in the state of linearly polarized light. For example, using the polarizer P1, an illumination light polarization coefficient $\xi_Q = S^s(u, v)/S^p(u, v)$ can be set as 1, or can be set as other values.

The micro mirror M3, for reflecting the reference light R after passing through the polarizer P2, induces a phase difference between the p-polarized light and the s-polarized light. Therefore, in order to remove the component of the reference light R from the hologram, the information of the in-line spherical-wave reference light L is used. The interference of light occurs between the lights with same polarization state like between the p-polarized reference light R and the p-polarized object light O, and between the s-polarized reference light R and the s-polarized object light O.

(Hologram Data and Processing)

Hologram data and its processing are explained based on mathematical expressions. The hologram involves the off-axis reference light R, the in-line spherical-wave reference light L, the object light O, and the like. Here, xyz right hand rectangular coordinate system is supposed. The origin of the coordinate system is set at the center of the light receiving surface (hologram plane) of the photo-detector 4, the x and y axes are set in the light receiving surface, and the z axis is in a direction opposite to a direction that the light enters the light receiving surface. The direction of the normal rising from the light receiving surface is the positive direction of the z axis, and the x axis is in the plane of incidence. The object light O(x, y, t), the off-axis reference light R(x, y, t), and the in-line spherical-wave reference light L(x, y, t) are denoted by following equations (1) to (3), respectively, in a general form using the position coordinates (x, y). Those lights are coherent lights of angular frequency ω. The coefficients, arguments, subscripts, etc. in each expression are interpreted as general expressions and meanings. In each of the following equations, the explicit indication of the position coordinates (x, y, z), the spatial frequencies (u, v, w), the polarization state (κ=p, s), and the like are appropriately omitted.

$$O(x,y,t) = O_0(x,y) \exp[i(\phi_O(x,y) - \omega t)] \quad (1)$$

$$R(x,y,t) = R_0(x,y) \exp[i(\phi_R(x,y) - \omega t)] \quad (2)$$

$$L(x,y,t) = L_0(x,y) \exp[i(\phi_L(x,y) - \omega t)] \quad (3)$$

The light intensity $I_{OR}$ (x, y) of a combined light produced by O(x, y, t) and R(x, y, t), and the light intensity $I_{LR}$ (x, y) of a combined light produced by L(x, y, t) and R(x, y, t), are denoted by following equations (4) and (5), respectively. Those light intensities $I_{OR}$ and $I_{LR}$ are acquired as hologram data through the photo-detector 4.

$$I_{OR}(x,y) = O_0^2 + R_0^2 + O_0 R_0 \exp[i(\phi_O - \phi_R)] + O_0 R_0 \exp[-i(\phi_O - \phi_R)] \quad (4)$$

$$I_{LR}(x,y) = L_0^2 + R_0^2 + L_0 R_0 \exp[i(\phi_L - \phi_R)] + L_0 R_0 \exp[-i(\phi_L - \phi_R)] \quad (5)$$

In above equations (4) and (5), the first term on the right-hand side is a light intensity component of the object light O or the in-line spherical-wave reference light L, and the second term is a light intensity component of the off-axis reference light R. The third term and the fourth term of each equation are a direct image component and a conjugate image component which are produced by modulation of the object light O or the in-line spherical-wave reference light L with the off-axis reference light R, respectively.

The direct image component of the third term is a term containing required information on the object light O or the reference light L, namely, $O_0 \exp(i\varphi_O)$ or $L_0 \exp(i\varphi_L)$ of above equations (1) or (3), respectively. In the direct image component of the third term, the phase portion $[i\varphi_O]$ or $[i\varphi_L]$ of the object light O or the reference light L is the same as the phase portion $[i\varphi_O]$ or $[i\varphi_L]$ of above equation (1) or (3) defining those lights, respectively. On the other hand the fourth term is called a conjugate image component, because the phase portion $[-i\varphi_O]$ or $[-i\varphi_L]$ of the object light O or the reference light L is a complex conjugate of the phase portion $[i\varphi_O]$ or $[i\varphi_L]$ of above equations (1) or (3) defining those lights.

By using the off-axis reference light R, a hologram can be acquired, and when the hologram is expressed in the spatial frequency space, the direct image component (the third term) can be separated from the light intensity components (the first and second terms) and the conjugate image component (the fourth term) by the off-axis effect. By applying spatial frequency filtering and extracting only the third term of above equations (4) and (5), an object light complex amplitude hologram $J_{OR}$ in which the object light O is recorded and a complex amplitude hologram $J_{LR}$ in which the in-line spherical-wave reference light L is recorded, are obtained as shown by following equations (6) and (7), respectively. Those complex amplitude holograms are holograms containing the component of the off-axis reference light R.

$$J_{OR}(x,y)=O_0(x,y)R_0(x,y)\exp[i(\phi_O(x,y)-\phi_R(x,y))] \quad (6)$$

$$J_{LR}(x,y)=L_0(x,y)R_0(x,y)\exp[i(\phi_L(x,y)-\phi_R(x,y))] \quad (7)$$

The spatial frequency filtering is performed by Fourier transform which changes each of above equations (4) and (5) into a spatial frequency space expression, filtering with a bandpass filter, and subsequent inverse Fourier transform. In addition, if the pixels in the photo-detector 4 are supposed to be in two-dimensional arrangement with a pixel pitch d, the maximum spatial frequency of a hologram which can be recorded using the photo-detector 4 is spatial frequency fs=1/d.

By dividing above equation (6) by equation (7), amplitude $R_0$ and phase $\phi R$ of the off-axis reference light R can be removed from equation (6). This process is a process of subtracting the phase, that is, a process which performs frequency transform, and is a process of heterodyne modulation. As a result, the complex amplitude in-line hologram $J_{OL}$ of the object light O with respect to the in-line spherical-wave reference light L is obtained as shown by following equation (8).

$$J_{OL}(x,y)=(O_0(x,y)/L_0(x,y))\exp[i(\phi_O(x,y)-\phi_L(x,y))] \quad (8)$$

In the ellipsometry device 1, the processing of above equation (8) can be performed using one hologram $I_{LR}$ common to those holograms $I_{OR}$ acquired with a fixed arrangement of the illumination light Q, the reference light R, and the photo-detector 4 for any case that the holograms $I_{OR}$ are acquired by changing the measurement position sequentially by moving the object 3 as a sample or by replacing the object 3 to acquire a large number of holograms $I_{OR}$. That is, with respect to the in-line spherical-wave reference light L, it is sufficient to record it in one off-axis hologram $I_{LR}$ and just to create one complex amplitude hologram $J_{LR}$. With respect to the object light O, by merely acquiring each off-axis hologram $I_{OR}$ for each object light O from different object 3 or different positions on the same object 3, the complex amplitude off-axis hologram $J_{OR}$ for each object light O can be calculated as shown in above equation (6). Further, the complex amplitude in-line hologram $J_{OL}$ of above equation (8) can be calculated using one complex amplitude hologram $J_{LR}$ shown in above equation (7).

By multiplying equation (8) by $L_0(x, y)\exp(i(\phi_L(x, y))$, the component of the in-line spherical-wave reference light L can be removed from above equation (8), and a hologram containing only the light wave of the object light O is obtained. The term of hologram is used in the meaning that it contains all the data necessary for reconstructing the light wave. The amplitude $L_0(x, y)$ of the in-line spherical-wave reference light L can be regarded as a constant value and it can be left behind. Since the amplitude $L_0(x, y)$ may be canceled by the division process between p- and s-polarization, so it does not significantly influence the result of the ellipsometry. Since the reference light L is a spherical-wave, the phase component $\exp(i(\phi_L(x, y))$ can be easily obtained in a functional form by obtaining the position of the condensing point from the photo-detector 4.

By multiplying equation (8) by $L_0(x, y)\exp(i(\phi_L(x, y))$, amplitude modulation by the amplitude factor $L_0(x, y)$ and heterodyne modulation by the phase factor $\exp i(\phi_L(x, y))$ are performed, and a light wave hologram g(x, y) representing the light wave of the object light O at the surface of the photo-detector 4 (the hologram plane, the xy plane, or the plane z=0) is obtained as shown by following equation (9). The step of generating the light wave hologram g (x, y) is a step of reconstructing the object light O. The object light O can be viewed as an image by displaying the absolute square value $|g(x, y)|^2$ of the light wave hologram g(x, y) on the display.

$$g(x,y)=O_0(x,y)\exp[i(\phi_O(x,y))] \quad (9)$$

(Plane Wave Expansion of Object Light)

A plane wave is an exact solution of the Helmholtz equation on electromagnetic waves. A light wave of the object light O can be expanded using plane waves of exact solution. The plane wave expansion is executed by performing Fourier transform on the light wave hologram g(x, y) of above equation (9). That is, the Fourier transform is the plane wave expansion. As a result of the plane wave expansion, a spatial frequency spectrum G(u, v) for the object light O is obtained as shown by following equation (10). The spatial frequency spectrum G(u, v) is a complex amplitude of a plane wave having a wave number vector (u, v) and is also called a complex amplitude G(u, v).

$$G(u,v)=\iint g(x,y)\exp[-i2\pi(ux+vy)]dxdy \quad (10)$$

The arguments u, v in above equation (10) are the Fourier spatial frequencies in x direction and y direction, respectively. The Fourier spatial frequency ω in z direction is obtained, as shown in following equation (11), from the dispersion equation of a plane wave (relation of the wave number and the wavelength). The dispersion equation contains the refractive index n in the form of $(n/\lambda)^2$. The following equation (11) shows the case of n=1, and λ is the wavelength of the light.

$$w(u,v)=\sqrt{1/\lambda^2-u^2-v^2} \quad (11)$$

(Light Wave Transform by Coordinate Rotation)

Next, the rotation of the hologram plane is described with reference to FIG. 7 and FIG. 8. In the reflection coefficient calculation step (S6) of FIG. 1 of the 1st embodiment, the amplitude reflection coefficient ratio ρ(u, v) is obtained in the coordinate system on the hologram plane. By expressing the amplitude reflection coefficient ratio ρ as ρ=tan ψ·exp (iΔ), ellipsometric angles ψ(u, v) and Δ(u, v) are obtained on the hologram plane. In the following, how to obtain the amplitude reflection coefficient ratio ρ etc. in the coordinate system on the plane parallel to the surface of the object 3 is described.

Figure 7:
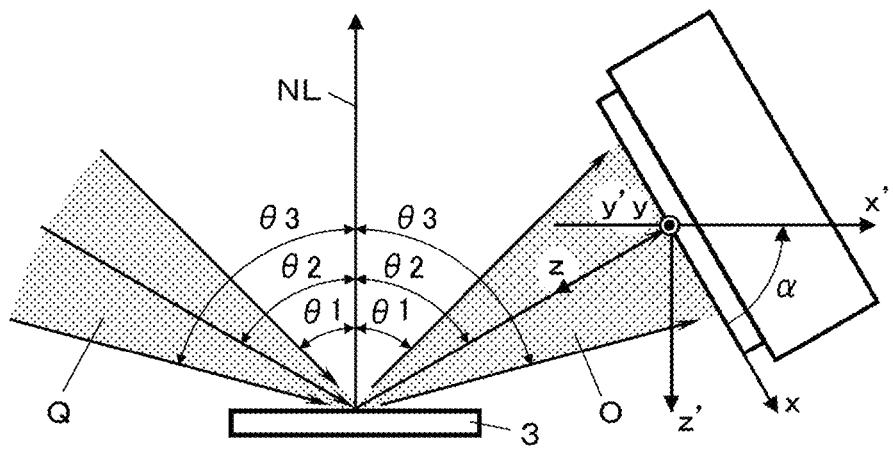
FIG. 7 is a side view explaining the spatial relationship of a reflective surface of the object and a light receiving surface (hologram plane) of a photo-detector.

As shown in FIG. 7, when the illumination light Q, that is, the incident light, which has a condensing point substantially on the surface of the object 3, is incident on the surface, the object light O, which is a reflected light thereof, is emitted in the shape of a spherical-wave from the object 3. This situation corresponds to the method of the one-point intensive measurement. The illumination light Q having such a condensing point is a collection of lights having a large number of mutually nonparallel wavenumber vectors, and enters the object 3 in a cone shape. FIG. 7 shows a cross section along a typical plane of incidence of the illumination light Q, which contains, for example, a wave vector of the optical axis light of the illumination light Q, and shows incident lights and reflected lights, which have arbitrary wave vectors contained in the cross section, namely, the plane of incidence in the ellipsometry. The illumination light Q and its reflected light (the object light O) generally contain other large number of lights, which are not shown in FIG. 7 and are incident on from one side of the cross section, and after reflected, propagate to the other side thereof, and those lights are used for ellipsometry as light groups of the same incident angle.

The object light O propagates in the direction opposite to the z axis direction and is incident on the light receiving surface (z=0) of the photo-detector 4. For example, it is assumed that the object 3 has a thin film laminated on the surface thereof, and the upper and lower surfaces of the thin film are planar. The object light O is considered to be reflected light of the illumination light Q. Lights having incident angles such as θ1, θ2 (angles between the normal line NL standing on the surface of the object 3 and the light rays) included in the illumination light Q become reflected lights having reflection angles θ1, θ2, respectively, and the set of those reflected lights serves as the object light O.

Here, with respect to the xyz coordinate system on the light receiving surface of the photo-detector 4, an x'y'z' right hand rectangular coordinate system is supposed, which is composed of an x'y' plane parallel to the surface of the object 3 (reflective surface) and a z' axis perpendicular to the x'y' plane. The origins of both coordinate systems and y and y' axes are made to coincide. The inclination angle of the x'y' plane with respect to the xy plane is represented by an angle α. That is, the surface of the object 3 and the hologram plane face each other at an angle α, and the y axis is parallel (sic) to the optical axes on both surface and plane.

The spatial frequency spectrum G (u, v) of above equation (10) is a complex amplitude of a plane wave, on the hologram plane (xy plane, z=0 plane), having a wave vector (u, v) defined in the xyz coordinate system. As shown in FIG. 8, the complex amplitude G(u, v) is transformed into a complex amplitude H(u', v') of a plane wave, on a x'y' plane parallel to the surface of the object 3, having a wave vector (u', v') defined in the x'y'z' coordinate system. The complex amplitude H(u', v') is expressed by following equation (12) using the complex amplitude G(u, v). J(u', v') is a Jacobian represented by following equation (13). The Jacobian is to satisfy energy conservation of light wave before and after coordinate rotation transform. Also, w' is obtained as a function w'=w'(u', v') of u', v' by above equation (11).

$$H(u', v') = G(u' \cos \alpha + w' \sin \alpha, v')|J(u', v')| \quad (12)$$

$$J(u', v') = \cos \alpha + \frac{u'}{w'} \sin \alpha \quad (13)$$

As described above, by performing Fourier transform on the object light g(x, y) on the hologram plane, the object light is separated for each wave number vector, and the complex amplitude G(x, y) of the plane wave having the individual wave vector (u, v) is obtained. Further, H(u', v') is obtained from G(u, v) by the rotation transform of above equation (12). The complex amplitude H(u', v') is a plane wave component contained in the object light O and is a plane wave having a wave vector (u', v') defined on the basis of x'y' coordinates parallel to the surface of the object 3 Similarly, an illumination light spatial frequency spectrum $T^K(u', v')$ defined in the (u', v', w') space is obtained by rotationally transforming the illumination light spatial frequency spectrum $S^K(u, v)$.

(Method for Determining the Angle α)

In order to perform the above-mentioned coordinate rotation, the value of the angle α, which is made by the surface of the object 3 (for example, a substrate plane having a thin film layer) and the light receiving surface (hologram plane) of the photo-detector 4, must be accurately measured or set. The angle α can be obtained with high accuracy, on the basis of a large amount of hologram data as described below, by processing for obtaining measured values of ellipsometric angles ψ, Δ according to ellipsometry method using a flat plate substrate as a measurement sample (object 3) whose refractive index n is accurately known.

A flat substrate without a thin film has Brewster angle $θ_g$ at which the reflection coefficient $r_p$ for p-polarized light becomes zero. The Brewster angle $θ_B$ is expressed as $θ_B = \tan^{-1} n$ using the refractive index n of the flat substrate. For an incident angle θ coinciding with the Brewster angle $θ_B$, it becomes ψ=0, and the value of Δ changes discontinuously from −180° to 0° with respect to the change in the incident angle before and after the Brewster angle $θ_B$. By using an illumination light Q, which includes the Brewster angle $θ_B$ and angles before and after that as the incident angle θ, the hologram data for deriving measured values of the ellipsometric angle ψ, Δ are acquired in a domain including the singular point, i.e., the zero point of ψ and the discontinuous point of Δ, where each of ψ, Δ changes sensitively.

The dependences of ψ and Δ on the incident angle θ to a flat substrate of known physical property values can be obtained as calculated value curves by calculation. Therefore, values of ψ and Δ are derived by calculation using the angle α as a parameter, and hologram data for the flat substrate, for example, the glass BK7 plate by changing the parameter value, namely the angle α, and when the derived values coincide with the calculated value curves, the parameter value at that time is determined as the angle α.

(Measurement Method of the Refractive Index n)

Conversely, if the refractive index n is used as an unknown parameter instead of the angle α, the unknown refractive index n of the object 3 (a bulk substrate or a thin film on a bulk substrate) can be measured with high accuracy under the known angle α. For example, the refractive index n can be measured by the following procedure. An angle α formed between the surface of the object and the hologram plane is acquired. The object light hologram $I_{OR}$ is acquired by Illuminating the object 3 with the illumination light Q in a state including the Brewster angle $θ_B$ of the object 3 in the incident angle. By using the angle α formed between the surface of the object and the hologram plane, each of the object light spatial frequency spectra $G^K(u, v)$, κ=p, s of p- and s-polarization and the illumination light spatial frequency spectra $S^K(u, v)$, κ=p, s of p- and s-polarization is transformed into an expression on a plane parallel to the surface of the object 3 by the coordinate rotation transform, and the amplitude reflection coefficient ratio ρ is obtained.

From the amplitude reflection coefficient ratio ρ, the ellipsometric angles ψ, Δ for polarization analysis are acquired for a plurality of incident angles θ included in the illumination light Q. Fitting of the ellipsometric angles ψ, Δ are carried out with model curves, which have the incident angle θ as a variable and the refractive index n of the object 3 reflecting the illumination light Q as a parameter. The measured value of the refractive index n is obtained as the parameter n which realizes the optimal fitting.

(Polarization Analysis Using the Plane Wave Expansion)

Here, polarization state κ=p, s is newly introduced to each light appearing in the ellipsometry method and ellipsometry device 1 (illumination light Q, reference light R, L, object light O by abbreviated notation) again. The polarization state κ of the light, based on the xz plane or the x'z' plane (that is, the plane of incidence in ellipsometry) shown in FIG. 7, is classified into the p-polarization (κ=p) in which the oscillating direction of the electric field of light is parallel to the plane of incidence, and the s-polarization (κ=s) in which the oscillating direction of the electric field of light is perpendicular to the plane of incidence. The polarization state is indicated by superscripts or subscripts κ, p, s attached to each symbol.

The data of each of the object light hologram $I_{OR}$ and the reference light hologram $I_{LR}$ is acquired separately into p-polarized light hologram and an s-polarized light hologram, for example, using the photo-detector 4 of FIG. 6, and those data are separated into p-polarization data and s-polarization data, respectively. Thereby, the object light holograms $I^K_{OR}$, κ=p, s of p- and s-polarization and the reference light holograms $I^K_{LR}$, κ=p, s of p- and s-polarization are obtained. By using the data of the off-axis holograms separated for each polarization state κ=p, s, the object light complex amplitude holograms $J^K_{OR}$, the reference light complex amplitude holograms $J^K_{LR}$, the complex amplitude in-line holograms $J^K_{OL}$, and the light wave holograms $g^K(x, y)$ separated for each polarization state κ=p, s are obtained.

Further, the spatial frequency spectrum $G^K(u, v)$ or the complex amplitude $G^K(u, v)$ of alias name and the spatial frequency spectrum $H^K(u', v')$ or the complex amplitude $H^K(u', v')$ of alias name, which are separated for each polarization state κ=p, s, are obtained. For the illumination light Q as the incident light, the illumination light spatial frequency spectrum $S^K(u, v)$ or the complex amplitude $S^K(u, v)$ of alias name and the spatial frequency spectrum $T^K(u', v')$ or the complex amplitude $T^K(u', v')$ of alias name, which are separated for each polarization state κ=p, s, are obtained.

The ellipsometric angle ψ, Δ obtained by ellipsometry (polarization analysis) are, as shown in following equation (14), defined as angles representing an amplitude factor and a phase factor of the reflection coefficient ratio $\rho=r_p/r_s$ expressed with a polar coordinate, respectively, wherein the reflection coefficient ratio $\rho=r_p/r_s$ is a ratio of the amplitude reflection coefficient $r_p$ for before-and-after reflection of the p-polarized light reflection to the amplitude reflection coefficient $r_s$ for before-and-after reflection of the s-polarized light reflection. As shown by following equations (15), (16), the amplitude reflection coefficient ratio ρ is rewritten, based on the definition of the amplitude reflection coefficients $r_p$, $r_s$, by using the complex amplitude $H^K(u', v')$ of the reflected light and the complex amplitude $T^K(u', v')$ of the incident light, like following equation (17). The complex amplitude $T^K(u', v')$ of the incident light is obtained by the coordinate rotation of the illumination light spatial frequency spectrum $S^K(u, v)$ derived based on the known information of the polarization state of the illumination light Q. With this coordinate rotation, the illumination light polarization coefficient $\xi_Q=S^s/S^p$ is expressed by $\xi_Q=T^s/T^p$. The illumination light polarization coefficient $\xi_Q$ is invariant to the coordinate rotation, and is $\xi_Q=S^s/S^p=T^s/T^p$.

$$\rho(u', v') = \frac{r_p(u', v')}{r_s(u', v')} = \tan\Psi(u', v')\exp(i\Delta(u', v')) \quad (14)$$

$$r_p = H^p(u', v')/T^p(u', v') \quad (15)$$

$$r_s = H^s(u', v')/T^s(u', v') \quad (16)$$

$$\rho(u', v') = \tan\Psi(u', v')\exp(i\Delta(u', v')) = \frac{H^p(u', v')/T^p(u', v')}{H^s(u', v')/T^s(u', v')} \quad (17)$$

Above equation (17) becomes following equation (18) using the illumination light polarization coefficient $\xi_Q=T^s(u', v')/T^p(u', v')$.

$$\rho(u', v') = \tan\Psi(u', v')\exp(i\Delta(u', v')) = \xi_Q \frac{H^p(u', v')}{H^s(u', v')} \quad (18)$$

Here, a method is described which makes it possible not to use the data of the complex amplitudes $T^p$, $T^s$ of the illumination light Q by setting the polarization state of the illumination light Q to a specific known state. The illumination light Q, which is incident light to the object 3, is normally set to be linearly polarized light. This is done by adjusting the polarizer P1 of the optical system 2 in FIG. 3. In the case where the illumination light Q is linearly polarized light having a polarization plane of angle χ with respect to the plane of incident, the illumination light polarization coefficient $\xi_Q$ is determined only by the angle χ. The amplitude reflection coefficient ratio ρ can be calculated using the complex amplitudes $H^p$, $H^s$ and the angle χ of the object light O by making the illumination light Q linearly polarized.

When the polarizer P1 is used to transform the illumination light Q into an oblique polarization with an angle χ=45°, the amplitude and phase distribution of the p-polarization component and the s-polarization component of the illumination light Q become equal to each other, and the complex amplitudes $T^p(u', v')$, $T^s(u', v')$ coincide. That is, $\xi_Q=T^s/T^p=1$. Therefore, in the case of using the illumination light Q with 45° oblique polarization, the amplitude reflection coefficient ratio ρ is calculated only using the complex amplitudes HP(u', v'), $H^s(u', v')$ for the object light O without using the data of the complex amplitudes $T^p(u', v')$, $T^s(u', v')$ for the illumination light Q.

The spatial frequency (u v') in above equations (14) to (18) is a wave vector of a plane wave and corresponds to an incident angle θ expressed by following equation (16). This incident angle θ is an incident angle on the surface (x'y' plane) of the object 3, although no dash mark is attached thereto. And bellow, the incident angle to the surface (x'y' plane) of the object 3 is indicated without a dash. The same incident angles θ or the different incident angles θ correspond to mutually different wave number vectors (u', v'). That is, since the illumination light Q is incident on the reflective surface in a cone shape, a plurality of sets (u', v') can correspond to one incidence angle θ (see FIG. 7). The amplitude reflection coefficients $r_p(u', v')$, $r_s(u', v')$ are obtained as a function of the incident angle θ. Therefore, the ellipsometric angles ψ, Δ reflecting the dielectric properties of the object 3 can be expressed by functions ψ=ψ(θ), Δ=Δ(θ) of the incident angle θ, or functions ψ=ψ(u', v'), Δ=Δ(u', v') (see, for example, FIG. 31 and FIG. 32).

$$\sin\theta = \lambda\sqrt{(u')^2+(v')^2} \quad (19)$$

As described above, from above equation (17) or (18), the ellipsometric angles ψ, Δ are obtained for each wave vector (u', v') corresponding to the incident angle θ to the object 3.

Many complex amplitudes $H^K(u', v')$, $T^K(u', v')$ having wave vectors $(u', v')$ of different values are contained in the illumination light Q and the object light O which are spherical-wave like or nonparallel. In the ellipsometry method and the ellipsometry device 1 of the present embodiment, an object light hologram $I_{OR}$ is used to derive a large number of complex amplitudes $H^K(u', v')$ having different wave vectors $(u', v')$. The object light hologram $I_{OR}$ can be acquired by one-shot in which the wavelength and polarization state of light are fixed to one condition. In other words, according to the present embodiment, by performing the one-point intensive measurement in which the condensing point of the illumination light Q is located on the surface of the object 3, it is possible to acquire the ellipsometric angles $\psi$, $\Delta$ for a number of different incident angles $\theta$ from the one-shot object light hologram $I_{OR}$, and also data of a plurality of measured values for each incident angle $\theta$ can be obtained simultaneously with a large number of samples.

(Modification of the Ellipsometry Device)

Figure 9:
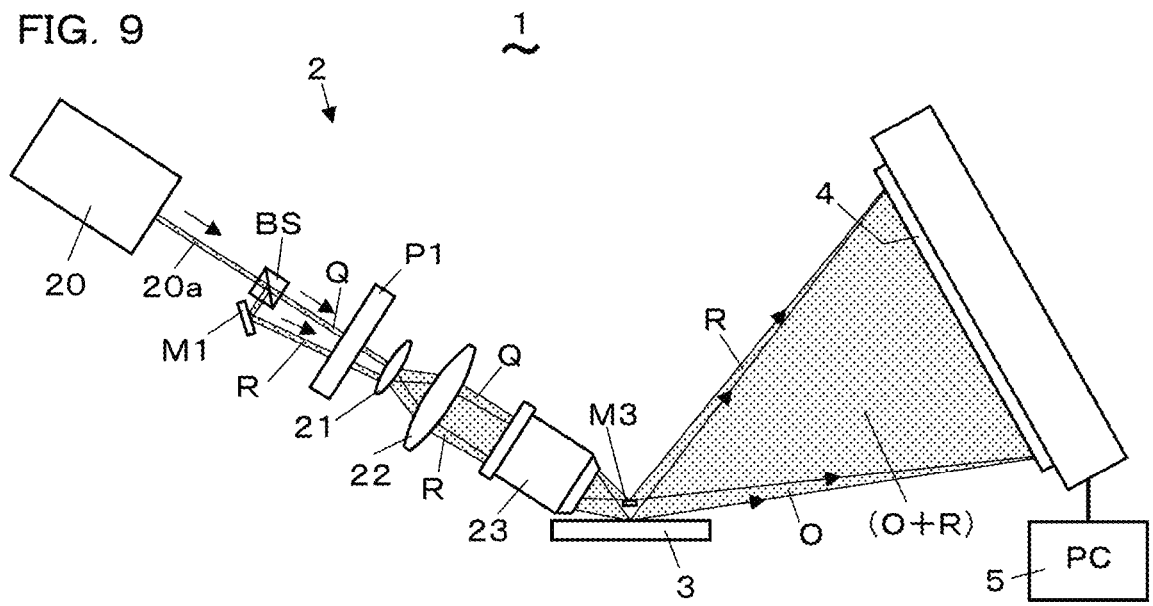
FIG. 9 is a side view showing a modification of the device.
Figure 10:
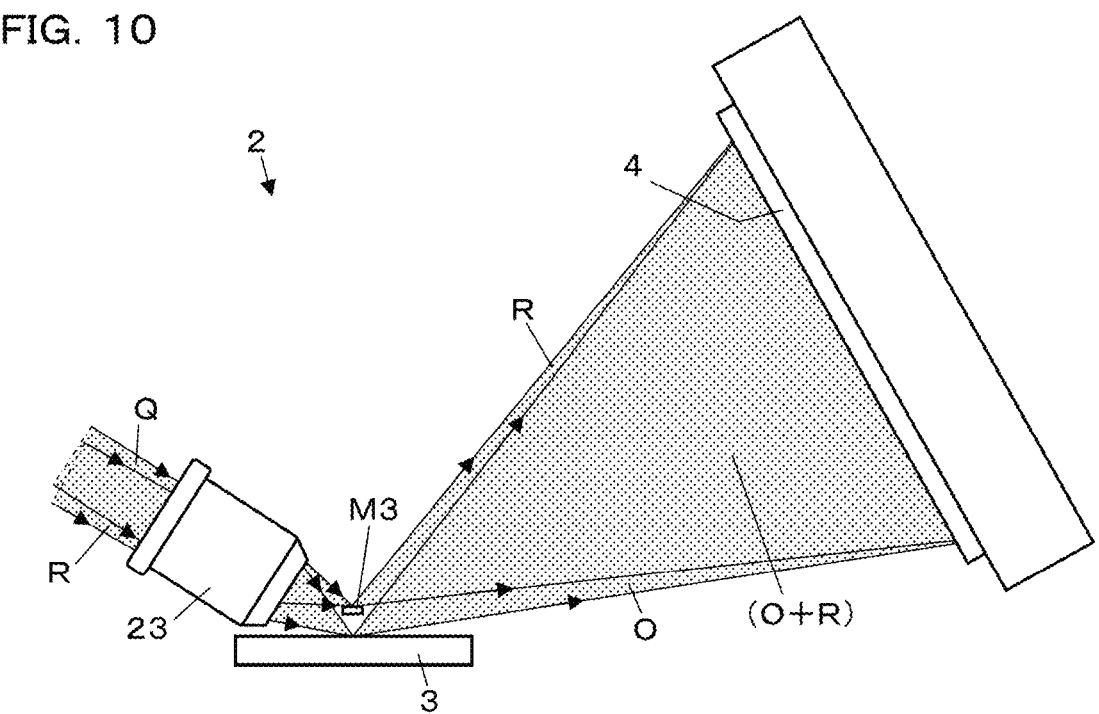
FIG. 10 is a principal part detail view of FIG. 9.
Figure 11:
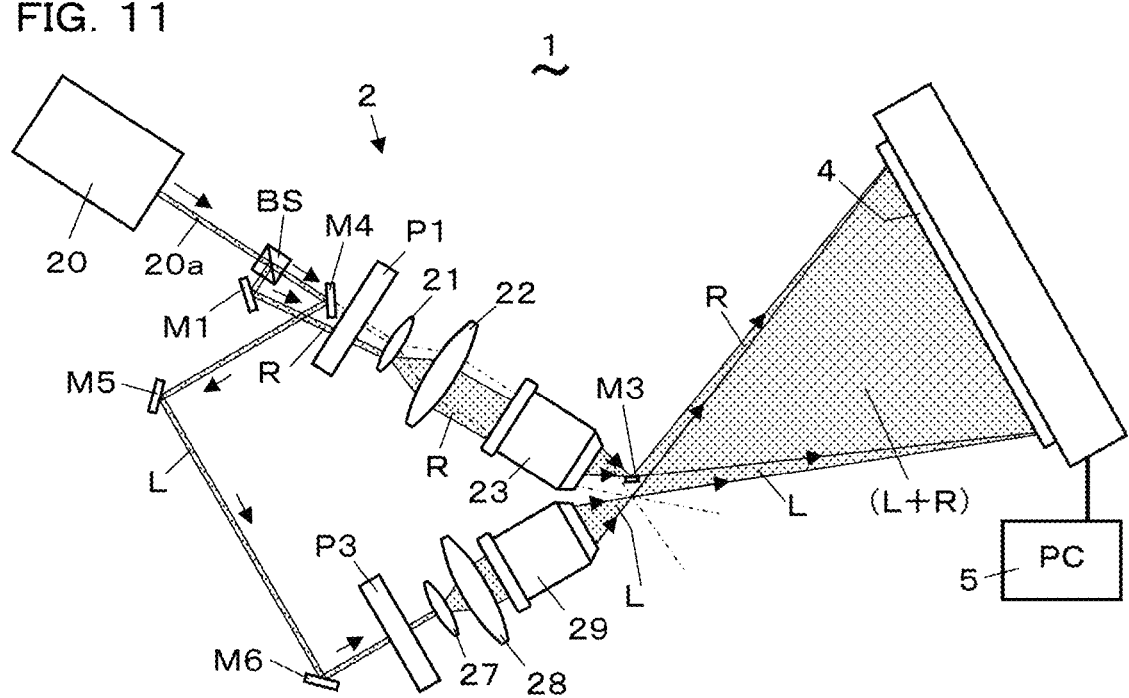
FIG. 11 is a side view explaining acquisition of an hologram of an in-line spherical-wave reference light by the modification.

FIG. 9, FIG. 10, and FIG. 11 show modifications of the ellipsometry device 1. In the ellipsometry device 1 of this modification, regarding the optical elements other than the mirror M1 and the micro mirror M3 in the optical system for the reference light R in the ellipsometry device 1 shown in FIG. 3, FIG. 4, and FIG. 5, the optical elements for the illumination light Q are shared. That is, the reference light R propagates through the polarizer P1, the lenses 21, 22, and the condenser lens 23 which are the optical elements for the illumination light Q, instead of the mirror M2, the polarizer P2, the lenses 24, 25, and the condenser lens 26 of FIG. 3.

The coherent light 20a from the laser 20 is branched by the beam splitter BS, reflected by the mirror M1, obliquely incident on the light path for the illumination light Q, and propagates as the reference light R. The reference light R emitted from the condenser lens 23 is reflected by the micro mirror M3, for example, at the position of its condensing point, and is directed toward the photo-detector 4. The optical system for propagating the in-line spherical-wave reference light L for acquiring the reference light hologram $I_{LR}$ is the same as the optical system for the reference light L in the ellipsometry device 1 shown in FIG. 5. In the ellipsometry device 1 of this modification, the configuration of the optical system that acquires the object light hologram $I_{OR}$ becomes simple.

The 3rd Embodiment

Figure 12:
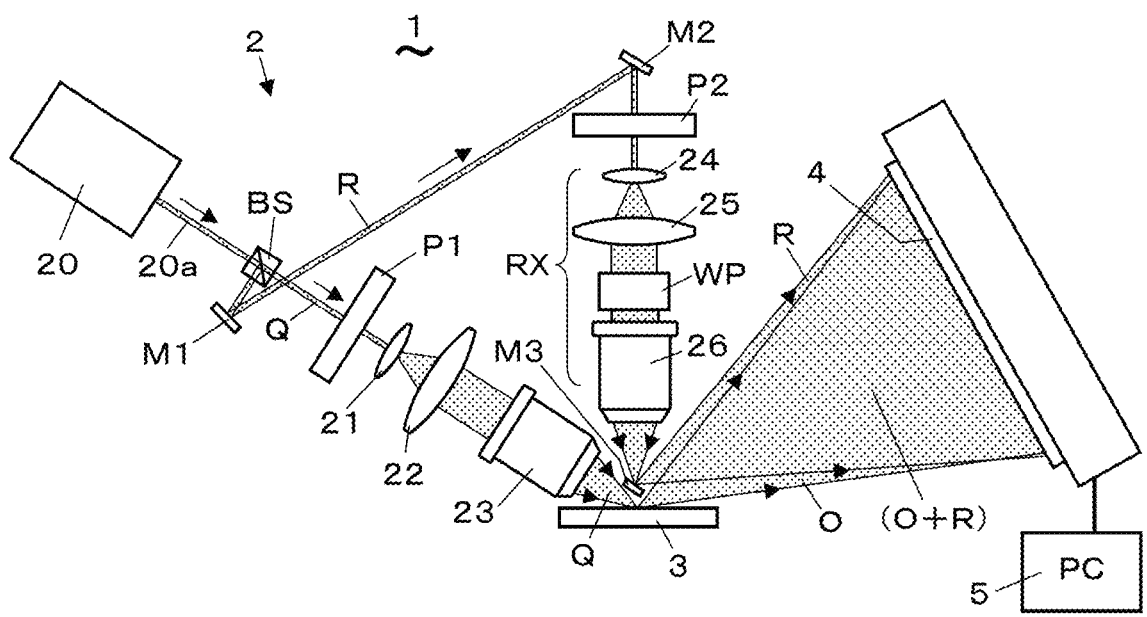
FIG. 12 is a side view showing a schematic construction of an ellipsometry device according to the 3rd embodiment.
Figure 13:
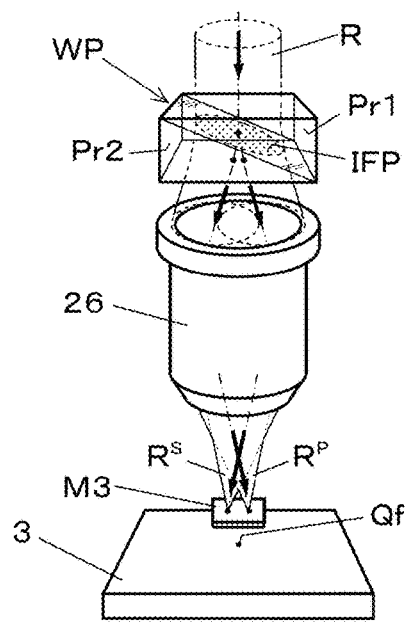
FIG. 13 is a principal part detailed perspective view of FIG. 12.

FIG. 12, FIG. 13, and FIG. 14 show the ellipsometry device 1 according to the 3rd embodiment. In the ellipsometry device 1 of the 3rd embodiment, a normal photo-detector is used which is not equipped with the polarizer array PA (FIG. 6) described in the 2nd embodiment, but nevertheless holograms of p- and s-polarization are recorded not at different time, but at the same time. In this case, the light for reference light R emitted from a light source is divided into a reference light $R^p$ of p-polarization, and a reference light $R^s$ of s-polarization, and condensed at different points using a lens as the off-axis reference light R. The reference lights $R^K$, $\kappa = p, s$ emitted from each of condensing points (virtual light sources) are used as the spherical-wave-like off-axis reference light R.

This 3rd embodiment is based on the principle that the polarized reference light R does not interfere with the object light O in a different polarization state but interferes only with the object light O in the same polarization state. Therefore, holograms of p-polarization and s-polarization can be simultaneously recorded in one hologram by one-shot in a state superimposed on each other. In order to extract the p-polarization hologram and the s-polarization hologram from the one-shot recorded hologram separately, a fact is used that the off-axis reference lights $R^K$, $\kappa = p, s$ of p-polarization and s-polarization are in an off-axis relation by having the condensing points in a mutually different position.

The spatial frequency spectrum of the hologram recorded by using a plurality of reference beams having mutually different condensing point positions appears in different regions in the spatial frequency space corresponding to the respective condensing points. Therefore, by Fourier-transforming the hologram simultaneously recorded using the ellipsometry device 1 of the present embodiment, it is possible to extract each of p- and s-polarization holograms separately for each polarized light. This can be paraphrased as follows. By Fourier transforming the interference fringes and making it the expression in the spatial frequency space, it is possible to express the received light using the wave number vector, and possible to see where each light flew, that is, possible to see the condensing point which is the light source of each light.

The 3rd embodiment is described more specifically. The ellipsometry device 1 shown in FIG. 12 has a Wollaston prism WP on the light path for the reference light R in the ellipsometry device 1 of the 2nd embodiment (FIG. 3, FIG. 4, FIG. 5). The Wollaston prism WP is disposed by insertion arrangement on the light path for the reference beam R, namely, after the lenses 24, 25 for enlarging the beam diameter of the light and before the condenser lens 26 for condensing the light from the lens 25, The lenses 24, 25, the Wollaston prism WP, and the condenser lens 26 on the light path of the reference light R constitute a reference light splitting unit RX for dividing the off-axis reference light R into two lights becoming off-axis mutually, namely, an off-axis reference light $R^p$ of p-polarization and an off-axis reference light $R^s$ of s-polarization. The reference light splitting unit RX divides the off-axis reference light R into the p-polarized light and the s-polarized light using the Wollaston prism WP. The reference light splitting unit RX is a polarization setting unit that functions so that each of the object light hologram $I_{OR}$ and the reference light hologram $I_{LR}$ is acquired as a hologram separable into p- and s-polarization holograms. The ellipsometry device 1 acquires each of the holograms $I_{OR}$, $I_{LR}$ by mutually superimposing the off-axis reference lights $R^K$, $\kappa = p, s$ of p- and s-polarization, which are divided by the reference light splitting unit RX, on the light receiving surface.

Further, unlike the second embodiment, in the ellipsometry device 1 of this embodiment, the photo-detector 4 does not include the polarizer array PA in which a plurality of polarizers Pa and Pb are arranged alternately two-dimensionally. In other words, in order to obtain the object light hologram $I_{OR}$ which is separable into p-polarization hologram and s-polarization hologram, the ellipsometry device 1 of the present embodiment uses the Wollaston prism WP instead of the polarizer array PA. Similarly, the ellipsometry device 1 can obtain the reference light hologram $I_{LR}$ which is separable into p-polarization hologram and s-polarization hologram.

FIG. 13 shows a state in which the micro mirror M3 is viewed from the photo-detector 4. As shown in FIG. 13, the Wollaston prism WP has a joined surface IFP formed by two inclined surfaces of two right angle prisms Pr1, Pr2 whose optical axes are orthogonal to each other, and separates a light passing through the joined surface IFP into two polarized lights of different polarization states based on the difference in refraction angle depending on the polarization direction. The reference light R enters the Wollaston prism WP with its linearly polarized state and is split into a p-polarized reference light RP and an s-polarized reference light RS, they enter the condenser lens 26 and condense, respectively, at positions on the micro mirror M3 distant mutually, i.e., the positions which serve as an off-axis mutually.

The p- and s-polarized reference lights $R^p$, $R^s$ condensed at two points on the micro mirror M3 are reflected by the micro mirror M3 and propagate toward the photo-detector 4 as spherical-wave reference lights emitted from two different point light sources. The illumination light Q is irradiated to the condensing point Qf on the surface of the object 3 below the micro mirror M3. The condensing point Qf of the illumination light Q and the condensing point of the p- and s-polarized reference light $R^p$, $R^s$ are in an off-axis relationship with each other, and when viewed from the photo-detector 4, the three condensing points are arranged at different positions that do not overlap mutually.

The ellipsometry method using the ellipsometry device 1 of the present embodiment is expressed as follows. A hologram of the object light O is acquired as one object light hologram $I_{OR}$ using off-axis reference lights $R^\kappa$, $\kappa=p, s$ which are generated by separating a spherical-wave-like off-axis reference light R into a p-polarized off-axis reference light $R^p$ and an s-polarized off-axis reference light $R^s$ which are off-axis mutually.

A hologram of the in-line spherical-wave reference light L is acquired as one reference light hologram $I_{LR}$ using the p- and s-polarized off-axis reference lights $R^\kappa$, $\kappa=p, s$ as in the case of the object light. Separation of each of the object light hologram $I_{OR}$ and the reference light hologram $I_{LR}$ into p- and s-polarized light holograms is performed by filtering based on the fact that the off-axis reference lights $R^\kappa$, $\kappa=p, s$ of p- and s-polarization are off-axis mutually. That is, as shown in FIG. 14, lights with different condensing points can be filtered and separated from each other.

Figure 14A:
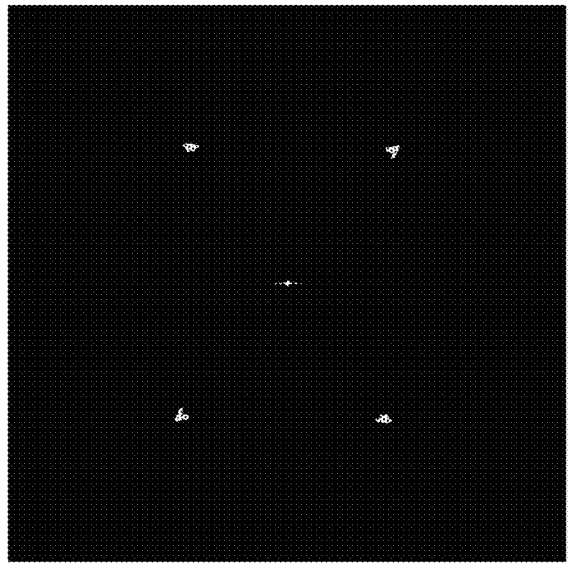
FIG. 14A is a view showing a displayed example of an off-axis hologram of an object light obtained by the device of FIG. 12.
Figure 14B:
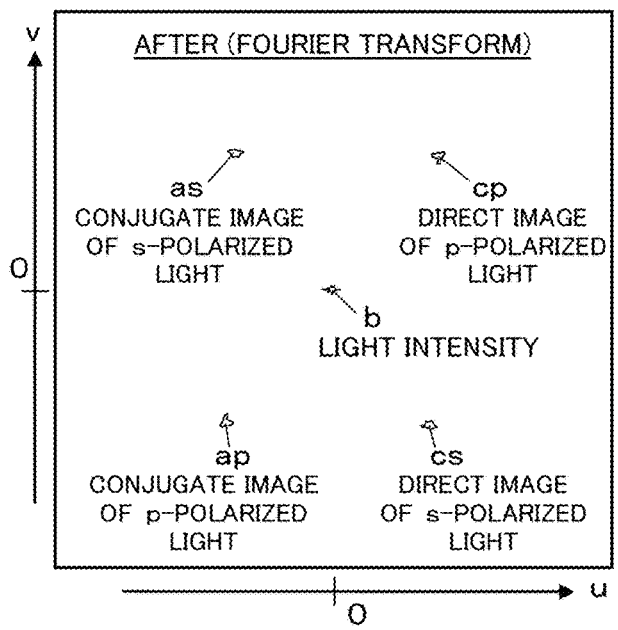
FIG. 14B is a view explaining FIG. 14A.

FIG. 14A and FIG. 14B show conjugate image components ap, as of p- and s-polarized light, a light intensity component b, and direct image components cp, cs of p- and s-polarized light of an off-axis hologram in a spatial frequency space. By applying spatial frequency filtering to hologram in which p- and s-polarized lights are recorded at the same time, the direct image components cp, cs of the p- and s-polarized lights, i.e., the complex amplitude in-line holograms of p- and s-polarized lights can be separate out. By this spatial frequency filtering, not only the conjugate image components and the light intensity component (direct current component) but also stray light recorded in the hologram and noise generated at the time of acquisition are removed.

According to the present embodiment, by acquiring a hologram using the p- and s-polarized reference lights $R^\kappa$, $\kappa=p, s$ of different condensing point positions, it is possible to obtain a hologram which is separable into p- and s-polarized light holograms using usual photo-detector 4 which is not equipped with the polarizer array PA. Moreover, since the polarizer array PA is not used, each of the holograms of p- and s-polarized lights can be recorded using all pixels of the photo-detector 4 in a state both lights are superimposed on each other.

The photo-detector 4 provided with the polarizer array PA is expensive because commercially available models are few, and is insufficient for precise measurement because the extinction ratio of the polarizer array PA is lower than that of a single high performance polarizer by one order. The ellipsometry device 1 of the present embodiment can solve these problems.

The 4th Embodiment

Figure 15:
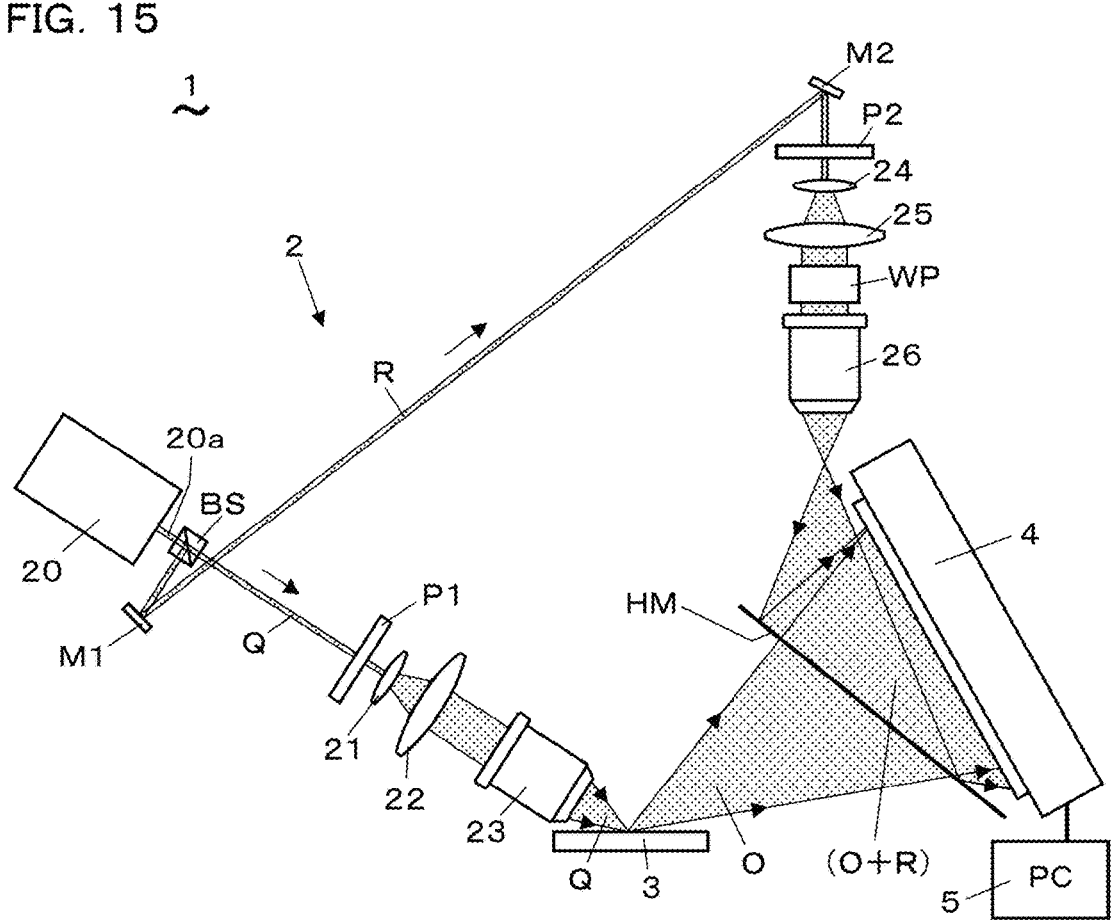
FIG. 15 is a side view showing a schematic construction of an ellipsometry device according to the 4th embodiment.

FIG. 15 shows the ellipsometry device 1 according to the fourth embodiment. The ellipsometry device 1 of this embodiment uses a half mirror HM in place of the micro mirror M3 in the ellipsometry device 1 of the third embodiment described above. The reference light R is reflected by the half mirror HM and is incident on the photo-detector 4. The condensing point of the reference light R and the condensing point of the illumination light Q are geometrically separated, but optically close to each other and in an off-axis relationship. The object light O passes through the half mirror HM and is incident on the photo-detector 4. Similarly to the object light O, the in-line spherical-wave reference light L passes through the half mirror HM and is incident on the photo-detector 4.

According to the ellipsometry device 1 of the present embodiment, as compared with the optical system using the micro mirror M3, the half mirror HM can be separated far from the condensing point of the condenser lens 26 and the position of the condensing point of the illumination light Q, and can be arranged, for example, close to the photo-detector 4. Therefore, the space above the measurement surface of the object 3 can be made large, the design and adjustment of the optical system can be facilitated, and the space for arranging a sample (object 3) can also be made large.

(Modification)

Figure 16:
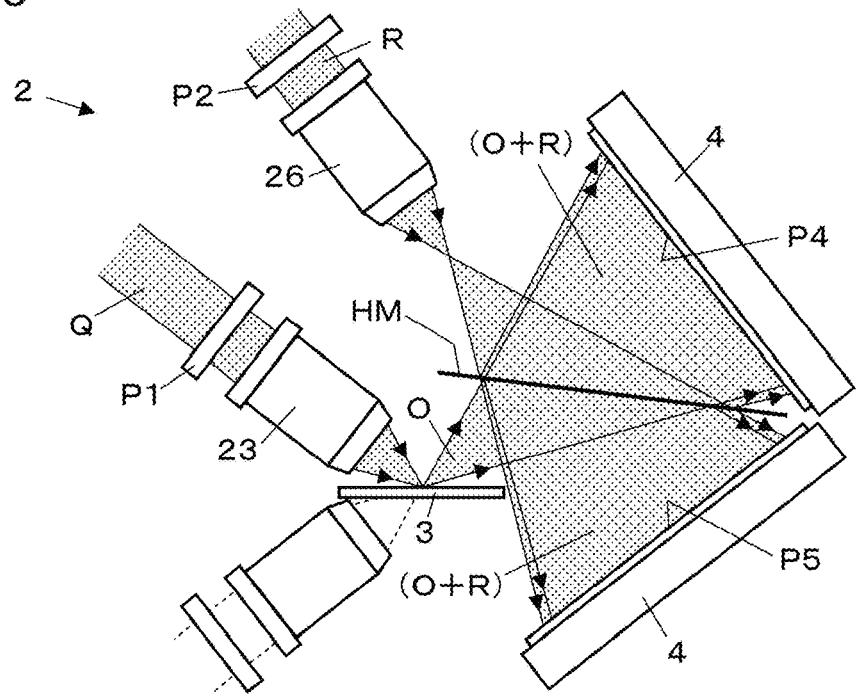
FIG. 16 is a side view showing a modification of the device.

FIG. 16 shows a modification of the ellipsometry device 1 of FIG. 15 using the half mirror HM. The ellipsometry device 1 of this modification does not include the Wollaston prism WP, but includes a photo-detector 4 with a polarizer P4 on the front surface thereof and a photo-detector 4 with a polarizer P5 on the front surface thereof in place of one photo-detector 4. The photo-detector 4 having the polarizer P4 receives the object light O or the in-line spherical-wave reference light L passing through the half mirror HM and the reference light R reflected by the half mirror HM through the polarizer P4. The photo-detector 4 having the polarizer P5 receives the object light O or the in-line spherical-wave reference light L reflected by the half mirror HM and the reference light R transmitted through the half mirror HM through the polarizer P5.

The photo-detector 4 having the polarizer P4, for example, acquires a p-polarized light hologram, and the photo-detector 4 having the polarizer P5, for example, acquires an s-polarized light hologram. According to this modification, it is possible to acquire the hologram in a state of being separated into p- and s-polarized light holograms without using the Wollaston prism WP and the polarizer array PA.

The 5th Embodiment and Modification

Figure 17:
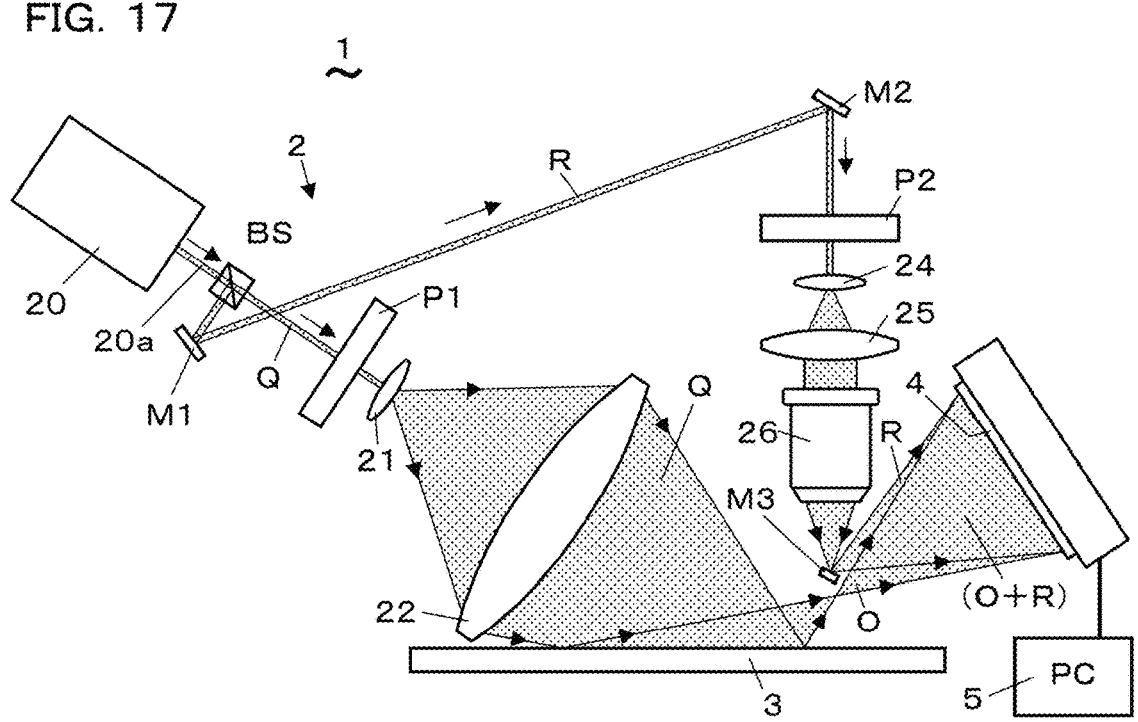
FIG. 17 is a side view showing a schematic construction of an ellipsometry device according to the 5th embodiment.
Figure 18:
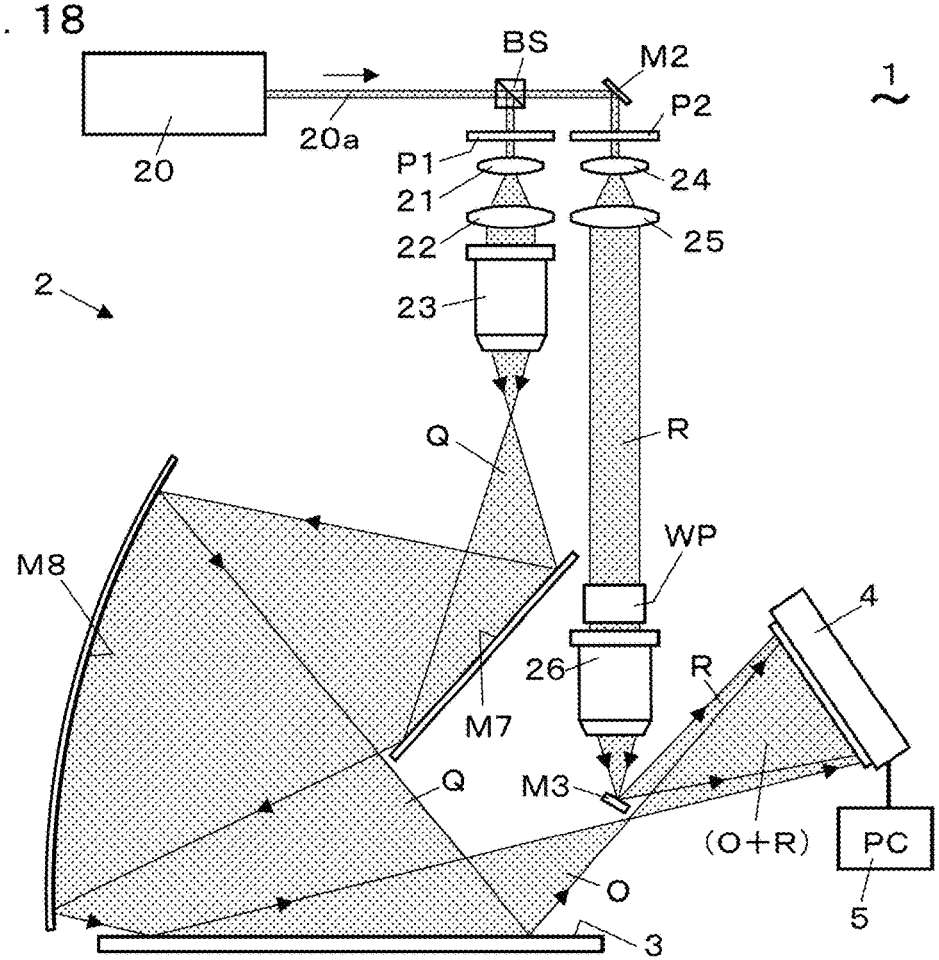
FIG. 18 is a side view showing a modification of the device.

FIG. 17 and FIG. 18 show the ellipsometry device 1 according to the 5th embodiment and a modification thereof. The ellipsometry device 1 shown in FIG. 17 is configured so that the optical system for the illumination light Q can illuminate a wider area than that of the ellipsometry device 1 shown in FIG. 3, FIG. 4, and FIG. 5. This embodiment has a device configuration for implementing the method of the wide range distribution measurement. The illumination light Q is expanded by the lens 21, condensed by the lens 22, and is configured to illuminate the object 3 before the condensing point, and the condenser lens 23 in FIG. 3 is not used. The optical system for the in-line spherical-wave reference light L for acquiring the reference light hologram $I_{LR}$ is configured by arranging the optical system for the illumination light Q at the mirror image position with respect to the surface of the object 3. The in-line spherical-wave reference light L has a condensing point at a position corresponding to the condensing point of the illumination light Q.

The ellipsometry device 1 can acquire the object light hologram $I_{OR}$ for a large area of the object 3. At each point on the object 3 illuminated by the illumination light Q, the each point is illuminated by the illumination light Q with a different incident angle θ, more strictly, with a different wave number vector (u', v'), and therefore each data of the object lights O of each reflection angle θ corresponding to each incident angle θ is acquired by one-shot in one object light hologram $I_{OR}$. In this embodiment, each point on the object 3 is irradiated with the illumination light Q having only one kind of wave number vector (u', v'), and therefore measured values ψ and Δ can be obtained one by one for each point (x', y') of the entire reflection surface. Therefore, it can be suitably used for simple analysis of polarization for a large area.

The modification shown in FIG. 18 has a concave mirror M8 in place of the condenser lens 22 in FIG. 17. The optical system of the illumination light Q includes a beam splitter BS, a polarizer P1, lenses 21, 22 for expanding the light beam diameter, a condenser lens 23 for condensing the light from the magnifying lens 22, a reflecting mirror M7, a concave mirror M8 in this order. The reflecting mirror M7 reflects the illumination light Q, which is emitted from the magnifying lens 22 and condensed by the condenser lens 23, spreading like a spherical-wave toward the concave mirror M8. The concave mirror M8 collects the illumination light Q from the reflecting mirror M7 and illuminates the object 3 in front of the condensing point. Further, on the light path of the reference light R, a Wollaston prism WP is provided in front of the condenser lens 26. Therefore, the photo-detector 4 does not have the polarizer array PA. According to this modification, since the lens 22 for large-diameter light condensing is not used, it is possible to adopt a light-weight configuration which is not affected by an aberration of such lens 22.

The ellipsometry devices 1 according to this embodiment and the modification is applicable to, for example, a high-speed film thickness distribution measurement for a large area thin film. In order to measure the film thickness distribution of thin film, these ellipsometry devices 1 irradiate the thin film with light having a large aperture and record reflected light from the thin film behind the condensing point. The thin film is illuminated with a spherical-wave light, created using a lens, an ellipsoidal mirror or a parabolic mirror having a large aperture, before the condensing point. The light reflected by the thin film is condensed to one point after propagating. The reflected light is recorded by one-shot as a hologram behind the condensing point, and the ellipsometric angles ψ, Δ for polarization analysis can be obtained from the recorded hologram by using a reflective plane wave light having a wave vector different from each other for each point distributed two-dimensionally on the reflective surface.

When a surface of the object 3, for example, a surface of a thin film, is irradiated with a spherical-wave or spherical-wave-like illumination light Q, with avoiding the condensing point of the light, the incident angle differs at each point on the thin film surface. Therefore, the spatial frequency (wavenumber vector) and each point on the thin film distributed over a wide range can be uniquely associated one to one, and the wide range distribution measurement can be performed. Using the polarization state of the plane wave obtained by decomposing the reflected light, that is, the object light, the film thickness can be determined at the measurement point corresponding to the spatial frequency of the plane wave, and then the film thickness distribution and the nonuniformity of the film thickness on the two-dimensional thin film plane can be analyzed.

Further, in the devices shown in FIG. 17 and FIG. 18, the incident angles θ can be collectively changed with respect to each point on the surface of the object 3 by moving the object 3 two-dimensionally along a plane at predetermined intervals so that the position of the surface of the object 3 changes relative to the illumination light Q. Therefore, when a hologram of the object light O is recorded every time the object 3 is moved at the predetermined interval, data for various types of incident angles θ corresponding to the number of recorded holograms are collectively obtained at all points on the reflection surface. In addition, a higher degree of measurement can be achieved by combining the hologram data acquisition for the one-point intensive measurement shown in the 2nd embodiment and the hologram data acquisition for the wide range distribution measurement in this embodiment. For example, by determining measured reference value(s) of optical property value via one point intensive measurement one-time or many-times by moving the object 3, and performing the wide range distribution measurement once, it is possible to observe the variation from the reference value(s) in a wide range. Through these ellipsometry methods, it is possible to accumulate data for analyzing the film thickness distribution, the nonuniformity of the film thickness, etc. over a wider area in a short time, and also it is possible to increase the analysis accuracy using the accumulated data.

The 6th Embodiment

Figure 19:
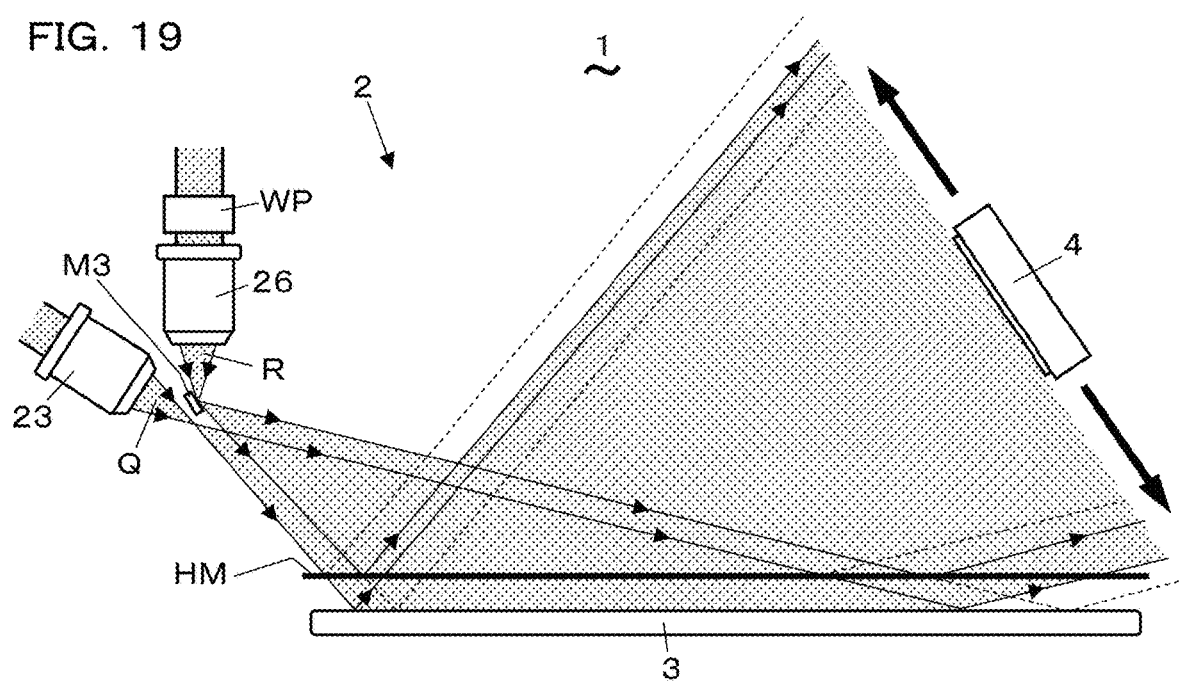
FIG. 19 is a side view showing a schematic construction of an ellipsometry device according to the 6th embodiment.

FIG. 19 shows the ellipsometry device 1 according to the 6th embodiment. This ellipsometry device 1 is the same as the 5th embodiment in that it illuminates a large area of the object 3, but differs from the 5th embodiment in that the condensing point of the illumination light Q is positioned before the object 3. A half mirror HM is arranged near the surface of the object 3, for example, parallel to the surface thereof. The photo-detector 4 is disposed at a position to receive the object light O, that is, the reflected light of the illumination light Q.

The illumination light Q is, for example, 45° linearly polarized light. The reference light R is, similarly to the 3rd embodiment (see FIG. 13), divided using the Wollaston prism WP and the condenser lens 26 so that the p- and s-polarized lights (the reference lights $R^K$, κ=p, s) condense in different positions on the micro mirror M3 so as to be in an off-axis relationship mutually.

The illumination light Q exits from the condenser lens 23 and forms a condensing point, propagates while spreading, a part of which is reflected by the half mirror HM, and the other part passes through the half mirror HM and Illuminates the object 3. The object light O is emitted from the object surface illuminated with the illumination light Q, passes through the half mirror HM, and propagates toward the photo-detector 4 while spreading without forming a condensing point.

The reference light R is condensed and reflected at the position of the micro mirror M3 arranged close to the condensing point of the illumination light Q and is reflected and propagates toward the object 3 while spreading like the illumination light Q, and a part of it is reflected by the half mirror HM, propagates toward the photo-detector 4 while spreading like the object light O. The half mirror HM is provided to allow the reference light R, not reflected by the object 3, to enter the photo-detector 4.

Since the object light O and the reference light R going to the photo-detector 4 propagate while spreading greatly, in order to receive all required lights emitted from the measuring surface of the object 3, it is necessary to change the position of the photo-detector 4, using a moving mechanism for example, and to acquire a hologram at each position. In place of the moving mechanism and the photo-detector 4, two or more photo-detectors 4 fixedly arranged or a photo-detector 4 of big acceptance surface may be used.

In order to record a hologram with a large numerical aperture and a narrower spatial frequency band, the reference light R and the illumination light Q are propagated in the direction for illuminating the object 3 from three condensing points close to each other (two of them are for the reference lights R divided into p- and s-polarized lights). A light reflected by the half mirror HM, a light reflected by the surface of the object 3, and a light multiply-reflected by the half mirror HM and the surface of the object 3 for each of the reference light R and the illumination light Q are incident on the photo-detector 4.

The interference fringes due to those lights are recorded in the acquired object light off-axis hologram $I_{OR}$. By applying frequency filtering to the data of the hologram $I_{OR}$, for example, the components only of the interference fringes between each of the off-axis reference lights $R^p$ and $R^s$ once reflected by the half mirror HM and the object light O made of the illumination light Q once reflected by the surface of the object 3 can be separated and taken out.

According to the ellipsometry device 1 of the present embodiment, the lens 22 and the concave mirror M8 having a large aperture in the 5th embodiment and its modification are unnecessary. The ellipsometry device 1 of the present embodiment is suitable for high-speed measurement of, for example, a large-diameter thin film sample. However, in order to record a large diameter hologram, it is necessary to provide a large diameter light receiving device in which the photo-detectors 4 are two-dimensionally arranged or to provide a driving mechanism for two-dimensionally moving the photo-detectors 4.

The 7th Embodiment

Figure 20A:
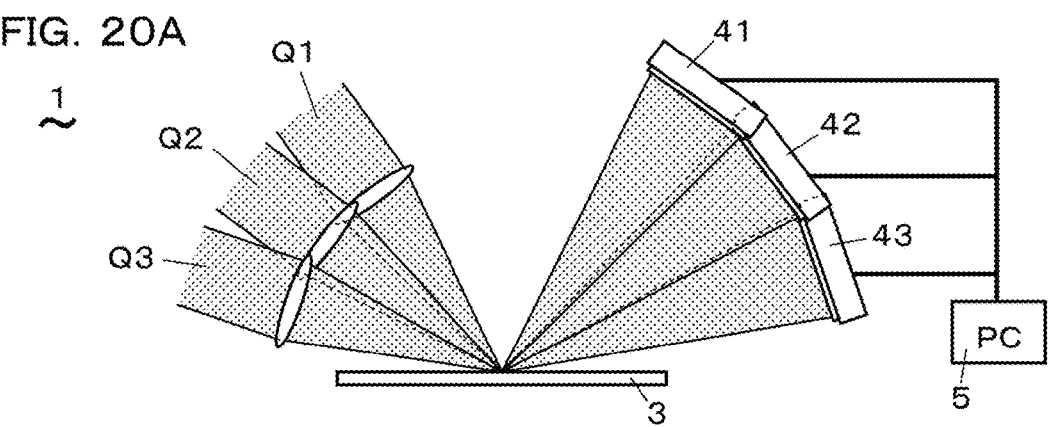
FIG. 20A is a side view showing a schematic construction of an ellipsometry device according to the 7th embodiment and FIG. 20B is a top view of FIG. 20A.
Figure 20B:
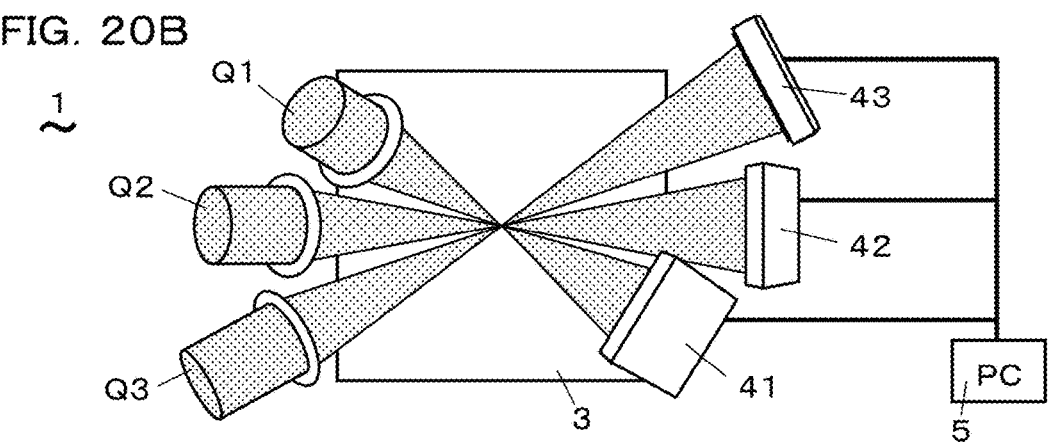

FIG. 20A and FIG. 20B show the ellipsometry device 1 according to the 7th embodiment. The ellipsometry device 1 includes an illumination optical system for emitting a plurality of (three in the present embodiment) illumination lights Q1, Q2, and Q3, and photo-detectors 41, 42, and 43 corresponding to each of the illumination lights in the illumination optical system. The off-axis reference lights R and the in-line spherical-wave reference lights L also have optical systems corresponding to the illumination optical system. For example, those optical systems are configured to simultaneously record wide angle reflected light under wide angle incidence angle for a specific region of the object 3. When, for example, various samples having a wide range of refractive index values are successively measured, it is possible to rapidly record by performing simultaneous one-shot recording of holograms for each sample using such a plurality of illumination lights.

The 8th Embodiment

Figure 21:
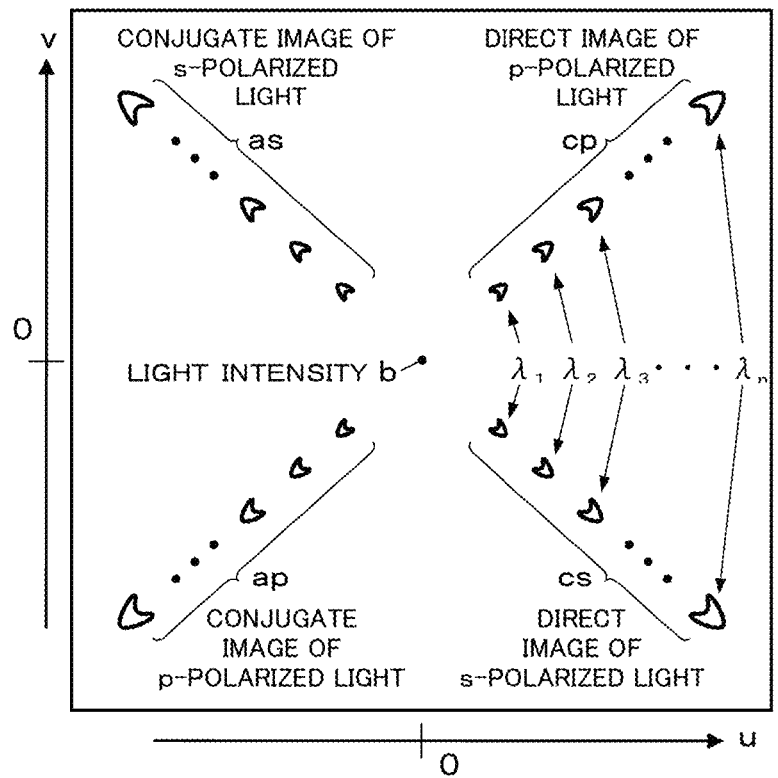
FIG. 21 is a diagram explaining an off-axis hologram of object lights obtained by an ellipsometry method and device according to the 8th embodiment.

FIG. 21 shows an example of an off-axis hologram of object light obtained by the ellipsometry method and the ellipsometry device according to the 8th embodiment. In this ellipsometry method and device, acquisition of an object light hologram $I_{OR}$ is performed by one-shot simultaneously using a plurality of coherent lights having different wavelengths, and similarly, acquisition of a reference light hologram $I_{LR}$ is performed by one-shot simultaneously using the plurality of coherent lights having the different wavelengths.

The ellipsometry device 1 used in this method may be, for example, the ellipsometry device 1 described in the 3rd embodiment, however, the laser 20 is a multi-wavelength light source. By using such device and method, the hologram acquired by the illumination light Q and the reference lights R, L having n types of wavelengths $\lambda_1, \lambda_2, \ldots, \lambda_n$ can be separated into each component in the spatial frequency space as shown in FIG. 20 (sic) under the condition that the wavelength intervals are appropriately set. The conjugate image components and the direct image components in the spatial frequency space are separated from each other for each polarization κ=p, s and for each wavelength $\lambda_i$, i=1, 2, . . . , n.

By using the light of plural wavelengths, it is possible to obtain the wavelength dependency, namely, energy dependency, of the ellipsometric angle ψ, Δ. The measurement accuracy can be improved by increasing the number of measurement points by such measurement. Further, in measurement by single wavelength light, there is a problem of uncertainty due to the periodicity of polarization characteristics, whereas according to the method and device of the present embodiment, this problem can be avoided and measured value can be certainly determined. In the conventional method, for example, the wavelength dependence n=n(λ) of the refractive index n is modeled and used. However, according to this method and device, the wavelength dependence n=n(λ) itself can be obtained as a measured value.

The 9th Embodiment

Figure 22:
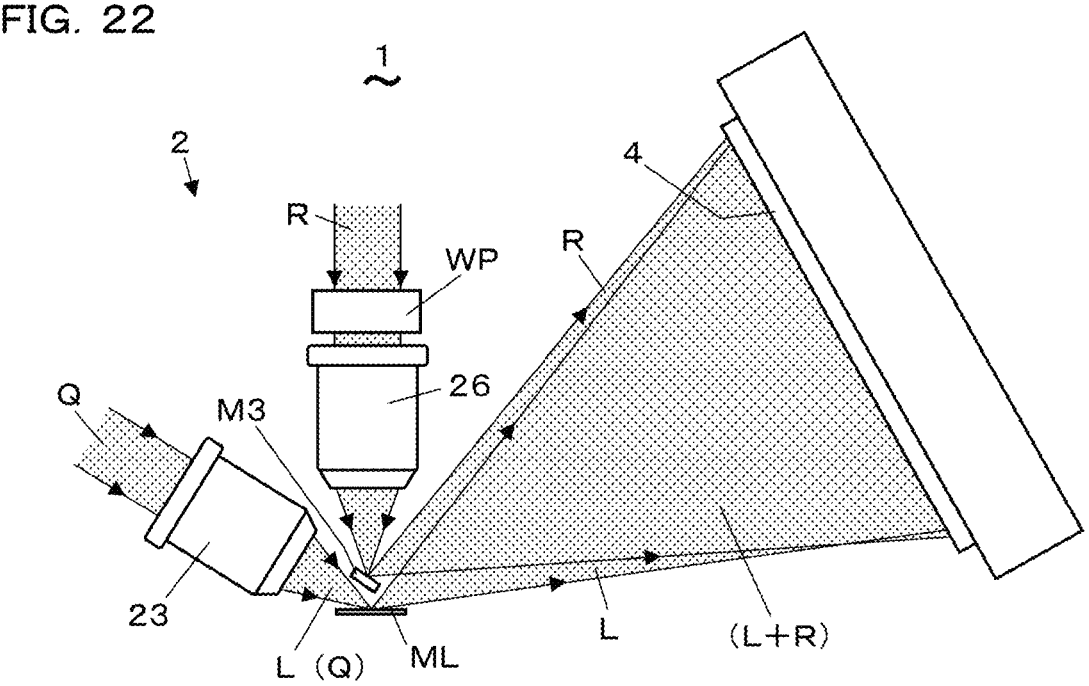
FIG. 22 is a side view showing a schematic construction of an ellipsometry device used for an ellipsometry method according to the 9th embodiment.

FIG. 22 shows the ellipsometry device used for the ellipsometry method according to the 9th embodiment. The present embodiment relates to the ellipsometry method and the ellipsometry device 1 which use the illumination light Q as the in-line spherical-wave reference light L. The optical system for generating and propagating the in-line spherical-wave reference light L shown in FIG. 5 of the 1st embodiment and in FIG. 11 of the modification thereof spreads spatially, so it is desired to make it compact, and also since the acquisition frequency of the hologram $I_{LR}$ is low and the operation rate of the optical element is low, so it is desired to improve the operation rate thereof. This embodiment solves those problems.

The optical system 2 of the ellipsometry device 1 shown in FIG. 22 is, for example, a reflecting mirror ML is disposed at the position of the object 3 in the optical system 2 of the ellipsometry device 1 of the 3rd embodiment. In order to obtain the reference light hologram $I_{LR}$ by using the illumination light Q as the in-line spherical-wave reference light L which is a reference light for the hologram data processing, the reflecting mirror ML is disposed at the position of the object 3, and the illumination light Q is reflected toward the photo-detector 4 (hologram plane). In this case, the illumination light Q should be a spherical-wave made using the condenser lens 23 that can function as a reference light. Also, the reflecting mirror is assumed to have known reflection characteristic over polarized light. The reflection characteristic of the reflecting mirror may be known as long as at the time of processing the hologram data.

Acquisition of each hologram is performed by acquiring the object light hologram $I_{OR}$ using a spherical-wave light as the illumination light Q, and by acquiring the reference light hologram $I_{LR}$ using the illumination light Q as the in-line spherical-wave reference light L by reflecting the spherical-wave illumination light Q toward the hologram plane using the reflecting mirror ML whose reflection characteristic with respect to the polarized light is known.

The data of the reflection characteristic of the reflecting mirror ML is used to correct the influence of reflection by the reflecting mirror ML on the in-line spherical-wave reference light L when the amplitude reflection coefficient ratio ρ is calculated. The correction is described below. Here, reflection characteristics of the reflecting mirror ML for each polarization are introduced, namely, amplitude reflection coefficients $r_{m\kappa}$, κ=p, s, and complex amplitudes $H_m^K(u', v')$, κ=p, s which are spatial frequency spectrums of the reference light L reflected by the reflecting mirror ML. The complex amplitudes $H_m^K$ of the reference light L reflected by the reflecting mirror ML is the complex amplitude of the illumination light Q when it is reflected by the reflecting mirror ML.

In the case of using the reference light L reflected by the reflecting mirror ML, the complex amplitudes $H^K(u', v')$, $H_m^K(u', v')$, $T^K(u', v')$, and the amplitude reflection coefficients $r_{mk}$ are involved in the amplitude reflection coefficient ratio ρ as shown in following equations (20), (21), and (22). Those quantities are expressed in a state after rotation transform of the hologram plane to a plane parallel to the surface of the object 3. The complex amplitudes $H^K(u', v')$ and $T^K(u', v')$ are the same as those described in the above equations (15) and (16). The ellipsometry device 1 can be provided with software for performing the correction processing represented by those equations as a correction processing unit.

$$r_{mp}(u', v') = H_m^p(u', v')/T^p(u', v') \qquad (20)$$

$$r_{ms}(u', v') = H_m^s(u', v')/T^s(u', v') \qquad (21)$$

$$\rho(u', v') = \tan\Psi(u', v')\exp(i\Delta(u', v')) = \qquad (22)$$
$$\frac{H^p(u', v')/T^p(u', v')}{H^s(u', v')/T^s(u', v')} = \frac{H^p(u', v')}{H^s(u', v')} \frac{H_m^s(u', v')}{H_m^p(u', v')} \frac{r_{mp}(u', v')}{r_{ms}(u', v')}$$

According to the present embodiment, it is unnecessary to secure a space for generating and propagating the in-line spherical-wave reference light L, in particular, the space behind the object 3 to arrange the optical system, and therefore the optical system 2 of the ellipsometry device 1 can be formed compactly. Further, according to the ellipsometry device 1 of the present embodiment, the optical system for the in-line spherical-wave reference light L can be greatly simplified and the cost can be reduced, since the optical system for generating and propagating the illumination light Q can be used as it is only by providing and arranging the reflecting mirror ML when the reference light hologram $I_{LR}$ is acquired. The configuration using the reflecting mirror ML and the correction processing unit can be applied to the ellipsometry device 1 of other embodiments and modification, for example, the ellipsometry device 1 of FIG. 9 and FIG. 10.

The 10th Embodiment

With reference to FIG. 23 to FIG. 25, the light wave hologram g and the spatial sampling interval δ is described. In the above-described embodiments, the condensing points of the spherical-wave-like illumination light Q and the spherical-wave-like reference light R are close to each other on the front side of the hologram plane. So the interference fringes between the object light O and the reference light R change slowly on the hologram plane, for example, as the bright and dark pattern near the center of the Newton rings. The hologram of interference fringes between spherical-wave-shaped lights, even if which has a large numerical aperture, can be made it's spatial frequency bandwidth narrower than the case between spherical-wave illumination light and aspherical-wave reference light. Here, the numerical aperture NA of the hologram with respect to the object light O is NA=sin ψ, wherein the angle ψ is defined by two lines starting from the virtual point light source of the object light O, namely a line perpendicular to the hologram plane and a line to the peripheral point of the hologram plane.

In the hologram of the interference fringe of the object light O and the reference light R, the spatial frequency bandwidth is made narrow by bringing both condensing points of the spherical-wave-like lights close to each other. If a hologram of the object light O alone is taken out from such a hologram, the spatial frequency bandwidth becomes wider. From this, it is found that the spatial frequency bandwidth of the light wave hologram g(x, y) of above equation (9) expressing the wavefront of the object light O is wider compared with that of the complex amplitude in-line hologram $J_{OL}(x, y)$ of above equation (8).

The spatial change of the light wave hologram g(x, y) becomes larger as going away from the center of the hologram and becomes maximum at the edge of the hologram. Assuming that the numerical aperture of the hologram is NA and the optical wavelength is λ, the maximum spatial frequency $f_M$ of the light wave hologram g(x, y) is expressed by $f_M$=NA/λ. In order to express the light wave hologram g(x, y) of such a broadband by discrete values, because of the constraints of sampling theorem, it is necessary to set the spatial sampling interval δ less than the value $\delta=1/(2f_M)=\lambda/(2NA)$, for example using data interpolation. In order to overcome the constraints of sampling theorem, increase of sampling points and data interpolation are performed. Since the complex amplitude in-line hologram $J_{OL}$ of narrow bandwidth changes slowly with the pixel pitch d of the photo-detector 4, the high speed calculation is possible even if a cubic equation in the data interpolation is used.

Figure 23A:
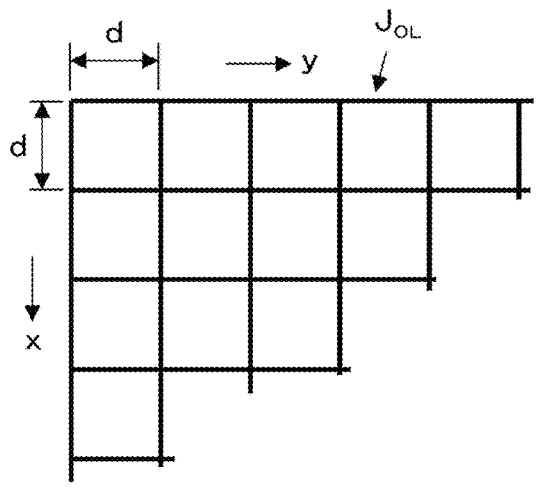
FIG. 23A is a partial view of a hologram which is a target of processing in an ellipsometry method according to the 10th embodiment.
Figure 23B:
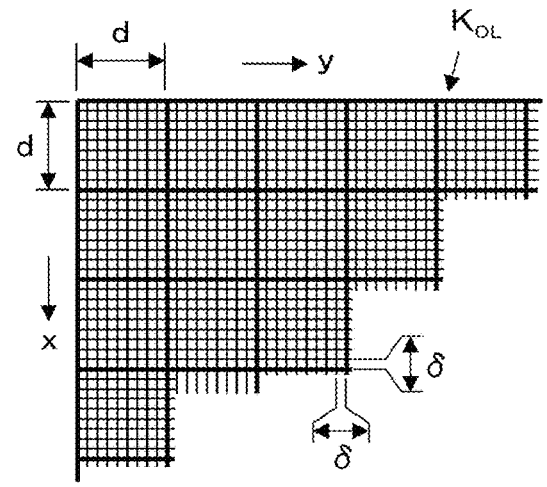
FIG. 23B is a view showing a way to increase spatial sampling points in the hologram of FIG. 23A.

FIG. 23A and FIG. 23B show a method for reducing the spatial sampling interval δ of the hologram using data interpolation in order to obtain the light wave hologram g(x, y). The complex amplitude in-line hologram $J_{OL}$ is obtained without using an imaging lens. Therefore, even if the spatial sampling interval is subdivided and reduced to the extent of the light wavelength, distortion does not occur. Therefore, it is possible to reduce the sampling interval by pixel number increase process for increasing the number of pixels substantially.

In the pixel number increase process, for the complex amplitude in-line hologram $J_{OL}$ which is assumed to have a spatial sampling interval d corresponding to the pixel pitch d of the photo-detector 4, the spatial sampling interval d is subdivided and made to be a spatial sampling interval δ. And then, the data interpolation is performed on every new sampling points generated by the subdividing to increase the number of pixels substantially. In the data interpolation, the 3rd equation or a sinc function commonly known in image processing can be used. If the sinc interpolation is used as the data interpolation, it takes more time for numerical calculation than the interpolation using the 3rd equation, but more accurate results can be obtained.

The result after increasing the number of pixels by the data interpolation for the complex amplitude in-line hologram $J_{OL}$ is defined again as a complex amplitude in-line hologram $J_{OL}$. Note that the pixel pitch d of the photodetector 4 may be different from each other in the pixel arrangement direction (xy direction), and the spatial sampling interval δ may also be different from each other in the pixel arrangement direction. The complex amplitude in-line hologram $J_{OL}$ of increased pixel number becomes a hologram recording an image enlarged without distortion, that is, resolution-enhanced, with enlargement factor d/δ based on the ratio of the pixel pitch d and the spatial sampling interval δ, as compared with the hologram on which the pixel number increase process is not performed.

(High-Speed Processing)

FIG. 24A, FIG. 24B and FIG. 25A, FIG. 25B show a method for processing the light wave hologram g(x, y) at high speed. When processing the hologram data using Fast Fourier Transform (FFT), if the required number of sampling points becomes too large, it becomes difficult to process the light wave hologram g(x, y). By the way, each information recorded in different frequency bands is preserved without being lost even if they are spatially superimposed. Utilizing this fact, it is possible to create a broadband minute hologram (hologram with a small number of data points) by superimposing the light wave hologram g(x, y) which is a broadband large numerical aperture object light. Further, a hologram holds information for reconstructing light waves in each of local regions of the hologram.

Figure 24A:
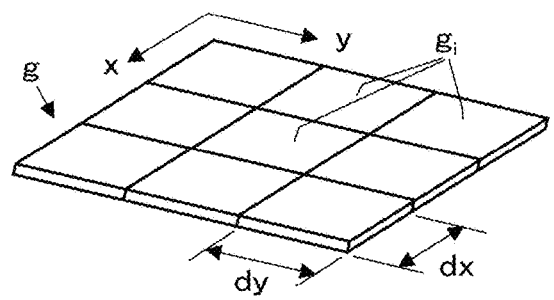
FIG. 24A is a conceptual diagram of a hologram to which a method for processing a hologram at high speed is applied.
Figures 24B, 24C:
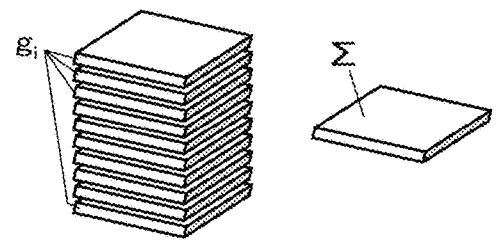
FIG. 24B is a conceptual diagram of the hologram divided and piled.
FIG. 24C is a conceptual diagram of a hologram formed by synthesizing the holograms of FIG. 24B.
Figure 25A:
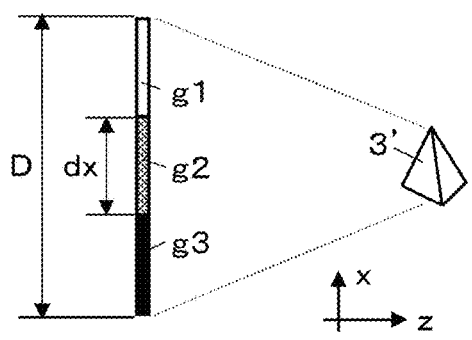
FIG. 25A is a conceptual diagram of a single hologram and a reconstructed image.

Therefore, as shown in FIG. 24A, the light wave hologram g(x, y) is divided into a plurality of minute holograms $g_i$ of width dx, dy, and as shown in FIG. 24B, FIG. 24C, the minute holograms $g_i$ are superimposed on each other to generate a synthetic minute hologram Σ. Computation based on above equation (10) is applied to this synthetic hologram Σ to shorten the calculation time to obtain the complex amplitude G(u, v). FIG. 25A shows how the light wave hologram g(x, y) of width D is divided into minute holograms g1, g2, and g3 of width dx, dy. This light wave hologram g(x, y) reconstructs the light wave (reconstructed image 3') with one piece.

Figure 25B:
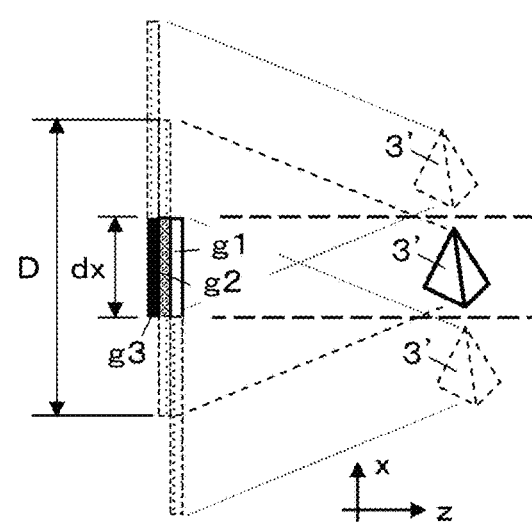
FIG. 25B is a conceptual diagram showing a plurality of holograms for reconstruction and a plurality of reconstructed images for explaining the principle of the method for processing a hologram at high speed.

As shown in FIG. 25B, the hologram superimposed while shifting the light wave hologram g(x, y) by the width dx in the x direction, for example, becomes a periodic hologram having a width dx, and many reconstructed images 3' can be reconstructed at intervals of the width dx. The number of calculation points is compressed to the reciprocal number of the number of overlapped minute holograms $g_i$. That is, when n sheets are stacked, the calculation amount becomes 1/n.

(High-Speed Processing by Discrete Fourier Transform)

Above-mentioned calculation of the complex amplitude G(u, v) is performed by data interpolation after subdivision of the spatial sampling interval, creation of the synthetic minute hologram Σ after division of hologram and superimposition of the divided holograms, and plane wave expansion processing by Fourier transform of the hologram Σ. In this calculation method, it takes calculation time for the sampling interval subdivision, data interpolation, and hologram superimposition. If the complex amplitude G(u, v) can be obtained directly from the minute hologram $g_i$ divided without performing the data interpolation, the calculation speed can be increased.

The spatial frequency of the light wave hologram g represented by above equation (9) becomes higher as going from the center part to the edge. Considering a parallel light $L_i$ irradiated from a focal point $z_L$ of the spherical-wave reference light L toward the center of each divided hologram $g_i$, the angle formed by the object light O and the parallel light $L_i$ is small. When the phase of the collimated light $L_i$ is denoted by $\varphi_i(x, y)$, and the hologram $g_i$ is multiplied by the phase factor $\exp(-\varphi_i)$, the spatial frequency of $g_i \exp(-i\varphi_i)$ becomes low.

As shown in following equation (23), the coordinates (x, y) of the pixel (k, l) in the hologram $g_i$ of N×N pixels is expressed by (x, y)=(kd, ld). Also, as shown in following equation (24), a set of integer values $(m_{iC}, n_{iC})$ is introduced. As a result, as shown in following equation (25), the phase $\varphi_i(k, l)$ at the pixel (k, l) is expressed using the integer values $(m_{iC}, n_{iC})$.

$$x = kd \quad y = ld \tag{23}$$

$$m_{iC} = \text{INT}(\Delta \sin \theta_{ix} / \lambda) \quad n_{iC} = \text{INT}(\Delta \sin \theta_{iy} / \lambda) \tag{24}$$

$$\phi_i(k, l) = 2\pi\left(\frac{m_{iC}k + n_{iC}l}{N}\right) \tag{25}$$

Here, $\theta_x$ and $\theta_y$ represent the incident angles of the parallel light $L_i$ incident on the hologram $g_i$ in the x and y directions, respectively. Each of the values $g_i(k, l)\exp(-i\varphi_i(k, l))$ at the sampling points k=0, 1, 2, ..., N-1 and l=0, 1, 2, ..., N-1, and each of the discrete Fourier transforms $G_i'(m, n)$ thereof are given by following equations (26), (27), respectively.

$$G_i'(m, n) = \tag{26}$$
$$\sum_{k=0}^{N-1}\sum_{l=0}^{N-1}\left\{g_i(k, l)\exp\left[-i2\pi\left(\frac{m_{iC}k + n_{iC}l}{N}\right)\right]\right\}\exp\left[-i2\pi\left(\frac{mk + nl}{N}\right)\right]$$

$$g_i(k, l)\exp\left[-i2\pi\left(\frac{m_{iC}k + n_{iC}l}{N}\right)\right] = \tag{27}$$
$$\frac{1}{N^2}\sum_{m=0}^{N-1}\sum_{n=0}^{N-1}G_i'(m, n)\exp\left[i2\pi\left(\frac{mk + nl}{N}\right)\right]$$

As can be seen from above equation (26), $G_i'(m, n)$ becomes a periodic function of period N with respect to m and n. Since the maximum spatial frequency $f_M$ of $g_i \exp(-i\varphi_i)$, which is a low-spatial frequency function, satisfies an inequality $f_M < 1/(2d)$, the periodic function $g_i \exp(-i\varphi_i)$ can be accurately described using the spatial frequency components $G_i'(m, n)$ in the zones $-N/2 < m < N/2$ and $-N/2 < n < N/2$, according to the sampling theorem. That is, $G_i'(m, n)$ can be obtained as the spatial frequency component of the periodic function $g_i \exp(-i\varphi_i)$. Moreover, $G_i'(m+m_{iC}, n+n_{iC})$ can be obtained from above equation (27) as the spatial frequency component of $g_i$, which is a low-spatial frequency function.

Since the frequency components $G_i'(m+m_{iC}, n+n_{iC})$ of each hologram $g_i$ do not overlap each other, a complex amplitude G of the synthetic minute hologram Σ can be obtained by adding $G_i'(m+m_{iC}, n+n_{iC})$ over a wide frequency band. In this method, the subdivision of the sampling interval and the data interpolation in the hologram are not necessary, so it is possible to calculate the complex amplitude G at high speed.

(Other High-Speed Processing)

When calculating the spatial frequency component $G_i'(m, n)$, the high frequency function $g_i$ was transformed to the low frequency function $g_i \exp(-i\varphi_i)$ in order to satisfy the inequality $f_M < 1/(2d)$. Here, the discrete Fourier transform of following equation (28) for the sampling value $g_i(k, l)$ of the function $g_i$ is considered.

$$G_{i_i'}(m, n) = \sum_{k=0}^{N-1} \sum_{l=0}^{N-1} g_i(k, l) \exp\left[-i2\pi\left(\frac{mk+nl}{N}\right)\right] \quad (28)$$

Since the maximum spatial frequency $f_M$ of the high-frequency function $g_i$ does not satisfy the inequality $f_M < 1/(2d)$, the periodic function $g_i$ can not be accurately described using the spatial frequency components $G_i'(m, n)$ in the zone $-N/2 < m < N/2$ and $-N/2 < n < N/2$. However, as can be seen from above equation (28), $G_i(m, n)$ becomes a periodic function of period N with respect to m and n, and therefore $G_i(m, N) = G_i'(m+m_{ic}, n+n_{ic})$ can be obtained using the periodicity and above equations (26) and (28). Therefore, it becomes possible to accurately express the high-frequency function $g_i$ using the frequency components $G_i(m, n)$ in the zone $m_{ic} - N/2 < m < m_{ic} + N/2$ and $n_{ic} - N/2 < n < n_{ic} + N/2$. Even in the case where the frequency $f_M$ does not satisfy the inequality $f_M < 1/(2d)$, the frequency component $G_i(m, n)$ of the function $g_i$ can be directly obtained using the periodicity of $G_i(m, n)$ and above equation (28). Above equation (28) is simple in comparison with equation (26), and the spatial frequency component can be calculated faster by using equation (28).

(Noise Removal by Frequency Filtering)

With reference to FIG. 26 and FIG. 27, noise removal in the ellipsometry method is described. When the illumination is performed using the spherical-wave illumination light Q, the object light O(x, y, t) becomes a light close to a spherical-wave. Further, the complex amplitude in-line hologram $J_{OL}$ can be regarded as a hologram, of in-line, and of interference fringe between the object light O close to a spherical-wave and the spherical-wave reference light L. Therefore, the spatial frequency bandwidth of the complex amplitude in-line hologram $J_{OL}$ becomes very narrow. On the other hand, the noise generated during the hologram acquisition is distributed over the entire spatial frequency wide bandwidth. By using the difference in spatial frequency distribution between the hologram and the noise, the noise can be removed considerably.

Figure 26A:
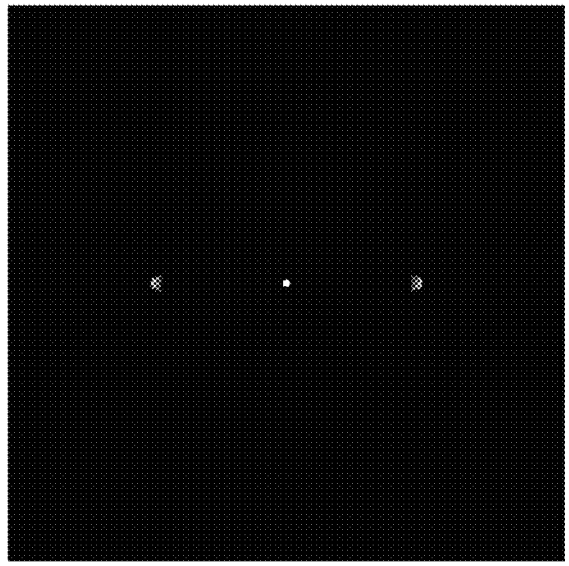
FIG. 26A is a view showing a displayed example of an off-axis hologram of object light.
Figure 26B:
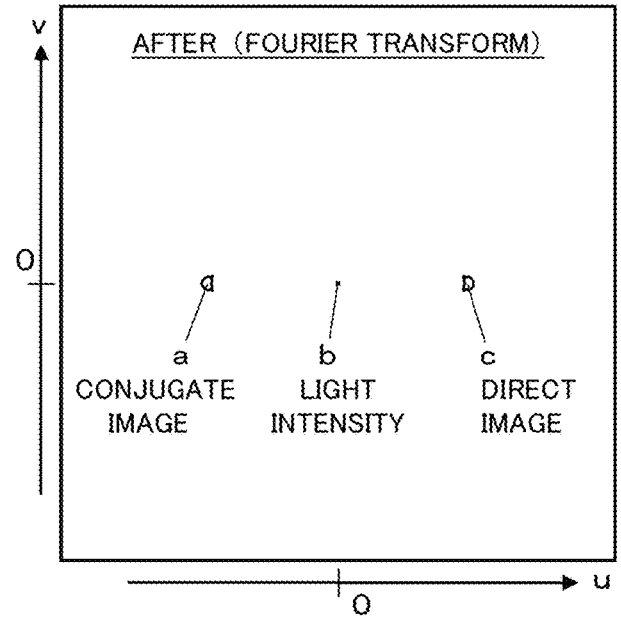
FIG. 26B is a view explaining FIG. 26A.
Figure 27A:
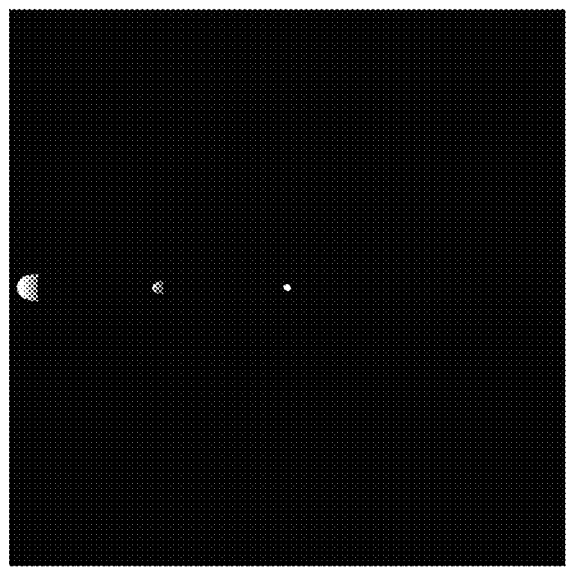
FIG. 27A is a view showing a displayed example of a hologram obtained by carrying out a heterodyne modulation on the off-axis hologram of FIG. 26A.
Figure 27B:
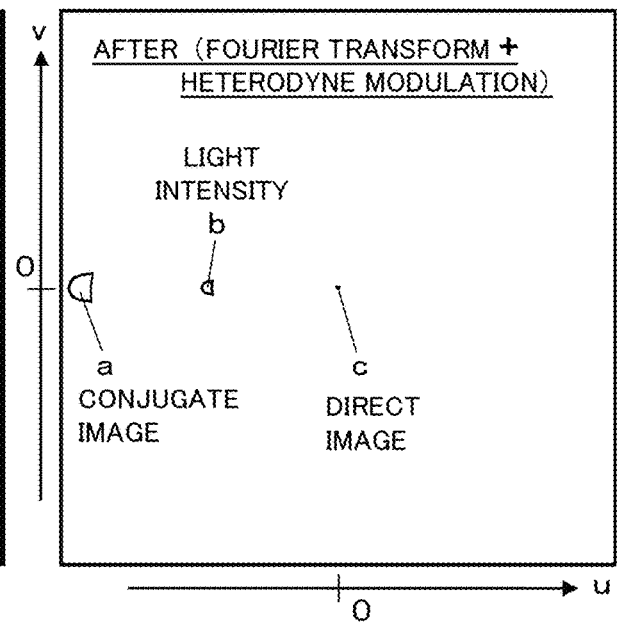
FIG. 27B is a view explaining FIG. 27A.

FIG. 26A and FIG. 26B show the object light hologram $I_{OR}$ as a square of the absolute value in the frequency space after Fourier transform. Conjugate image component a (left in figure), light intensity component b (center in figure), and direct image component c (right in figure) are seen. When the object light hologram $I_{OR}$ is divided by the reference light hologram $I_{LR}$, as shown in FIG. 27A and FIG. 27B, the object light hologram $I_{OR}$ is subjected to heterodyne modulation, and the direct image component c moves near the origin of the frequency space (u, v). This direct image component c corresponds to the complex amplitude in-line hologram $J_{OL}$ of above equation (8).

Spatial frequency filtering is applied to the hologram obtained by the division, and only the complex amplitude in-line hologram $J_{OL}$ near the origin can be taken out separately. By the calculation processing of the spatial frequency filtering, it is possible to remove the conjugate image component and the light intensity component, and also it is possible to almost completely remove the stray light component and noise mixed during the hologram acquisition.

The 11th Embodiment: Ellipsometry Device

Figure 28:
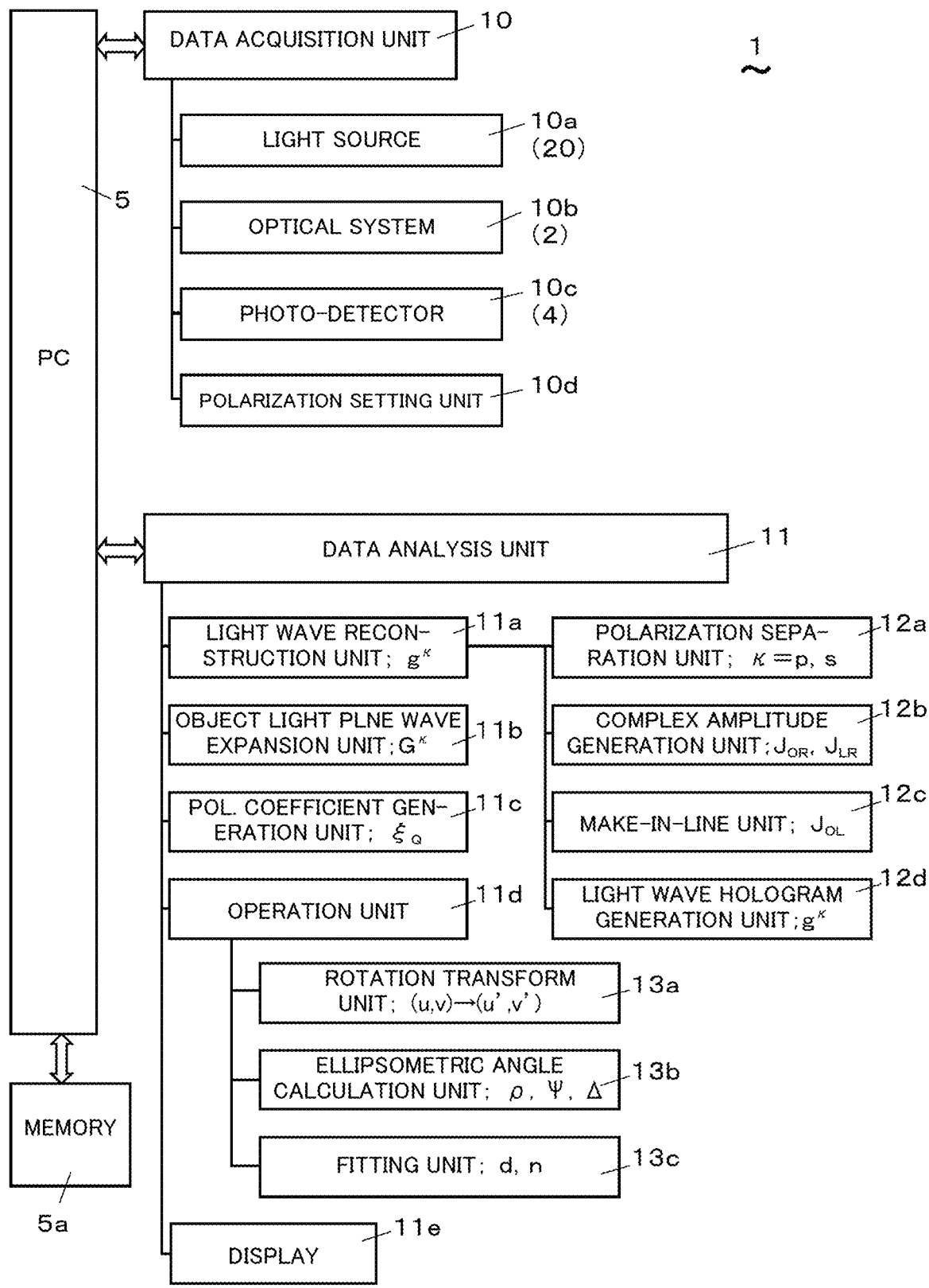
FIG. 28 is a block diagram showing an ellipsometry device according to the 11th embodiment.

FIG. 28 shows a block configuration of the ellipsometry device 1 according to the 11th embodiment. The ellipsometry device 1 includes a data acquisition unit 10 that acquires and stores data of the object light O from the object 3, a data analysis unit 11 which executes polarization analysis on the recorded object light O, a computer 5, and a memory 5a (storage unit) for storing each data and program (software).

The data acquisition unit 10 includes a light source 10a, an optical system 10b, a photo-detector 10c, and a polarization setting unit 10d. Each part of the data acquisition unit 10 corresponds to the unit shown in above-mentioned FIG. 3, FIG. 5, and FIG. 6 etc., that is, the laser 20 (light source 10a), the optical system 2 (optical system 10b), the photo-detector 4 (photo-detector 10c), and the polarizer array PA (polarization setting unit 10d). The polarization setting unit 10d includes, in addition to the polarizer array PA, the reference light dividing unit RX, the Wollaston prism WP, polarizers P1, P2, P3, and the like.

The data analysis unit 11 includes a light wave reconstruction unit 11a, an object light plane wave expansion unit 11b, a polarization coefficient generation unit 11c, a operation unit 11d, and a display 11e. The display 11e is a general display such as a liquid crystal display device capable of displaying an image.

The optical wave reconstruction unit 11a includes a polarization separating unit 12a, a complex amplitude generating unit 12b, a make-in-line unit 12c, and a light wave hologram generating unit 12d. The operation unit 11d includes a rotation transform unit 13a, an ellipsometric angle calculation unit 13b, and a fitting unit 13c.

The units 11a to 11d, 12a to 12d, and 13a to 13c of the data analysis unit 11 are constituted by software on the computer 5. The computer 5 is provided with an input/output device, a communication device, a storage medium device, and the like provided in a general-purpose computer.

The data acquisition unit 10 acquires the data of the off-axis hologram described according to FIG. 1, FIG. 9, FIG. 12, etc. in a state separable into the p-polarized light hologram and the s-polarized light hologram or in a separated state. The data acquisition unit 10 performs the processing of the illumination step (S1) and the processing of the hologram acquisition step (S2).

In addition, each unit of the data analysis unit 11 performs the processing described with reference to FIG. 1, FIG. 2, FIG. 8, and FIG. 22 to FIG. 27. For example, the light wave reconstruction unit 11a performs the light wave reconstruction step (S3), the object light plane wave expansion unit 11b performs the object light spectrum generation step (S4), the polarization coefficient generation unit 11c performs the polarization coefficient generation step (S5), and the operation unit 11d performs the ellipsometric angle calculation step (S6).

In the light wave reconstruction unit 11a, for example, the polarization separating unit 12a performs the polarization separating step (S31), the complex amplitude generating unit 12b performs the complex amplitude hologram generating step (S32), the make-in-line unit 12c performs the make-in-line step (S33), and the light wave hologram generation unit 12d performs the light wave hologram generation step (S34) and the like.

Figure 8:
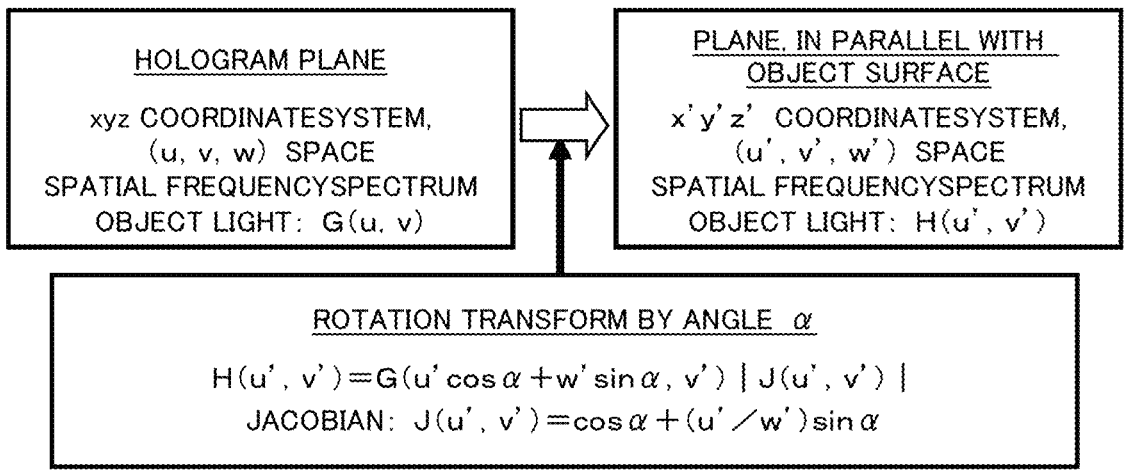
FIG. 8 is a figure explaining the rotation transform which makes the light receiving surface in FIG. 7 parallel to the reflective surface.

For example, the operation unit 11d performs the processing described based on equations (14) to (17), and the rotation transform unit 13a of the operation unit 11d performs the processing described based on FIG. 7, FIG. 8, and FIG. 12, and the ellipsometric angle calculating unit 13b performs the processing explained based on equations (17) and (18). Further, the fitting unit 13c of the operation unit 11d performs processing of obtaining the film thickness d and the refractive index n using the ellipsometric angles ψ and Δ (see FIG. 33 to FIG. 42).

12th Embodiment

In the present embodiment, the ellipsometry method and device are applied to microscopic observation and ellipsometry of the surface structure of the object 3, for example, a silicon semiconductor device having a fine structure or a MEMS device. This embodiment relates to an device or observation method combining a microscope and an ellipsometer, and can be referred to as microscopic ellipsometry or structural ellipsometry. This microscopic ellipsometry can be positioned between the one-point intensive measurement method and the wide range distribution measurement method.

(Function as a Microscope)

In the ellipsometry device 1 used in the present embodiment, for example, in the devices of FIG. 3, FIG. 12, FIG. 17, and FIG. 18, the size of the illuminated spot with the illumination light Q on the surface of the object 3 may be of any size suitable for the microscopic observation or a size as long as it includes some observing structure on the surface of the object. If the spot size is too large, the resolution is lowered and the image becomes unclear, and if it is too small, the structure becomes invisible, in a balance with the numerical aperture of the photo-detector 4.

By setting the illuminated spot with the spherical-wave-like illumination light Q to an appropriate size, the object light hologram $I_{OR}$ and the reference light hologram $I_{LR}$ are acquired and stored. Further, by acquiring a large number of object light holograms $I_{OR}$ by two-dimensionally moving the object 3 along a plane, data for analyzing the film thickness and optical constants at each point on the object having a fine structure are stored. The object lights can be reconstructed from those holograms according to the procedure described bellow, and the polarization state and the image at each point on the object surface can be obtained by using the reconstructed p- and s-polarized object lights, and It becomes possible to measure and observe the film thickness, optical constants, etc. of a sample having a two-dimensional microscopic structure.

(Reconstruction of Object Light)

First, according to the procedures of FIG. 1 and FIG. 2, the light wave holograms $g^K(x, y)$, κ=p, s of p- and s-polarization are generated from the off-axis holograms $I_{OR}$, $I_{LR}$. The process for generating the object light spatial frequency spectra $G^K(u, v)$, κ=p, s of p- and s-polarization from the light wave hologram $g^K(x, y)$, κ=p, s is performed by that shown in FIG. 23 and FIG. 24. Those processes are similarly carried out for each of the p- and s-polarized light holograms, and the description of the polarization state κ=p, s is omitted in FIG. 23 and FIG. 24.

As shown in FIG. 23A and FIG. 23B, for the light wave holograms $g^K(x, y)$, κ=p, s of p- and s-polarization, the number of the sampling points is substantially increased by subdividing the spatial sampling intervals and performing the data interpolation on the new sampling points generated by the subdividing (pixel number increasing step).

Next, as shown in FIG. 24A, FIG. 24B and FIG. 24C, each of the p- and s-polarization light wave holograms $g^K(x, y)$, κ=p, s of increased sampling point number is divided into a plurality of minute holograms $g^K_i(x, y)$, k=p, s of widths dx and dy (hologram division step) and each of the synthetic minute holograms $\Sigma^K(x, y)$, κ=p, s of p- and s-polarization are generated by mutually superimposing each of the minute holograms $g^K_i(x, y)$, k=p, s, generated by the dividing, for each p- and s-polarization respectively (hologram synthesizing step).

Next, by performing Fourier transform on the synthetic hologram $\Sigma^K(x, y)$ κ=p, s of p- and s-polarization instead of the light wave hologram $g(x, y)$ in above equation (10), spatial frequency spectra $G^K(u, v)$, κ=p, s of p- and s-polarization for the object light O are obtained from the synthetic minute holograms $\Sigma^K(x, y)$, κ=p, s. The spatial frequency spectrum $G^K(u, v)$ is also called a transform function $G^K(u, v)$.

Next, reconstructed light waves $h^K(x, y, z_s)$, κ=p, s are derived, which are the light waves for reconstructing the microscopic images of p- and s-polarization of the object light O at a position $z=z_s$ where the optical axis of the object light O intersects the observation target surface (sample plane) of the object 3. The reconstructed light wave $h^K(x, y, z_s)$ is generated by the following equation (29) using the spatial frequencies (u, v, w) satisfying above equation (11) which is a dispersion relation of a plane wave and the transform functions $G^K(u, v)$, κ=p, s. The generation position $z=z_s$ for the reconstructed light wave $h^K(x, y, z_s)$ can be arbitrarily set.

$$h(x,y,z_s)=\iint G(u,v)\exp[i2\pi w(u,v)z_s]\exp[i2\pi(ux+vy)]\,dudv \quad (29)$$

The reconstructed light wave $h^K(x, y, z_s)$ is a wave obtained by superimposing plane waves by weighting the transform function $G^K(u, v)$ obtained as the spatial frequency spectrum of the object light O. The reconstructed light wave $h^K(x, y, z)$ is an exact solution of Helmholtz equation, and satisfies the light wave $g^K(x, y, 0)$ as a boundary condition on the light receiving surface of the photo-detector 4, that is, the hologram plane. This means $h^K(x, y, 0)=g^K(x, y, 0)$.

Rotated reconstructed light waves $b^K(x', y')$, κ=p, s of p- and s-polarization are derived by the coordinate transform of the reconstructed light waves $h^K(x, y, z_s)$, in the same manner as the coordinate rotation shown in above FIG. 7 and FIG. 8, they are transformed into the expression on the plane parallel to the surface of the object 3. The surface (reflective surface) of the object 3 can be seen as a distortion-less image by displaying the light intensity obtained from the rotated reconstructed light wave $b^K(x', y')$ by squaring its absolute value, that is, $|b^K|^2$. It is also possible to observe the microscopic structure as an image at each point on the sample plane by performing similar processing on a large number of object light holograms $I_{OR}$ which are sequentially recorded by two-dimensionally moving the sample.

(Structural Ellipsometry)

The amplitude reflection coefficient ratio ρ is obtained at each point within the illuminated spot for position coordinate (x', y') or each incident angle θ(x', y') of the point. That is, by using the illumination light polarization coefficient and the rotated reconstructed light waves $b^K(x', y')$, κ=p, s, the amplitude reflection coefficient ratio $\rho=\xi_Q b^p(x', y')/b^s(x', y')$ is obtained as the ratio of the rotated reconstructed light wave $b^p$ of p-polarization to the rotation reconstructed light wave $b^s$ of s-polarization. From the amplitude reflection coefficient ratio ρ, the surface distribution of the ellipsometric angles ψ(x', y'), Δ(x', y') are obtained based on the expression of ρ=tan ψ·exp(iΔ). It is also possible to obtain the data of the ellipsometric angles ψ, Δ for each point on the sample plane by performing similar processing on a large number of object light holograms $I_{OR}$ which are sequentially recorded by two-dimensionally moving the sample.

Incident light incident on each point (x', y') within the illuminated spot on the object 3 illuminated with the spherical-wave-like illumination light Q has different incident angle θ(x', y') for each point. At the optical axis position (x', y')=(0, 0), which is the center position of the illuminated spot, the incident angle θ(x', y') is determined as θ(0, 0)=α according to the arrangement of the illumination light Q, the object 3 and the photo-detector 4 (see FIG. 7). Further, at a position (x', y') away from the center of the illuminated spot, it becomes θ(x', y')=α+dθ using a correction angle dθ which is predetermined according to the positional deviation.

According to the ellipsometry method and device of the present embodiment, the surface distribution of the ellipsometric angles ψ, Δ within the size of the illuminated spot with the illumination light Q is obtained from the one-shot object light hologram $I_{OR}$, and images, with which it is possible to observe microscopic structure, are obtained. Therefore, in order to confirm the microscopic structure of the whole thin film, it is sufficient to acquire a smaller number of holograms than the number of measurement or observation points, and it is possible to dramatically reduce the number of recorded holograms and the calculation amount. Further, according to the present embodiment, it is possible to obtain the film thickness and optical constants at each part in a short time while observing the structure on the thin film.

Practical Example 1

FIG. 29 to FIG. 34 show the practical example 1. In the practical example 1, film thickness measurement of silicon oxide $SiO_2$ layer naturally oxidized on a crystalline silicon Si substrate was performed using an equivalent to the ellipsometry device 1 shown in FIG. 9, FIG. 10, and FIG. 11. The photo-detector 4 used in this example does not have a polarizer for each pixel. The photo-detector 4 is a monochrome camera link CCD camera having an effective pixel number of 6576(H)×4384(V) and a pixel size of 5.5 μm. The light source laser 20 is a semiconductor excitation solid-state laser of wavelength 473 nm and output 20 mW. Using a polarizer P1, an obliquely polarized laser light emitted from the light source laser 20 was switched to p-polarized light or s-polarized light, and the data of the holograms $I^p_{OR}$ and $I^s_{OR}$ were individually acquired for each polarized light.

Therefore, in the case of acquiring this data, the holograms $I_{OR}$ are obtained, from the beginning, in a state separated in the p-polarized light hologram and the s-polarized light hologram. When two holograms corresponding to the p- and s-polarized lights are separately recorded as described above, it is necessary to keep away the respective optical systems of the reference light R and the illumination light Q from the influence of external vibration. Therefore, as shown in FIG. 9, the reference light R and the illumination light Q are made to propagate on the same path by using the ellipsometry device 1 having a configuration sharing the condenser lens 23 (objective lens).

In the above-mentioned FIG. 26A and FIG. 26B, the conjugate image component a, the light intensity component b, and the direct image component c in the frequency space for the off-axis hologram $I^s_{OR}$ of the s-polarized light from the natural silicon oxide $SiO_2$ layer are shown. In the above-mentioned FIG. 27A and FIG. 27B, each component are shown in the frequency space after the heterodyne modulation by which the direct image component c is moved to the vicinity of the origin of the frequency space. By applying spatial frequency filtering to these p- and s-polarization holograms, only the direct image component c in the vicinity of the origin, that is, the complex amplitude in-line hologram $J^K_{OL}$, κ=p, s alone, was taken out.

Figure 29:
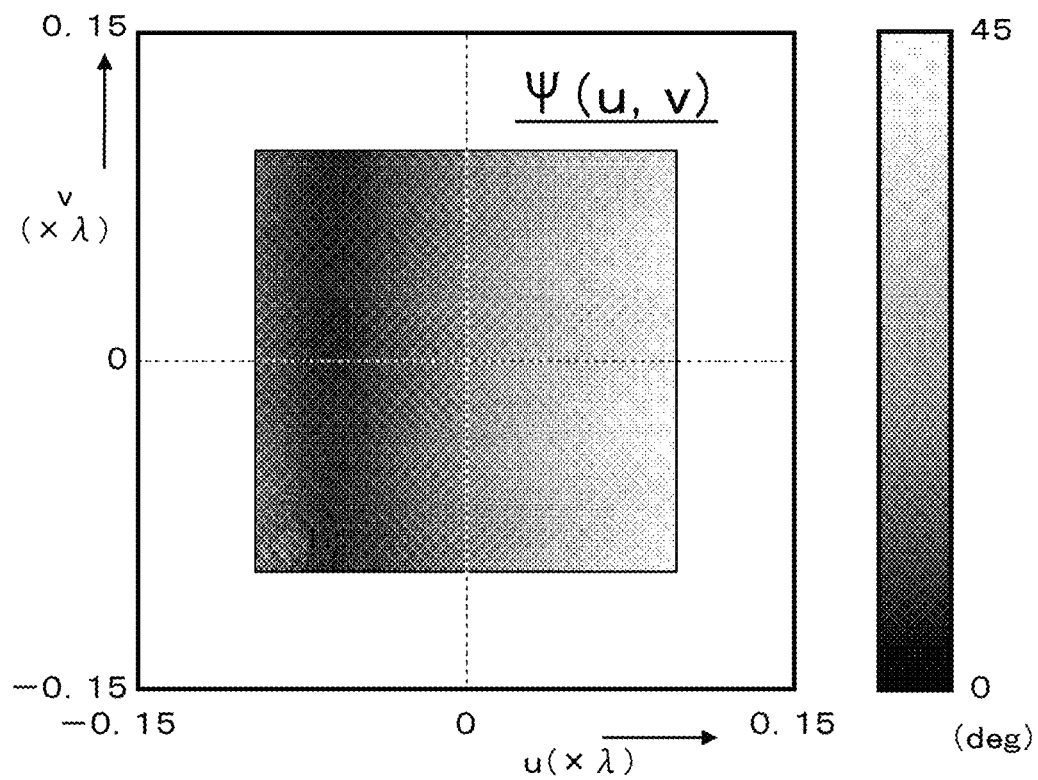
FIG. 29 (practical example 1) is an image showing a 2-dimensional distribution of measured values of ellipsometric angle $\psi$ about a thin film.
Figure 30:
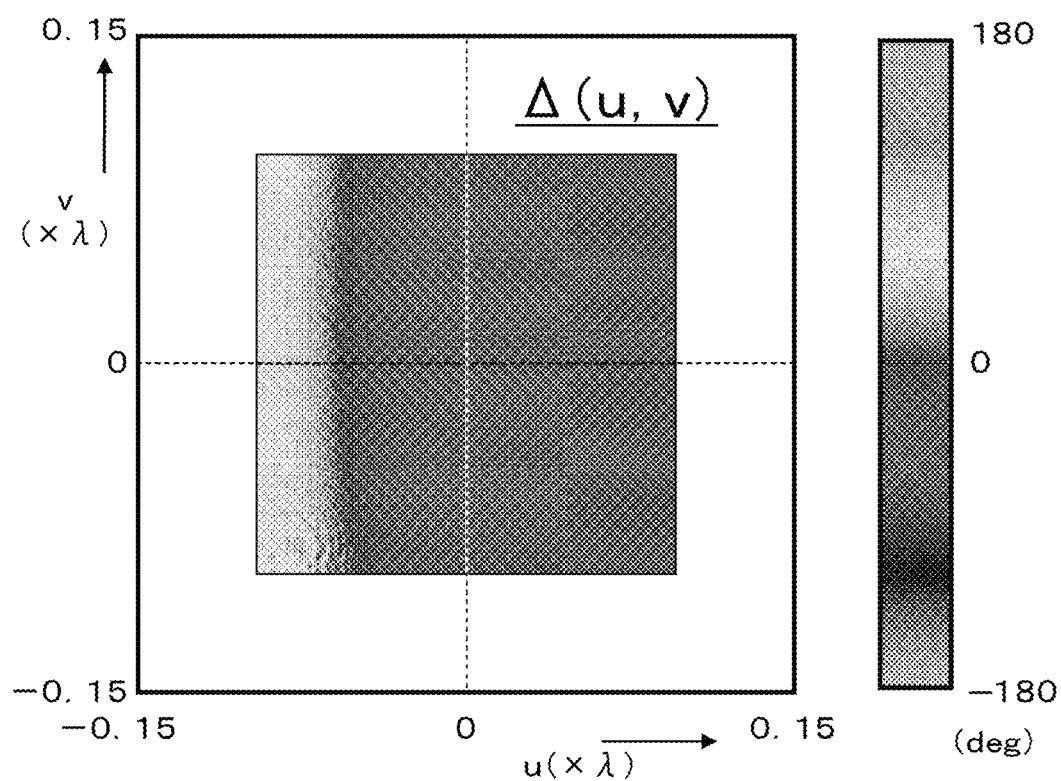
FIG. 30 is an image showing a 2-dimensional distribution of measured values of ellipsometric angle $\Delta$ obtained along with the angle $\psi$ of FIG. 29.
Figure 31:
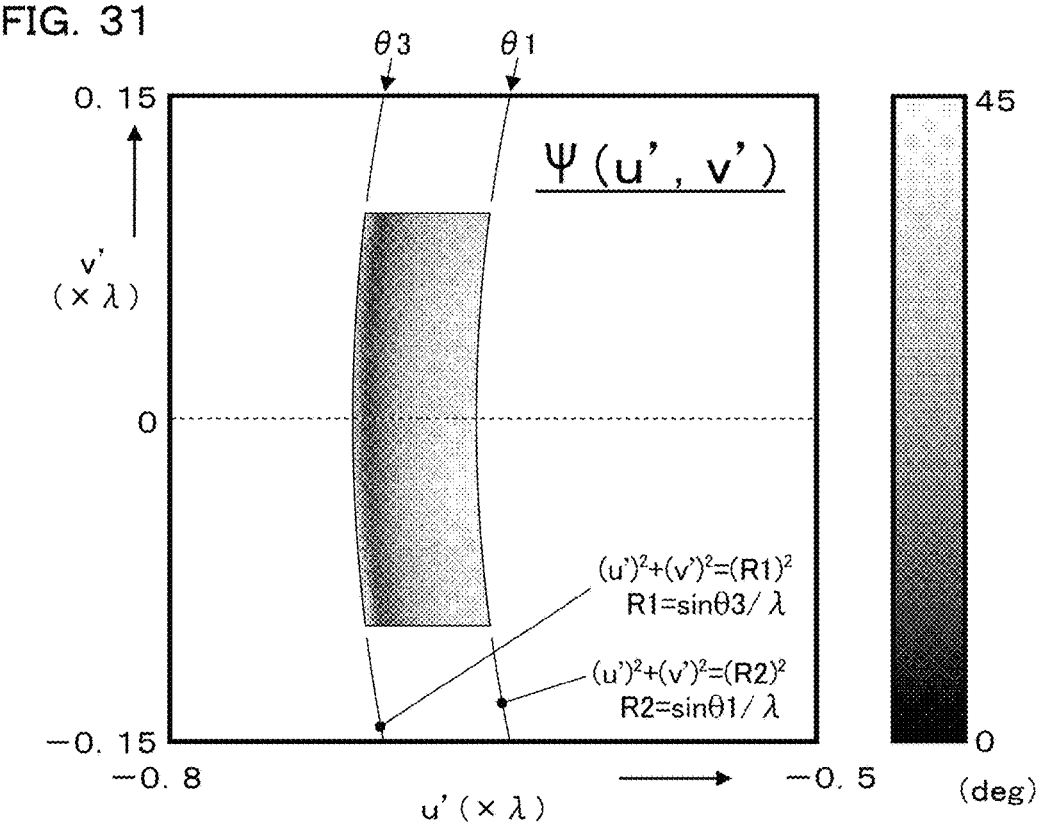
FIG. 31 is an image showing a result of a rotation transform of the angle $\psi$ of FIG. 29.
Figure 32:
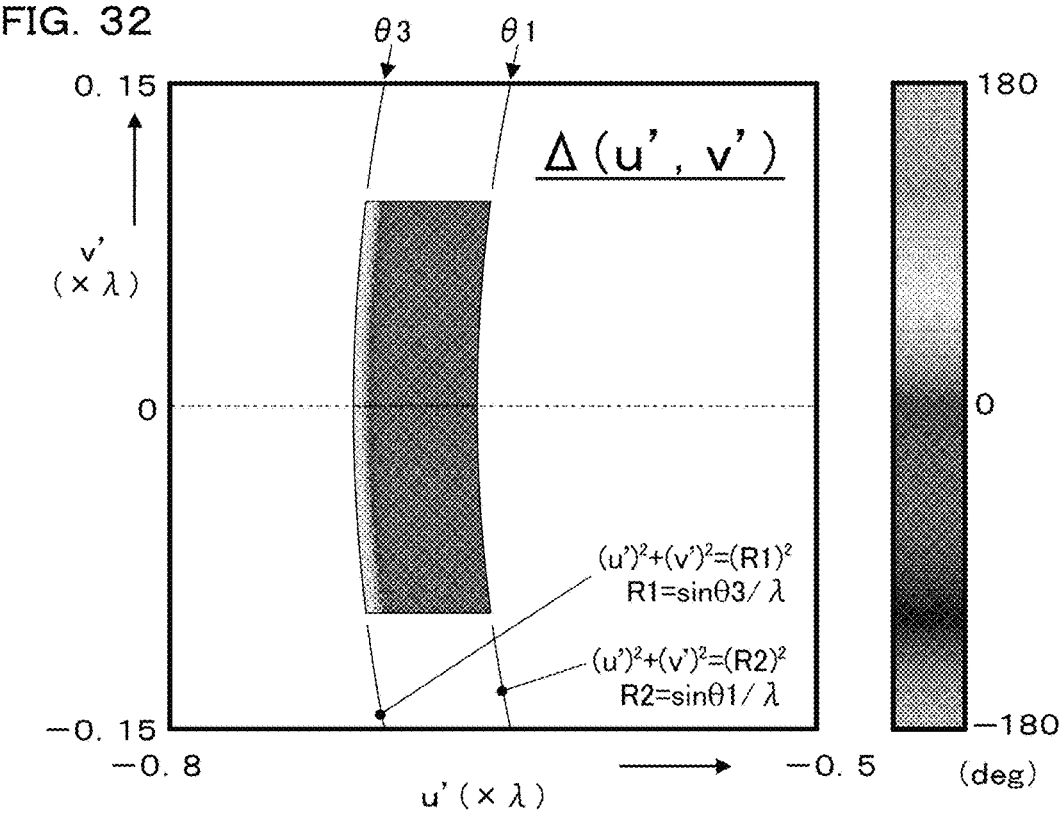
FIG. 32 is an image showing a result of a rotation transform of the angle $\Delta$ of FIG. 30.

Using the extracted $J^K_{OL}$, the p- and s-polarized light waves on the hologram plane were obtained, and Fourier expansion was performed for each light wave to obtain spatial frequency spectra $G^K$ for p- and s-polarized lights. FIG. 29 and FIG. 30 show the distributions of the values of the ellipsometric angles ψ(u, v) and Δ(u, v) obtained using the spatial frequency spectra $G^K$ in the frequency space (u, v) wherein the distribution of values is indicated by shading. FIG. 31 and FIG. 32 respectively show the ellipsometric angles ψ(u', v') and Δ(u', v') obtained by performing the coordinate rotation shown in FIG. 7 and FIG. 8 with respect to ψ(u, v) and Δ(u, v), respectively. The coordinate rotation processing is performed using a value of an angle α determined as a parameter, described later.

Since an incident angle θ of a plane wave having a light wavelength λ and a spatial frequency (u', v') is expressed by sin θ=λ((u')²+(v')²)^{1/2} in above equation (19), the points having a constant incident angle θ are located on a circle centered on the origin. That is, the incident angle θ becomes constant on a circle centered on the origin. The ellipsometric angles ψ and Δ also have constant values on the circle. Therefore, for example, an average value for a plurality of sample points on each circle, that is, each incident angle θ can be adopted as an ellipsometric angle. These facts are known from FIG. 31 and FIG. 32 in that the density distribution thereof is uniform along concentric circles. Also, from the density distribution, it can be seen that each of the ellipsometric angles ψ, Δ is a function of the incident angle θ. The angles θ1 and θ3 in the figure correspond to the angles θ1 and θ3 shown in FIG. 7, respectively.

Figure 33:
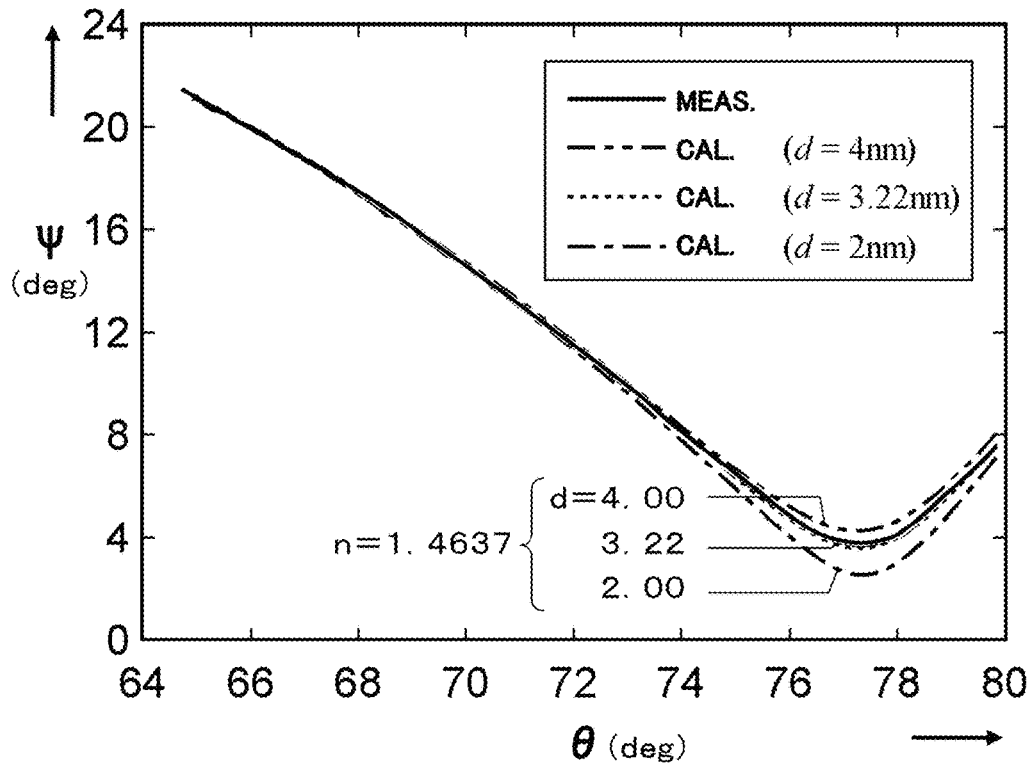
FIG. 33 is a graph of the angle $\psi$ of FIG. 31 and angles $\psi$ obtained by calculation shown as incident angle dependence.
Figure 34:
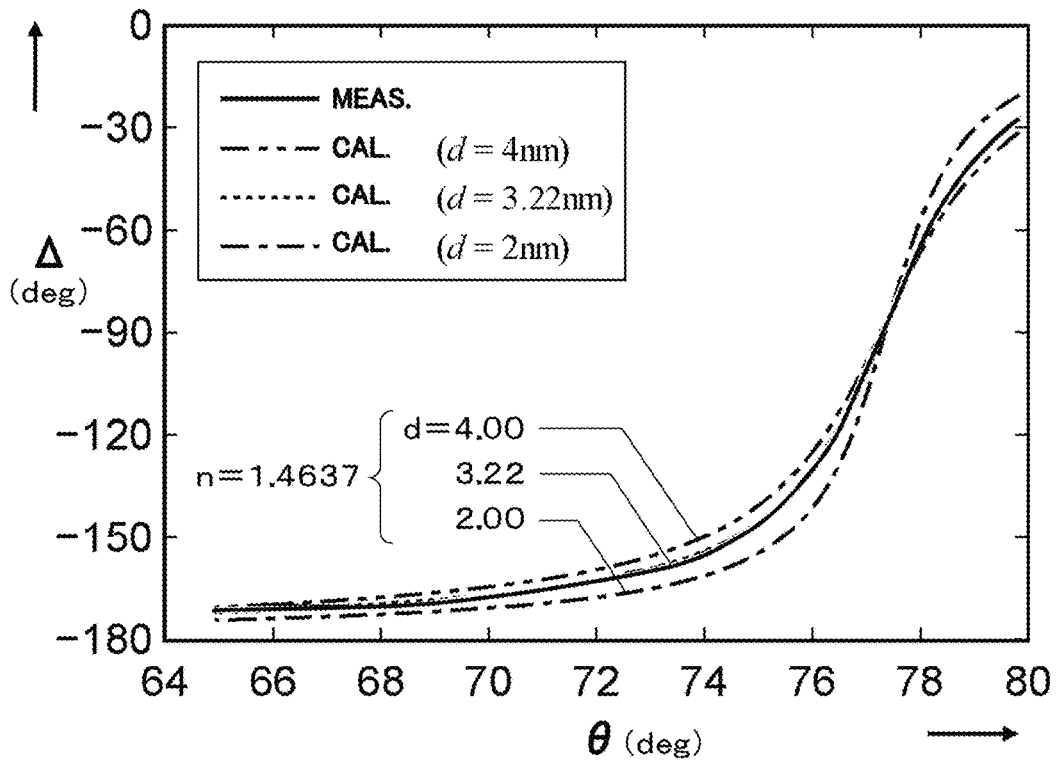
FIG. 34 is a graph of the angle $\Delta$ of FIG. 32 and angles $\Delta$ obtained by calculation shown as incident angle dependence.

FIG. 33 and FIG. 34 show the dependence of the ellipsometric angles ψ, Δ on the incident angle θ, respectively. By comparing the measured curve and the calculated curves calculated using the film thickness d of the natural silicon oxide $SiO_2$ as a parameter, the value of the parameter d giving the minimum of the mean square error between the measured and calculated values of Δ in the recorded range of the incident angle θ was obtained as the measured value of the film thickness. For this processing, the fitting unit 13c (FIG. 28) of the ellipsometry device 1 was used.

For the sample used in the practical example, the film thickness of the natural silicon oxide $SiO_2$ layer was found to be d=3.22 nm. By FIG. 33 and FIG. 34, it is found that the measured values of the ellipsometric angles ψ and Δ are very well reproduced with the calculated values over a wide range of the incident angle θ. In this example, the angle α (FIG. 7) formed by the thin film sample plane and the CCD plane (hologram plane) was not measured. Therefore, the fitting of the calculated value curve to the measured value curve was performed using a value n=1.4637 given as the refractive index of the natural silicon dioxide $SiO_2$ layer and the film thickness d and the angle α made as parameters. Further, n=4.466 was used for the refractive index n of the silicon substrate. The film thickness d and the value of the angle α were determined from the parameter values when the two curves coincided. By accurately measuring or setting the value of the angle α, the value of the refractive index n of the silicon oxide can be determined from comparison of the calculated curves and the measured curve, in addition to the film thickness d.

In the case of recording the p-polarization hologram and the s-polarization hologram separately, not one-shot but two-shots as in the present example, there is a possibility that some deviation (shift in value due to addition of an unknown constant) occurs in the ellipsometry angle Δ (phase difference) due to a slight environmental change on the light path. Therefore, such deviation was dealt with by translating the measured value curve of the ellipsometric angle Δ up and down, in consideration of this deviation, at the time of the fitting process for comparing the calculated value curve with the measured value curve. In the comparison between the calculated value curves shown in FIG. 34 and the measured value curve, a fixed point can be seen around Δ=−90°.

Practical Example 2

Figure 35:
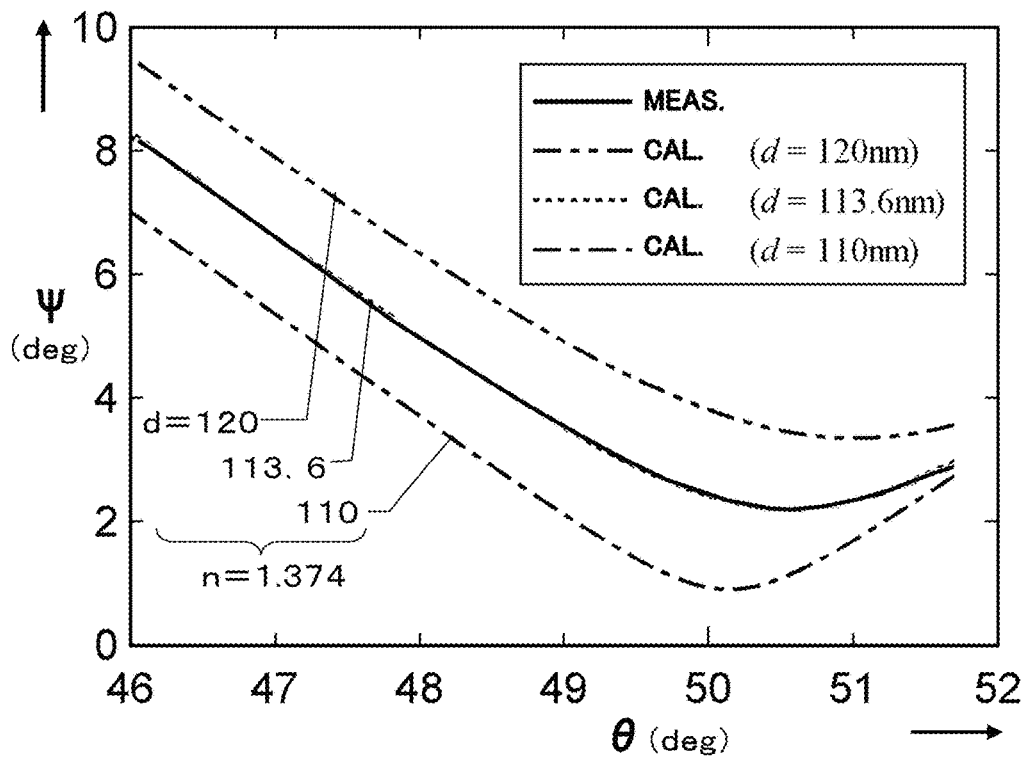
FIG. 35 (practical example 2) is a graph of angle $\psi$ obtained by measurement about other thin film and angles $\psi$ obtained by calculation shown as incident angle dependence.
Figure 36:
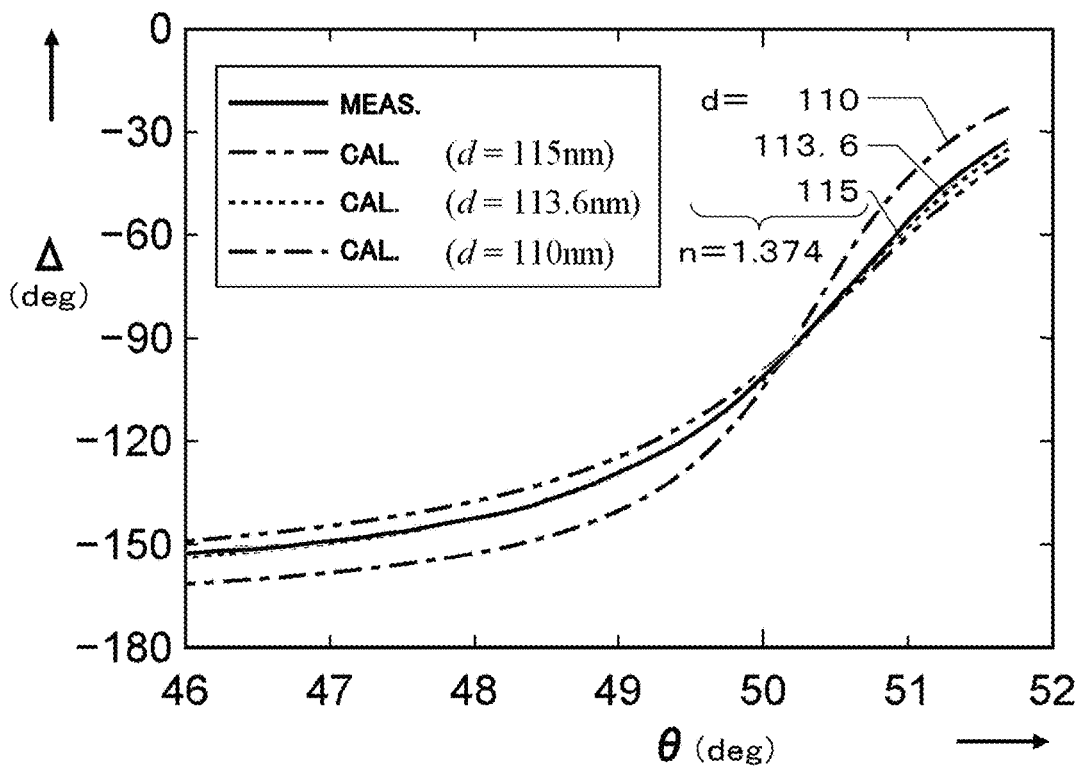
FIG. 36 is a graph of angle $\Delta$ obtained along with the angle $\psi$ of FIG. 35 and angles $\Delta$ obtained by calculation shown as incident angle dependence.

FIG. 35 and FIG. 36 show the practical example 2. In the practical example 2, film thickness measurement of the magnesium fluoride $MgF_2$ monolayer antireflection film coated on a glass N-BK7 plate was performed using an equivalent to the ellipsometry device 1 shown in FIG. 9, FIG. 10, and FIG. 11 as in the practical example 1. FIG. 35 and FIG. 36 show the dependence of the ellipsometric angles ψ, Δ on the incident angle θ, respectively. In the calculation processing, refractive index n=1.517 for the glass substrate N-BK7 plate and refractive index n=1.374 for the magnesium fluoride were used. Using the fitting processing same as in the practical example 1, a film thickness d=113.6 nm was obtained for the sample. Also in the measurement of this antireflection film, similarly to the measurement of the natural silicon oxide $SiO_2$ layer of the practical example 1, the measured values of the ellipsometric angles ψ and Δ are very well reproduced with the calculated values over a wide range of the incident angle θ.

As a comparative example, the film thickness of the $MgF_2$ single layer antireflection film of the same sample was measured using a conventional spectroscopic ellipsometer, and a measured value d1=114 nm±3 nm was obtained. The measurement result of the practical example 1 (sic) using the ellipsometry device 1 is consistent with the measured value d1 using the conventional spectroscopic ellipsometer within the error range ±3 nm.

Practical Example 3

FIG. 37 to FIG. 40 show the practical example 3. In the practical example 3, film thickness measurement of a silicon oxide $SiO_2$ thin film on a glass BK7 plate having a thickness of 1 mm as a sample was performed using an equivalent to the ellipsometry device 1 shown in FIG. 12 described above. The laser 20 used as a light source is a semiconductor pumped solid-state laser of wavelength 473 nm. The object light hologram $I_{OR}$ was acquired by simultaneously recording s- and p-polarized object lights. FIG. 14A and FIG. 14B show the object light hologram $I_{OR}$ obtained in the practical example, and each component (conjugate image components ap, as, light intensity component b, and direct image components cp, cs) in a spatial frequency space is separated, respectively.

By applying the spatial frequency filtering to the simultaneously recorded hologram $I_{OR}$, direct image components cp and cs of s-polarized light and p-polarized light are separated to extract and obtain the complex amplitude holograms $J^K_{OR}$, κ=p, s. By the spatial frequency filtering, the conjugate image components, the light intensity component, the stray light recorded in the hologram, and the noise generated at the time of recording are removed. Using the extracted complex amplitude hologram $J^K_{OR}$, κ=p, s, the measured values of the ellipsometric angles ψ(u', v') and Δ(u', v') are obtained for each incident angle θ by a known angle α and processing similar to the processing shown in the practical examples 1 and 2. The known angle α was obtained by a separate measurement using a glass BK7 plate whose refractive index is known (see "method for determining the angle α" above).

In order to determine the film thickness of the silicon oxide $SiO_2$ thin film, calculated values of ψ and Δ were obtained using a film thickness d and a refractive index n as parameters. The respective values of the parameter d and n, when the mean square error between the calculated value of ψ and the measured value and the mean square error between the calculated value of Δ and the measured value become minimum in the recorded range of the incident angle θ, was determined as the measured values of the film thickness d and the refractive index n. Film thickness d=87 nm and the refractive index n=1.474 were obtained as measured values.

Figure 37:
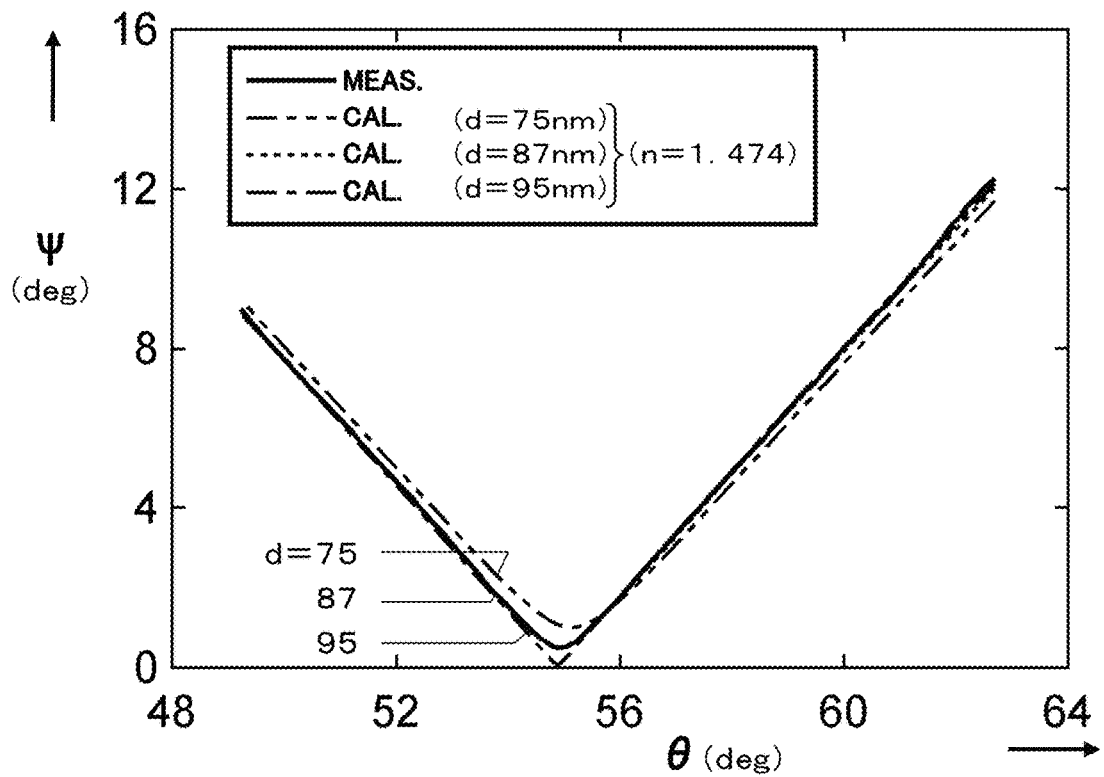
FIG. 37 (practical example 3) is a graph of measured values of angle $\psi$ obtained by measurement about a thin film of $SiO_2$ and calculated values of angles $\psi$ obtained by calculation with a fixed refractive index and changed film thicknesses shown as incident angle dependence.
Figure 38:
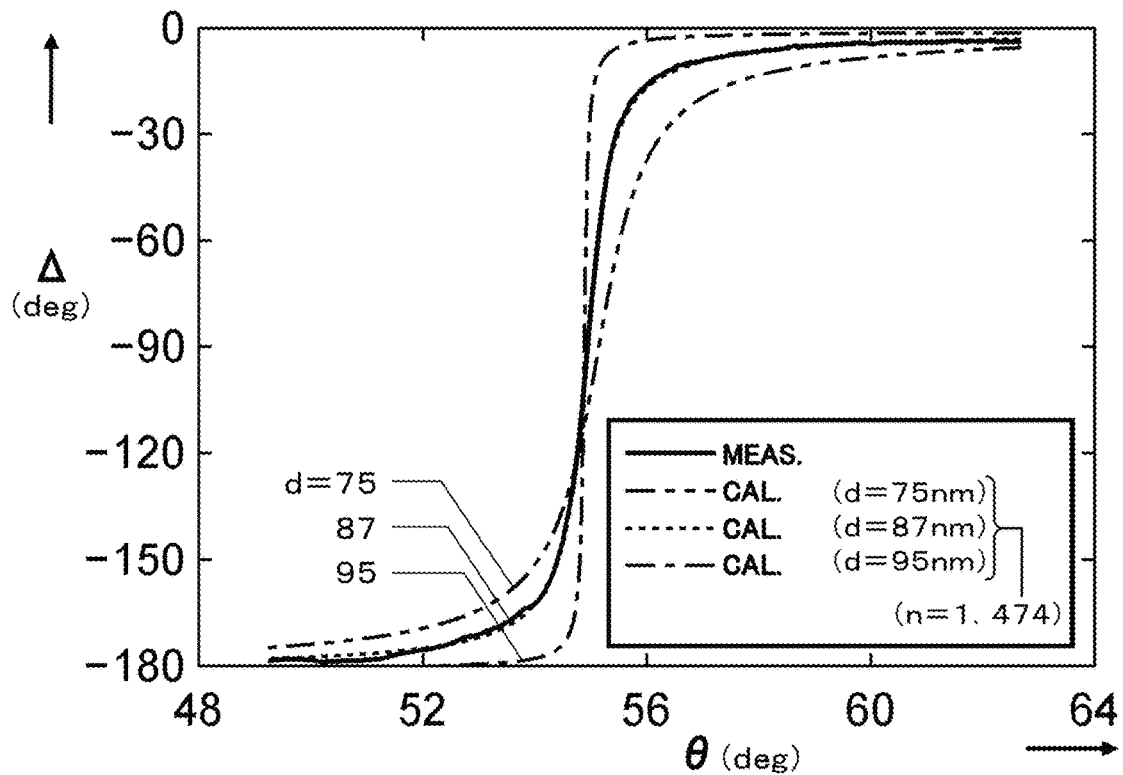
FIG. 38 is a graph of measured values of angle $\Delta$ obtained along with the angle $\psi$ about the thin film and calculated values of angles $\Delta$ obtained by calculation with the fixed refractive index and the changed film thicknesses shown as incident angle dependence.
Figure 39:
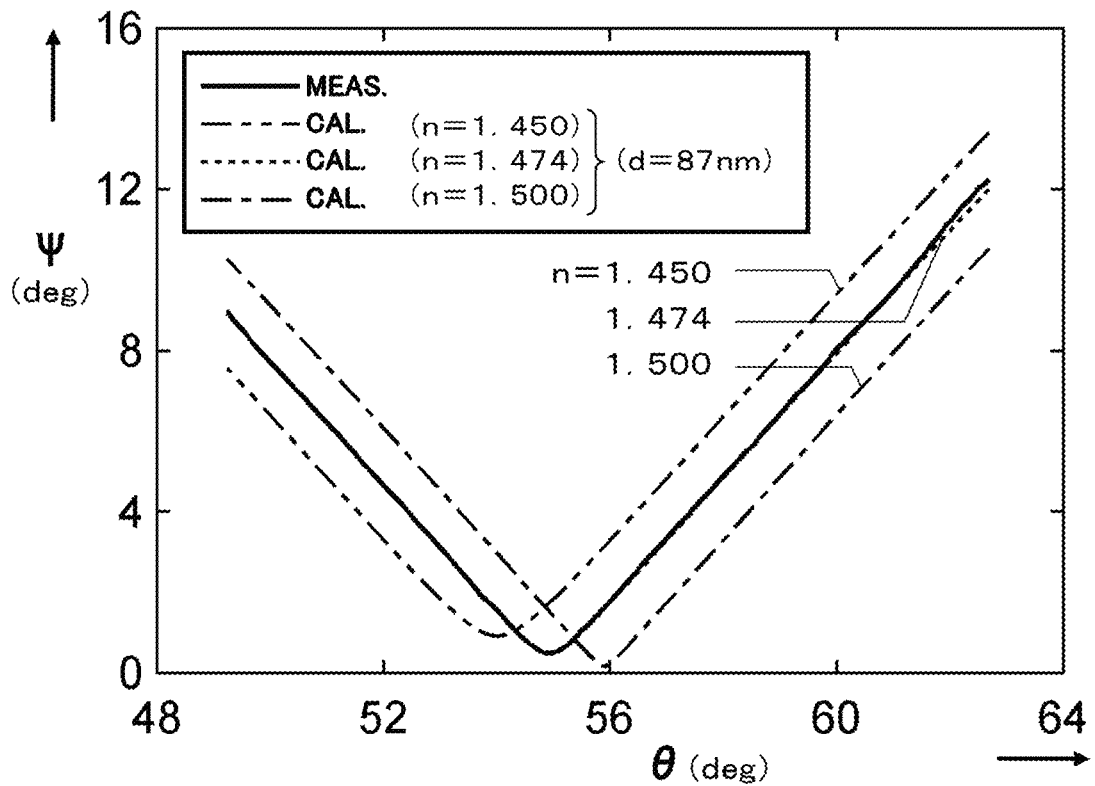
FIG. 39 is a graph of the measured values of the ellipsometric angle $\psi$ of FIG. 37 and calculated values of angles $\psi$ obtained by calculation with a fixed film thickness and changed refractive indices shown as incident angle dependence.
Figure 40:
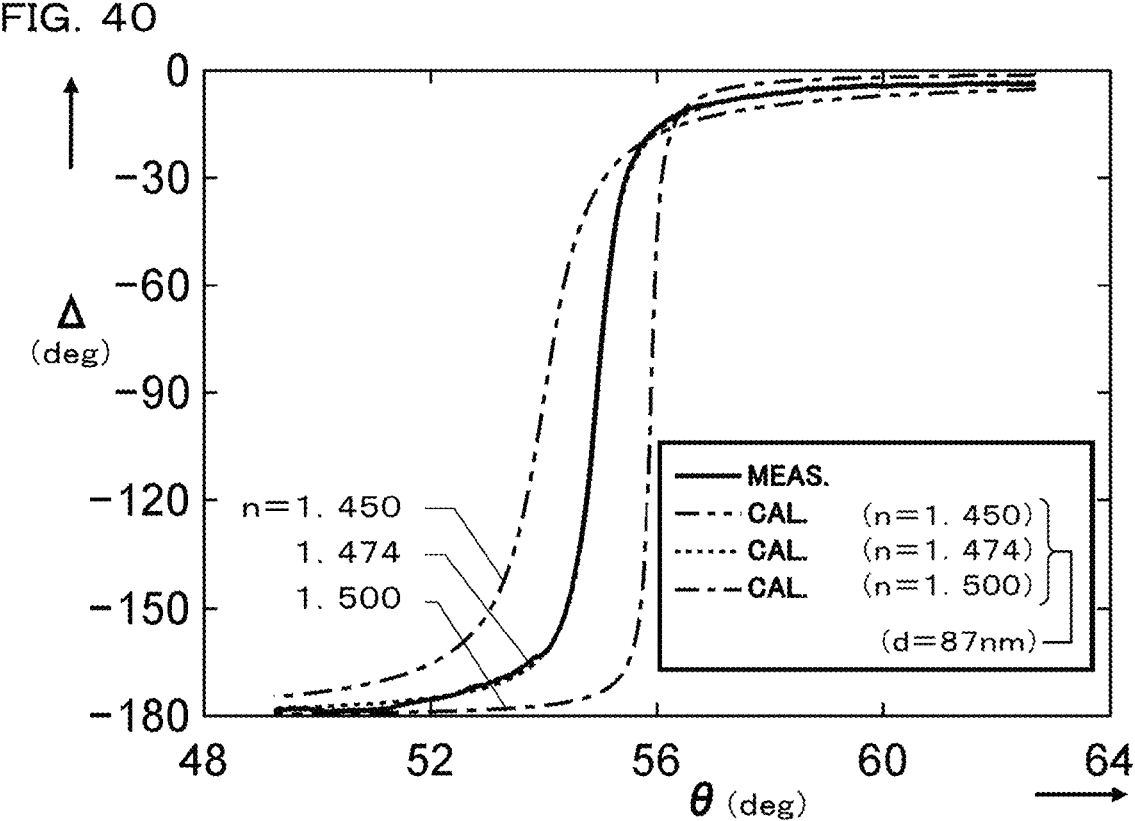
FIG. 40 is a graph of the measured values of the ellipsometric angle Δ of FIG. 38 and calculated values of angles Δ obtained by calculation with the fixed film thickness and the changed refractive indices shown as incident angle dependence.

FIG. 37 and FIG. 38, respectively, show the ellipsometry angles ψ and Δ of the silicon oxide $SiO_2$ thin film as dependence on the incident angle θ, for the calculated values obtained with three kinds of film thickness d and a refractive index n=1.474 fixed and for the measured value. FIG. 39 and FIG. 40, respectively, show the ellipsometry angles ψ and Δ of the silicon oxide $SiO_2$ thin film as dependence on the incident angle θ, for the calculated values obtained with a film thickness d=87 nm fixed and three kinds of refractive index n and for the measured value. As shown in FIG. 37 to FIG. 40, it is found that the calculated values of the ellipsometric angles ψ and Δ using the film thickness d=87 nm and the refractive index n=1.474 nm determined for the silicon oxide $SiO_2$ thin film reproduce the measured values over a wide range of the incident angle θ.

Practical Example 4

Figure 41:
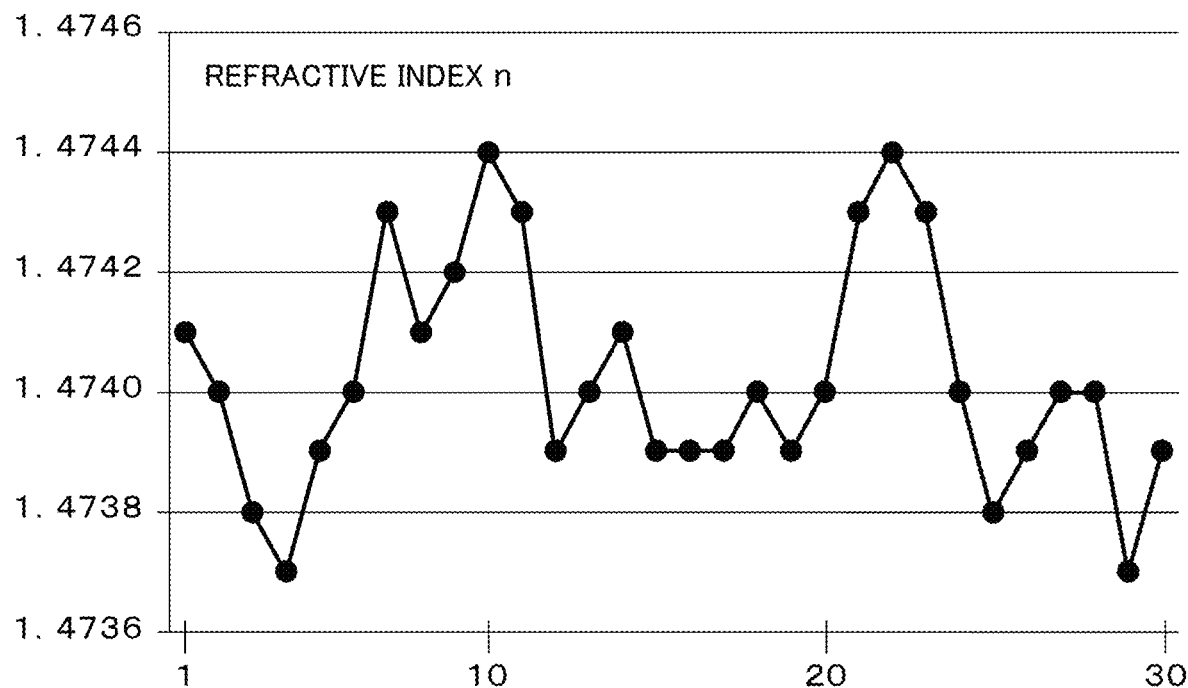
FIG. 41 (practical example 4) is a graph of duplicated measurement result of refractive index.
Figure 42:
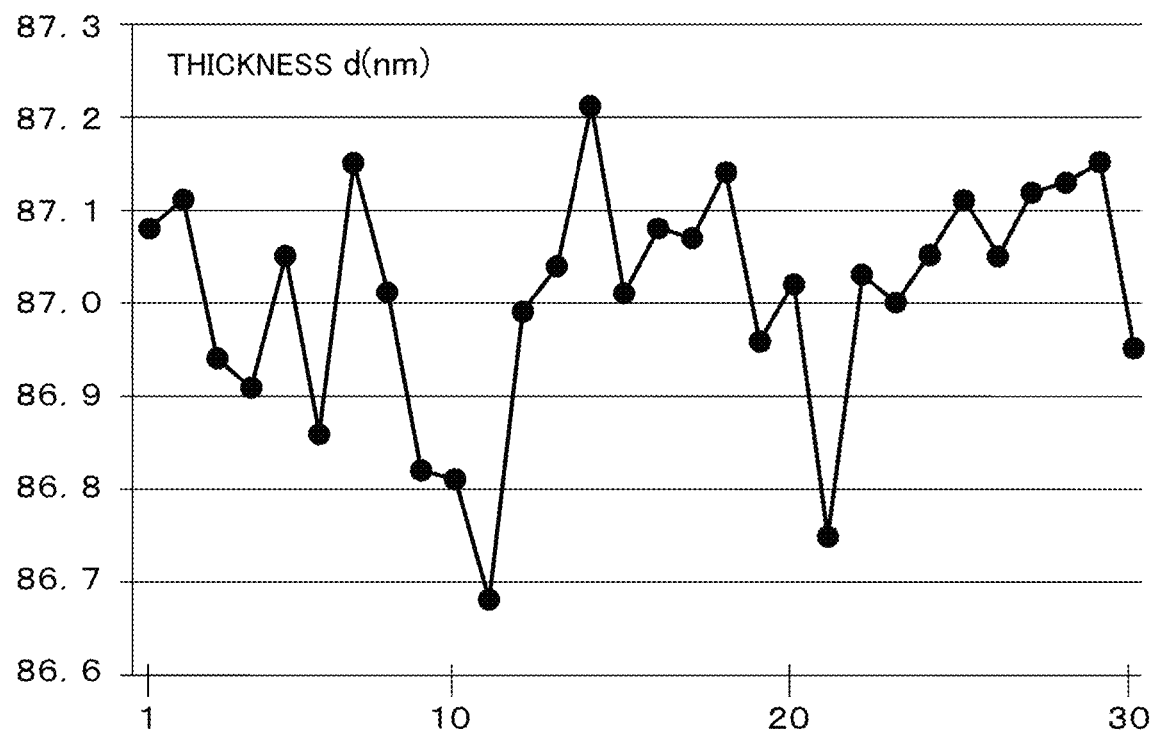
FIG. 42 is a graph of duplicated measurement results for film thickness.

FIG. 41 and FIG. 42 show the practical example 4. In the practical example 4, the repeat measurement accuracy was evaluated. Factors affecting the accuracy of the thin film measurement, for example, the measurement of the film thickness and the refractive index are as follows: the noise caused by the laser instability or generated by the photodetector 4; the roughness of the thin film surface of the sample; the extinction ratio of the polarizer; the calculation errors in the data analysis; and the like. To evaluate those effects, experiments of repeated measurements were conducted.

In the experiment, hologram acquisition was repeated under the same conditions as in the practical example 3, using a $SiO_2$ thin film on a glass BK7 plate with a thickness of 1 mm as a sample, using a laser light of wavelength λ=473 μm. The measurement position of the sample was fixed, thirty object light holograms $I_{OR}$ were acquired at intervals of about 20 seconds, and one reference light hologram $I_{LR}$ was acquired. Using those hologram data, film thickness and refractive index were calculated for each object light hologram $I_{OR}$.

FIG. 41 shows the measurement result of the refractive index n, and FIG. 42 shows the measurement result of the film thickness d. From those measurements, results of film thickness d=87.01 nm, standard deviation 0.13 nm, refractive index n=1.4740, standard deviation 0.0002 were obtained, and high repetition accuracy was confirmed.

(Characteristics of the Ellipsometry Device and Method of the Present Invention)

The device and method of the present invention uses holography and can obtain large amount of amplitude and phase data accurately by small number of shots using one-shot digital holography for acquiring the data of object light O as holograms separable into p- and s-polarization. The hologram data can be expanded into a multiplicity of plane waves having different spatial frequencies associated with the incident angle of the illumination light Q for each p- and s-polarized light by numerical calculation of post-processing using a computer, and the amplitude and phase of each of many plane waves included in the p-polarized light and s-polarized light can be obtained. Therefore, by using holography and plane wave expansion, it is possible to perform ellipsometry which uses a large number of incident angles θ and single wavelength light. In this respect, it is different from the conventional spectroscopic ellipsometer which uses multi-wavelength light.

With the device and method of the present invention, the followings are achieved.

(1) Instantaneous measurement or high-speed measurement of thin film is possible by one-shot recording of hologram. In other words, since the conventional spectroscopic ellipsometer uses a rotating polarizer and a rotating compensator, the measuring time is long, and it takes several seconds to several hundred seconds for one measuring point, so real time measurement is difficult. In order to compensate for this drawback, a spectroscopic ellipsometer using a photoelastic modulator has been developed, but the device is expensive, weak in temperature change, and the calibration of the photoelastic modulator is necessary. According to the device and method of the present invention, the measurement time is determined by the frame rate of hologram recording, and high speed thin film data acquisition becomes possible by using a high speed CCD.

(2) It is possible to keep the price of the device low. Since expensive instruments such as spectroscope, rotary polarizer, photoelastic modulator are not used, the price of the device can be kept low. A CCD equipped with polarizers or a Wollaston prism may be used, or a configuration without using them is also possible. Further, the device configuration is simple, and can simplify the calibration operation of the device at the time of measurement.

(3) Accurate measurement of film thickness becomes possible using the acquired large amount of hologram data with CCD, the noise removal in the post-processing by numerical calculation, and the plane wave expansion of light wave. That is, since the stray light and noise generated at the time of recording can be eliminated by performing the spatial frequency filtering on the recorded hologram, and the reflected light can be decomposed into multiple, for example, tens of thousands to tens of millions of plane waves having different spatial frequencies by numerical calculation using the large amount of data contained in the hologram, the polarization state of the reflected light from a thin film can be analyzed with high accuracy. Moreover, it is unnecessary to model the dielectric function, for example, to model the wavelength dependence n=n(λ) of the refractive index, therefore it is possible to avoid the complexity of the data analysis by the modeling of the dielectric function and the uncertainty of the analysis result.

(4) It is possible to increase the spatial resolution of measurement. That is, since it is possible to use a single wavelength laser light, the spot size of the illumination light can be reduced to about micron, and the spatial resolution of measurement can be increased to the spot size of about micron.

(5) Instantaneous recording or high speed continuous recording for a wide thin film is possible. That is, the thin film is illuminated over a wide area of several cm to several tens of cm diameter using a lens or concave mirror having a large aperture, and the spherical-wave reflected light from the thin film is recorded at a position before or behind the condensing point thereof as an one-shot hologram, and the hologram can be used for ellipsometric analysis. By performing the plane wave expansion on the recorded light, the reflected light is decomposed into plane waves having different spatial frequencies, and each plane wave is used for ellipsometric analysis. It is possible to associate a spatial frequency with a measurement point on the thin film one to one. Using the polarization information for each decomposed plane wave and the spatial frequency information of the plane wave, it is possible to determine the film thickness of the measured point within the illuminated area, and it is possible to analyze the thin film thickness distribution and film thickness nonuniformity.

(6) High precision measurement becomes possible by using a laser light in a wavelength range suitable for the film thickness measurement to deal with the fact that the sensitivity and accuracy of thin film thickness measurement depends on the light wavelength. In addition, measurement is possible by simultaneous acquisition of holograms using multi-wavelength light and subsequent analysis, and also measurement of light wavelength dependence of optical constants is possible by changing the light wavelength as a parameter.

In the device and method of the present invention, the following problems can be solved by accurately instantaneously recording the amplitude and phase information of p- and s-polarized lights using digital holography, and numerically analyzing using enormous recorded data.

(1) To make the mechanical rotation of the polarizer and elastic modulation of light unnecessary.

(2) To make simple and inexpensive configuration without using a spectrometer.

(3) To increase spatial resolution using an illumination light of small spot size.

(4) To realize data analysis without requiring the modeling of a dielectric function.

(5) To realize fast measurement of film thickness distribution for ellipsometric analysis of large area thin film.

(6) To measure wavelength dependence of optical constants using a wavelength tunable laser.

The present invention includes the following technologies.

(1) A technology for recording p-polarized light and s-polarized light reflected from a thin film in one off-axis hologram which is separable into a p-polarized light hologram and a s-polarized light hologram by one-shot or few shots, and a technology for extracting the p-polarization off-axis hologram and the s-polarization off-axis hologram separately from the recorded hologram.

(2) A technology for making the thin film reflected light and the reference light in-line mutually by modulating the polarization off-axis hologram separated, a technology for extracting the complex amplitude in-line hologram in which only the reflected light is recorded by performing the spatial frequency filtering, and a technology for removing stray lights and noise recorded in the hologram.

(3) A technology for performing the plane wave expansion on the p-polarized light wave and the s-polarized light wave after noise removal, and a technology for expressing the polarization state with respect to each spatial frequency by deriving the amplitude ratio and the phase difference between the p-polarized light component and the s-polarized light component.

(4) A technology for determining the film thickness and the optical constant values by analyzing data using the amplitude ratio and the phase difference between the p-polarized light component and the s-polarized light component with respect to the each spatial frequency.

(5) A technology for deriving the film thickness distribution on a large area thin film using the plane wave expansion from the recorded hologram in which the reflected light from the large area thin film is recorded by one-shot or few shots.

(6) A technology for improving the measurement accuracy using the information of the light wavelength by selectively using a plurality of single wavelength laser lights having different wavelengths according to the film thickness and film structure of the thin film, and a technology for measuring the optical wavelength dependence of the optical constants using a wavelength tunable laser.

In the present invention, the following techniques can be used.

(1) A technology for recording interference fringes made by a reference light and a object light by one-shot or few shots as a large numerical aperture off-axis hologram, by using a green pulse laser as a laser and by illuminating the light receiving surface of a photo detector (for example, a CCD), directly without passing through any lens or the like, with an off-axis reference light and an object light radiated from a minute object.

(2) A technology for obtaining a large numerical aperture complex amplitude in-line hologram by applying the spatial frequency heterodyne modulation and spatial frequency filtering to the recorded hologram.

(3) A technology for performing the subdivision of the sampling interval, data interpolation, and the spatial heterodyne modulation on the holograms, after dividing the hologram.

(4) A technology for generating a synthetic minute hologram for reconstructing a distortion-free, high-resolution free-focus image by superposing each divided minute hologram mutually.

(On Method for Deriving the Object Light O Data)

In order to obtain the data of only the object light O from the object light hologram $I_{OR}$ which is an off-axis hologram, data of the reference light R is necessary. If the data of the reference light R is obtained, the component of the reference light R can be removed from the object light hologram $I_{OR}$. The following three methods are conceivable as a method for obtaining the data of the object light O by obtaining the data of the reference light R. In any of the following method 1, method 2, and method 3, processing is performed for each polarization state κ=p, s. Also, in method 2 and method 3, Fourier transform, Fourier inverse transform, coordinate transform (see FIG. 7 and FIG. 8), and the calculation of amplitude reflection coefficient are involved.

(Method 1)

Using the in-line spherical-wave reference light L, the reference light R is recorded in a hologram $I_{LR}$. The hologram $I_{LR}$ is acquired using the optical system 2 or the like as shown in FIG. 5 and FIG. 11. It is assumed that the in-line spherical-wave reference light L can be expressed accurately by mathematical expressions using, for example, the distance from the position of the condensing point (point light source of the spherical-wave) to the photo-detector 4. Data of the reference light R is obtained from the data of the reference light L and the data of the hologram $I_{LR}$. By using the data of the reference light R, the data of the object light O is obtained from the data of the object light hologram $I_{OR}$.

(Method 2)

The illumination light Q is reflected by the mirror and recorded. This method 2 is the method described in the 9th embodiment (FIG. 22). In the optical system 2 as shown in FIG. 3, FIG. 9, and FIG. 17, the object 3 (specimen) is replaced with a mirror (corresponding to the reflecting mirror ML in FIG. 22, referred to as an object mirror), and the reflected light L' of the illumination light Q from the object mirror are recorded in the hologram $I_{L'R}$. In this method 2, a combination of the illumination light Q and the object mirror is used instead of the reference light L in method 1, and the reflected light L' is used as a substitute for the reference light L. In this case, it is assumed that the illumination light Q is a spherical-wave and can be accurately expressed by a mathematical expression. Further, since the reflected light L' is influenced by the reflection by the object mirror, correction processing for correcting mathematical expression of the illumination light Q is necessary.

(Correction Processing for the Reflection)

Using the information of the complex refractive index n=n−ik of the object mirror, the reflection coefficient r of the object mirror for the p-polarized light and the s-polarized light is calculated. As similar in the case of method 1, the illumination light Q is mathematically expressed and the data of the reflected light L' is calculated using the data of the illumination light Q mathematically expressed and the data of the reflection coefficient r. The data of the reference light R is obtained from the data of the obtained reflected light L' and the data of the hologram $I_{L'R}$. By using the data of the reference light R, the data of the object light O is obtained from the data of the object light hologram $I_{OR}$.

(Method 3)

It is calculated using a spherical-wave R and the reflection coefficient r of the micro mirror M3. In the optical system 2 as shown in FIG. 3, FIG. 9, and FIG. 17, data of the reference light R is calculated. It is assumed that the reference light R is a spherical-wave and can be accurately expressed by a mathematical expression. Further, since the phase of the reference light R changes before and after the reflection by the micro mirror M3, the reflected light R is denoted by a reference light R'. Therefore, by specifying this distinction clearly, the hologram of object light O is expressed as a hologram $I_{OR'}$. The data of the reference light R' after reflection is calculated, similar to the reflected light L' of method 2, using the data of the reflection coefficient r calculated using the information of the complex refractive index n=n−ik of the micro mirror M3 and the data of the reference light R mathematically expressed. The data of the object light O is obtained from the data of the object light hologram $I_{OR'}$ using the obtained data of the reference light R'.

It is to be noted that the present invention is not limited to the above configurations and various modifications are possible. For example, the configurations of the above-described embodiments and modifications thereof can be combined with each other. In the present invention, it is possible to use non-parallel light as the illumination light Q and the reference light R, without using the spherical-wave light as the illumination light Q and the reference light R. To acquire a hologram separately into the p-polarized light hologram and the s-polarized light hologram includes to acquire the p-polarized light hologram and the s-polarized light hologram as separate holograms from the beginning.

INDUSTRIAL APPLICABILITY

The ellipsometry device and the ellipsometry method of the present invention use holography, and a large amount of amplitude and phase data can be obtained by a small number of shots, so high-speed and high-precision measurement is possible, and polarization analysis with very high sensitivity is possible. The ellipsometry device and the ellipsometry method of the present invention belong to the fields of optics, holography, optical measurement, applied light information, microscope, precise thin film measurement and the like from the viewpoint of the principle and technique used, and applicable in those fields.

In addition, the device and method of the present invention can be applied to thin film measurement to which high speed and precise-high resolution are required, and can be applied to semiconductor, chemistry, display, optical film and material, data memory, process evaluation, and also can be applied to various applications in the field of medical measurement and the like. In the device and method of the present invention, data can be recorded instantaneously and noncontactly using light, so it can be used for real time measurement and feedback control of processing. For example, it can be used for process evaluation such as thin film formation, etching, oxidation and heat treatment, and the like. It can also be used for evaluation and control of processes performed in solution, for example, thin film formation process in solution.

This application is based on Japanese Patent Application No. 2016-163989, the content of which is consequently to be combined with the present invention by referring to the specification and drawings of the above patent application.

EXPLANATIONS OF LETTERS OR NUMERALS

1 Ellipsometry device
10 Data acquisition unit
10a Light source
10b Optical system
10c Photo-detector
10d Calculation unit (sic)
10e Reference light wave acquisition unit (sic)
10f Complex amplitude acquisition unit (sic)
11 Data analysis unit
11a Light wave reconstruction unit
11b Object light plane wave expansion unit
11c Polarization coefficient generation unit
11d Operation unit
11e Display
12a Polarization separation unit
12b Complex amplitude generation unit
12c Make-in-line unit
12d Light wave hologram generation unit
13a Rotation transform unit
13b Ellipsometric angle calculation unit
13c Fitting unit
2 Optical System
20 Laser
21, 22, 24, 25, 27, 28 Lens
23, 26, 29 Condenser lens
3 Object
4, 41, 42, 43 Photo-detector
5 Computer
5a Memory (storage unit)
BS Beam splitter
G, $G^K$ Spatial frequency spectrum of the object light on the hologram plane, complex amplitude
H, $H^K$ Spatial frequency spectrum of the object light after rotation transform, complex amplitude
HM Half mirror
$I_{LR}$ Reference light off-axis hologram
$I_{OR}$ Object light off-axis hologram
$J_{LR}$ Complex amplitude hologram
$J_{OR}$ Complex amplitude hologram
$J_{OL}$ Complex amplitude in-line hologram
L In-line spherical-wave reference light
M1-M6 Mirror
M7 Reflector
M8 Concave mirror
ML Reflector which reflects the spherical-wave reference light L
O Object light
P1, P2, P3 Polarizer (polarization setting unit)
PA Polarizer array (polarization setting unit)
Pa, Pb Polarizer
Q, Q1, Q2, Q3 Illumination light
R, $R^K$, $R^p$, $R^s$ Off-axis reference light
RX Reference light splitting unit (polarization setting unit)
S, $S^K$ Spatial frequency spectrum of the illumination light on the hologram plane, complex amplitude
T, $T^K$ Spatial frequency spectrum of the illumination light after rotation transform, complex amplitude
WP Wollaston prism (polarization setting unit)
$b^K$ Rotated reconstructed light wave
d Pixel pitch
$f_M$ Maximum spatial frequency
g Light wave hologram on the hologram plane
$g^K_j$ Minute hologram
$h^K$ Reconstructed light wave at object position
n Refractive index
$r^p$, $r^s$ Amplitude reflection coefficient
(u, v) Spatial frequency or wave number vector on the hologram plane
(u', v') Spatial frequency or wave number vector on the hologram plane after rotation transform
Δ Ellipsometric angle
ψ Ellipsometric angle
Σ Synthetic minute hologram
$Σ^K$ Synthetic minute hologram
α Angle between the object surface and the hologram plane
δ Spatial sampling interval
θ Incident angle, reflection angle
$θ_B$ Brewster angle
λ Wavelength
κ Polarization state
$ξ_Q$ Illumination light polarization coefficient
ρ Amplitude reflection coefficient ratio

The invention claimed is:

1. An ellipsometry device used for polarization analysis of a light emitted from an object, comprising:

a data acquisition unit which acquires data of an object light (O) emitted from the object illuminated by a non-parallel illumination light (Q) of known polarization state containing p- and s-polarized lights as an object light hologram ($I_{OR}$) using an off-axis reference light (R) so that the object light hologram ($I_{OR}$) is separable into p- and s-polarization holograms, and acquires data of the off-axis reference light (R) as a reference light hologram ($I_{LR}$) using an in-line spherical-wave reference light (L) so that the reference light hologram ($I_{LR}$) is separable into p- and s-polarization holograms; and a data analysis unit which performs polarization analysis of the object light (O), wherein the data analysis unit comprises:

a light wave reconstruction unit which generates light wave holograms ($g^K(x, y)$, $\kappa$=p, s) expressing each light wave of p- and s-polarized lights in the object light (O), respectively, on a hologram plane using the data of the object light hologram ($I_{OR}$) and the reference light hologram ($I_{LR}$) acquired by the data acquisition unit;

an object light plane wave expansion unit which generates object light spatial frequency spectra ($G^K(u, v)$, $\kappa$=p, s) of p- and s-polarization by performing plane wave expansion on each of the light wave holograms ($g^K(x, y)$, $\kappa$=p, s) of p- and s-polarization, respectively;

a polarization coefficient generation unit which generates an illumination light polarization coefficient ($\xi_Q = S^s(u, v)/S^p(u, v)$) being a ratio of an illumination light spatial frequency spectrum ($S^s(u, v)$) of an s-polarized light in the illumination light (Q) to an illumination light spatial frequency spectrum ($S^p(u, v)$) of a p-polarized light in the illumination light (Q) on the hologram plane using known information of the illumination light (Q); and an operation unit which derives, using the object light spatial frequency spectra ($G^K(u, v)$, $\kappa$=p, s) of p- and s-polarization and the illumination light polarization coefficient ($\xi_Q$), an amplitude reflection coefficient ratio ($\rho = r_p/r_s = \xi_Q G^p(u, v)/G^s(u, v)$) being a ratio of an amplitude reflection coefficient ($r_p = G^p(u, v)/S^p(u, v)$) of p-polarization to an amplitude reflection coefficient ($r_s = G^s(u, v)/S^s(u, v)$) of s-polarization, for each spatial frequency (u, v).

2. The ellipsometry device according to claim 1, wherein the data acquisition unit comprises:

an optical system which generates the illumination light (Q) in a spherical-wave-like state, the off-axis reference light (R) in a spherical-wave-like state, and the in-line spherical-wave reference light (L), with a coherent light emitted by a laser, and propagates the generated lights;

a photo-detector which changes a light intensity into an electric signal and outputs it;

a storage unit which stores the object light hologram ($I_{OR}$) being an off-axis hologram of interference fringes between the object light (O) and the off-axis reference light (R), and the reference light hologram ($I_{LR}$) being an off-axis hologram of interference fringes between the in-line spherical-wave reference light (L) and the off-axis reference light (R), in a memory by acquiring them through the photo-detector; and a polarization setting unit which is provided on a light path from the laser to the photo-detector and sets the polarization state of light propagating on the light path so that each of the object light hologram ($I_{OR}$) and the reference light hologram ($I_{LR}$) can be acquired and stored in the storage unit as a hologram separable into p- and s-polarization holograms, wherein the data analysis unit comprises:

a polarization separation unit which generates object light holograms ($I^K_{OR}$, $\kappa$=p, s) of p- and s-polarization separated from the object light hologram ($I_{OR}$) for each polarization, respectively, and reference light holograms ($I^K_{LR}$, $\kappa$=p, s) of p- and s-polarization separated from the reference light hologram ($I_{LR}$) for each polarization, respectively; and a make-in-line unit which generates object light complex amplitude in-line holograms ($J^K_{OL}$, $\kappa$=p, s) of p- and s-polarization, respectively, by eliminating the component of the off-axis reference light (R) from the object light holograms ($I^K_{OR}$, $\kappa$=p, s) of p- and s-polarization and the reference light holograms ($I^K_{LR}$, $\kappa$=p, s) of p- and s-polarization, wherein the light wave reconstruction unit generates the light wave holograms ($g^K(x, y)$, $\kappa$=p, s) of p- and s-polarization, respectively, by eliminating the component of the in-line spherical-wave reference light (L) from the object light complex amplitude in-line holograms ($J^K_{OL}$, $\kappa$=p, s) of p- and s-polarization generated by the polarization separation unit and the make-in-line unit, using the characteristics as spherical-wave light of the in-line spherical-wave reference light (L).

3. The ellipsometry device according to claim 2, wherein the polarization setting unit comprises a reference light dividing unit which divides the off-axis reference light (R) into a p-polarized off-axis reference light ($R^p$) and an s-polarized off-axis reference light ($R^s$) so that they are mutually off-axis, wherein the data acquisition unit acquires the object light hologram ($I_{OR}$) and the reference light hologram ($I_{LR}$), so that each of the holograms is separable into p- and s-polarization holograms, using and superposing the p- and s-polarized off-axis reference lights ($R^K$, $\kappa$=p, s) obtained by the reference light dividing unit.

4. The ellipsometry device according to claim 3, wherein the reference light dividing unit divides the off-axis reference light (R) into the p- and s-polarized lights using a Wollaston prism.

5. The ellipsometry device according to claim 2, wherein the photo-detector is a CCD, and the polarization setting unit comprises a polarizer array for setting the polarization state of the light received by the photo-detector for every pixel of the CCD.

6. An ellipsometry method used for polarization analysis of a light emitted from an object, comprising the steps of:

acquiring data of an object light (O) emitted from the object illuminated by a non-parallel illumination light (Q) of known polarization state containing a p-polarized light and an s-polarized light as an object light hologram ($I_{OR}$) using an off-axis reference light (R) so that the object light hologram ($I_{OR}$) is separable into p- and s-polarization holograms, and acquiring data of the off-axis reference light (R) as a reference light hologram ($I_{LR}$) using an in-line spherical-wave reference light (L) so that the reference light hologram ($I_{LR}$) is separable into p- and s-polarization holograms;

generating light wave holograms ($g^K(x, y)$, $\kappa$=p, s) expressing each light wave of p- and s-polarized lights in the object light (O), respectively, on a hologram plane using the data of the object light hologram ($I_{OR}$) and the reference light hologram ($I_{LR}$);

generating object light spatial frequency spectra ($G^K(u, v)$, $\kappa$=p, s) of p- and s-polarization by performing plane wave expansion on each of the light wave holograms ($g^K(x, y)$, $\kappa$=p, s) of the p- and s-polarization lights, respectively;

generating an illumination light polarization coefficient ($\xi_Q = S^s(u, v)/S^p(u, v)$) being a ratio of an illumination light spatial frequency spectrum ($S^s(u, v)$) of an s-polarized light in the illumination light (Q) to an illumination light spatial frequency spectrum ($S^p(u, v)$) of a p-polarized light in the illumination light (Q) on the hologram plane using known information of the illumination light (Q); and deriving, using the object light spatial frequency spectra ($G^K(u, v)$, κ=p, s) of p- and s-polarization and the illumination light polarization coefficient ($\xi_Q$), an amplitude reflection coefficient ratio ($\rho=r_p/r_s=\xi_Q G^p(u, v)/G^s(u, v)$) being a ratio of an amplitude reflection coefficient ($r_p=G^p(u, v)/S^p(u, v)$) of p-polarized light to an amplitude reflection coefficient ($r_s=G^s(u, v)/S^s(u, v)$) of s-polarized light, for each spatial frequency (u, v).

7. The ellipsometry method according to claim 6, wherein generating the illumination light (Q) in a spherical-wave-like state, the off-axis reference light (R) in a spherical-wave-like state, and the in-line spherical-wave reference light (L) with a coherent light emitted by a laser, and propagating the generated lights;

acquiring and storing the object light hologram ($I_{OR}$) being an off-axis hologram of interference fringes between the object light (O) and the off-axis reference light (R), and the reference light hologram ($I_{LR}$) being an off-axis hologram of interference fringes between the in-line spherical-wave reference light (L) and the off-axis reference light (R);

generating object light holograms ($I^K_{OR}$, κ=p, s) of p- and s-polarization and reference light holograms ($I^K_{LR}$, κ=p, s) of p- and s-polarization separated for each polarization from the object light hologram ($I_{OR}$) and the reference light hologram ($I_{LR}$), respectively;

generating object light complex amplitude in-line holograms ($J^K_{OL}$, κ=p, s) of p- and s-polarization, respectively, by eliminating the component of the off-axis reference light (R) from the object light holograms ($I^K_{OR}$, κ=p, s) of p- and s-polarization and the reference light holograms ($I^K_{LR}$, κ=p, s) of p- and s-polarization; and generating the light wave holograms ($g^K(x, y)$, κ=p, s) of p- and s-polarization, respectively, by eliminating the component of the in-line spherical-wave reference light (L) from the object light complex amplitude in-line holograms ($J^K_{OL}$, κ=p, s) of p- and s-polarization, using the characteristics as spherical-wave light of the in-line spherical-wave reference light (L).

8. The ellipsometry method according to claim 7, wherein the acquisition of each of the object light hologram ($I_{OR}$) and the reference light hologram ($I_{LR}$) is performed by dividing the off-axis reference light (R) in the spherical-wave-like state into a p-polarized off-axis reference light ($R^p$) and an s-polarized off-axis reference light ($R^s$) so that they are mutually off-axis and by superimposing the p- and s-polarized off-axis reference lights ($R^K$, κ=p, s) mutually, the separation of each of the object light hologram ($I_{OR}$) and the reference light hologram ($I_{LR}$) into p- and s-polarization holograms is performed by a filtering based on the fact that the off-axis reference lights ($R^K$, κ=p, s) of p- and s-polarization are mutually off-axis.

9. The ellipsometry method according to claim 8, wherein the object light hologram ($I_{OR}$) and the reference light hologram ($I_{LR}$) are acquired by using two or more coherent lights of different wavelength overlapped mutually, and the amplitude reflection coefficient ratio ($\rho=r_p/r_s$) is derived for each of the different wavelengths.

10. The ellipsometry method according to claim 8, wherein the object light hologram ($I_{OR}$) is acquired using a spherical-wave light as the illumination light (Q), and the reference light hologram ($I_{LR}$) is acquired using the illumination light (Q) as the in-line spherical-wave reference light (L) by reflecting the illumination light (Q) of spherical-wave light onto the hologram plane using a reflector of known reflective characteristic for polarized light.

11. The ellipsometry method according to claim 7, wherein the acquisition of each of the object light hologram ($I_{OR}$) and the reference light hologram ($I_{LR}$) is performed by using a CCD, being a photo detector, alternately equipped with a polarizer for s-polarization and a polarizer for p-polarization for every pixel of the CCD, and the separation of each of the object light hologram ($I_{OR}$) and the reference light hologram ($I_{LR}$) into p- and s-polarization holograms is performed by separating data for every pixel of the CCD into data of p- and s-polarization.

12. The ellipsometry method according to claim 7, wherein the object light hologram ($I_{OR}$) is acquired using a spherical-wave light as the illumination light (Q), and the reference light hologram ($I_{LR}$) is acquired using the illumination light (Q) as the in-line spherical-wave reference light (L) by reflecting the illumination light (Q) of spherical-wave light onto the hologram plane using a reflector of known reflective characteristic for polarized light.

13. The ellipsometry method according to claim 7, wherein the object light hologram ($I_{OR}$) and the reference light hologram ($I_{LR}$) are acquired by using two or more coherent lights of different wavelength overlapped mutually, and the amplitude reflection coefficient ratio ($\rho=r_p/r_s$) is derived for each of the different wavelengths.

14. The ellipsometry method according to claim 7, wherein the amplitude reflection coefficient ratio ($\rho=r_p/r_s$) is derived after transforming each of the object light spatial frequency spectra ($G^K(u, v)$, κ=p, s) of p- and s-polarization and the illumination light spatial frequency spectra ($S^K(u, v)$, κ=p, s) of p- and s-polarization into an expression, respectively, on a plane parallel to a surface of the object by a coordinate rotation transform.

15. The ellipsometry method according to claim 6, wherein the object light hologram ($I_{OR}$) and the reference light hologram ($I_{LR}$) are acquired by using two or more coherent lights of different wavelength overlapped mutually, and the amplitude reflection coefficient ratio ($\rho=r_p/r_s$) is derived for each of the different wavelengths.

16. The ellipsometry method according to claim 6, wherein the amplitude reflection coefficient ratio ($\rho=r_p/r_s$) is derived after transforming each of the object light spatial frequency spectra ($G^K(u, v)$, κ=p, s) of p- and s-polarization and the illumination light spatial frequency spectra ($S^K(u, v)$, κ=p, s) of p- and s-polarization into an expression, respectively, on a plane parallel to a surface of the object by a coordinate rotation transform.

17. The ellipsometry method according to claim 6, wherein the acquisition of the object light hologram ($I_{OR}$) is performed by setting a size of illuminated spot with the illumination light (Q) on a surface of the object as a size for microscopic observation, and the processing for generating the object light spatial frequency spectra ($G^K(u, v)$, $\kappa=p, s$) of p- and s-polarization comprises the steps of:

substantially increasing a sampling point number for each of the light wave holograms ($g^K(x, y)$, $\kappa=p, s$) of p- and s-polarization by subdividing a spatial sampling interval and performing a data interpolation to a new sampling point produced by the subdividing;

dividing each of the light wave holograms of p- and s-polarization having the increased sampling point number into a plurality of minute holograms ($g^K_i(x, y)$, $\kappa=p, s$), respectively;

generating each of synthetic minute holograms ($\Sigma^K(x, y)$, $\kappa=p, s$) of p- and s-polarization by mutually superimposing each of the minute holograms ($g^K_i(x, y)$, $\kappa=p, s$) generated by the dividing, for p- and s-polarization respectively; and generating each of the object light spatial frequency spectra ($G^K(u, v)$, $\kappa=p, s$) of p- and s-polarization by performing a plane wave expansion on each of the synthetic minute holograms ($\Sigma^K(x, y)$, $\kappa=p, s$) of p- and s-polarization, wherein each of reconstructed light waves ($h^K(x, y)$, $\kappa=p, s$) of p- and s-polarization of the object light (O) at a position where the optical axis of the object light (O) intersects the surface of the object is generated using spatial frequencies (u, v, w) satisfying the dispersion relation of a plane wave and the object light spatial frequency spectra ($G^K(u, v)$, $\kappa=p, s$) of p- and s-polarization generated through the increasing of the sampling point number, each of rotated reconstructed light waves ($b^K(x', y')$, $\kappa=p, s$) of p- and s-polarization of the object light (O) is generated by transforming each of the reconstructed light waves ($h^K(x, y)$, $\kappa=p, s$) of p- and s-polarization into an expression on a plane parallel to the surface of the object by a coordinate rotation transform, respectively, and the amplitude reflection coefficient ratio ($\rho=\xi_Q b^p(x', y')/b^s(x', y')$) at each of the points (x', y') in the illuminated spot or an image ($|b^K|^2$, $\kappa=p, s$) of the surface of the object for the microscopic observation is derived using the illumination light polarization coefficient ($\xi_Q$), and the rotated reconstructed light waves ($b^K(x', y')$, $\kappa=p, s$) of p- and s-polarization.

18. The ellipsometry method according to claim 6, comprising the steps of:

acquiring an angle ($\alpha$) between a surface of the object and the hologram plane;

acquiring the object light hologram ($I_{OR}$) by illuminating the object with an incident angle of the illumination light (Q) involving the Brewster angle ($\theta_B$) of the object;

deriving the amplitude reflection coefficient ratio ($\rho$) after transforming each of the object light spatial frequency spectra ($G^K(u, v)$, $\kappa=p, s$) of p- and s-polarization and the illumination light spatial frequency spectra ($S^K(u, v)$, $\kappa=p, s$) of p- and s-polarization into an expression, respectively, on a plane parallel to the surface of the object by a coordinate rotation transform using the angle ($\alpha$) between the surface of the object and the hologram plane;

deriving ellipsometric angles ($\psi$, $\Delta$) for the polarization analysis from the amplitude reflection coefficient ratio ($\rho$) on a plurality of incident angles involved in the illumination light (Q);

deriving a value of a refractive index (n) of the object reflecting the illumination light (Q) by fitting the ellipsometric angles ($\psi$, $\Delta$) with model curves having the incident angle ($\theta$) as a variable and the refractive index (n) as a parameter.

19. The ellipsometry method according to claim 6, wherein the acquisition of the object light hologram ($I_{OR}$) is performed by using the illumination light (Q) being made spherical-wave-like and by illuminating large surface of the object including a plurality of measurement points with the illumination light (Q), wherein the condensing point of the illumination light (Q) is arranged at the front or rear of the large surface, and the derivation of the amplitude reflection coefficient ratio ($\rho$) is performed on each point of the plurality of the measurement points.

20. The ellipsometry method according to claim 6, wherein the acquisition of the object light hologram ($I_{OR}$) is performed by using the illumination light (Q) being made spherical-wave-like and by arranging the condensing point of the illumination light (Q) on the surface of the object.

* * * * *